INVENTORS
RICHARD KOBLER
OMAR K. MOORE
BY George H. Fritzinger
AGENT

INVENTORS
RICHARD KOBLER
OMAR K. MOORE
BY George H. Fritzinger
AGENT

INVENTORS
RICHARD KOBLER
OMAR K. MOORE
BY George H. Fritzinger
AGENT

Nov. 1, 1966 R. KOBLER ETAL 3,281,959

EDUCATIONAL SYSTEM AND APPARATUS

Filed April 6, 1962 11 Sheets-Sheet 4

INVENTORS
RICHARD KOBLER
OMAR K. MOORE
BY
George H. Fritzinger
AGENT

INVENTORS
RICHARD KOBLER
OMAR K. MOORE
BY George H. Fritzinger
AGENT

INVENTORS
RICHARD KOBLER
OMAR K. MOORE
BY George H. Fritzinger
AGENT

Nov. 1, 1966 R. KOBLER ETAL 3,281,959

EDUCATIONAL SYSTEM AND APPARATUS

Filed April 6, 1962 11 Sheets-Sheet 7

INVENTORS
RICHARD KOBLER
OMAR K. MOORE
BY George H. Fritzinger
AGENT

Nov. 1, 1966 R. KOBLER ETAL 3,281,959

EDUCATIONAL SYSTEM AND APPARATUS

Filed April 6, 1962

11 Sheets-Sheet 8

INVENTORS
RICHARD KOBLER
OMAR K. MOORE

BY George H. Fritzinger

AGENT

INVENTORS
RICHARD KOBLER
OMAR K. MOORE
BY George H. Fritzinger
AGENT

INVENTORS
RICHARD KOBLER
OMAR K. MOORE
BY George H. Fritzinger
AGENT

Nov. 1, 1966 R. KOBLER ETAL 3,281,959

EDUCATIONAL SYSTEM AND APPARATUS

Filed April 6, 1962

11 Sheets-Sheet 11

INVENTORS
RICHARD KOBLER
OMAR K. MOORE
BY
George H. Fitzinger
AGENT 3,281,959
Patented Nov. 1, 1966

3,281,959

EDUCATIONAL SYSTEM AND APPARATUS

Richard Kobler, West Orange, N.J., and Omar K. Moore, Guilford, Conn., assignors to McGraw-Edison Company, Elgin, Ill., a corporation of Delaware Filed Apr. 6, 1962, Ser. No. 185,616
51 Claims. (Cl. 35—6)

This invention relates to a new and improved educational system and apparatus using an audio typewriter and an audio visual exhibitor, and is one especially adapted to serve as a self-teaching aid for children from two to five years of age. The invention is an extension of the educational apparatus and system described in the pending U.S. application of Moore et al., Serial No. 113,420, filed May 29, 1961, now Patent No. 3,112,564.

The apparatus and system described in the foregoing Moore et al. application is a self-teaching aid for children adapted to enable them unaided to learn to identify and pronounce the characters on the keyboard of a typewriter as well as to type the same. This apparatus comprises an electric typewriter with a reproducing machine for pronouncing the characters on the keys of the typewriter. When the pupil depresses a key the character is typed in the usual way and the machine responds by pronouncing the character. In order to enforce the pupil to learn one character at a time in an orderly manner, the keyboard is made jam-proof by means of a ball raceway arrangement which permits only one key to be depressed at a time; further, a key lever locking arrangement is provided to block the entire keyboard until the automatic pronunciation is completed even though the pupil may have released the depressed key beforehand.

The present invention relates to a teaching methodology wherein successive characters on a typewriter keyboard are exhibited and pronounced. After each pronunciation the pupil responds by typing the respective character and the teacher responds by repronouncing the character and then exhibiting a succeeding character. When words have been so typed the same are pronounced and explained, and when successive words forming sentences have been so typed and pronounced the sentences are explained. In carrying out this methodology by the present invention the aforementioned electric typewriter and reproducing machine—herein referred to as a keyboard audio machine—is operated in conjunction with a card exhibiting machine for pointing out successive characters, words and/or sentences, and with a word audio machine for pronouncing and explaining words and sentences. The card exhibiting machine has a pointer which is fed by steps along printed lines to designate the successive characters and words. As a character is first pointed out, an encoding mechanism activates the keyboard audio machine to pronounce the character and activates a translator to free the respective key of the typewriter so that only that key can be depressed. When the pupil finds the respective key and presses the same the keyboard audio machine repronounces the character and the pointer is advanced automatically to the next character. This procedure is followed until the pupil learns to identify and pronounce all the characters on the keyboard as well as to type the same. In a next succeeding phase of instruction the machine is operated to provide a statement before or after each character is pointed out and the respective key is depressed. This phase of instruction is particularly beneficial in teaching the differences between upper and lower case characters. Next the pupil may be taught successive letters forming words. After the pupil has typed a group of letters forming a word, the machine will automatically pronounce the word and explain the same. After the pupil has thus mastered the spelling, typing and understanding of many key words, he is taught successive words forming sentences. Also, a slide projector may be activated automatically to show an object spelled by the word or described by the sentence and to provide any suitable background setting which will aid the pupil in understanding the meaning of the word or sentence. In this phase of instruction the machine not only pronounces and explains each word after the same has been typed by the pupil, but it also states and explains the sentence so formed after the pupil has typed the period at the end of the sentence.

The foregoing phases of instruction may be grouped into four categories, as follows: (1) allowing the pupil to explore a typewriter of standard form provided with a jam-proof keyboard and an automatic carriage return and line feed; (2) allowing the pupil to continue to explore the keyboard but with the audio machine coupled to the typewriter so that when a key is depressed the machine will pronounce automatically the character on that key, the machine having the jam-proof feature of allowing the pupil to depress only one key at a time and of not allowing any other key to be depressed until the automatic pronunciation is completed as before explained; (3) providing an exhibitor card before the pupil and a pointer to designate successive characters printed thereon, with the machine being arranged first to pronounce the character designated by the pointer and to encode (free) the respective key on the keyboard to permit the pupil to depress only that key, the machine operating then when that key is depressed to repronounce the character and/or to explain the same after which the pointer is automatically advanced to the next character, and (4) presenting to the pupil printed words and sentences with not only an initial pronunciation of the successive characters and a repronunciation thereof when the characters are typed but also with an automatic pronunciation and explanation after each word and sentence is completed.

The machine herein shown and described to illustrate the invention is one having a selector switch which can be set to adapt the machine selectively for the different phases of instruction above-outlined. However, since phase I of instruction is primarily one of getting the pupil acquainted with a standard typewriter, and phase II relates to an audio typewriter which pronounces each character when the respective key is depressed as heretofore described in the Moore et al. application, the present invention resides primarily in the system and apparatus by which instruction phases III and IV are carried out.

It has heretofore been shown that the foregoing progressive teaching methods carried out under the tutelage of human instructors are exceptionally successful in teaching children from two to five years of age to recognize the characters on the keyboard of a typewriter, and to pronounce and type the same. It is however not economically feasible to use an instructor's full time for each pupil. Moreover, the routine nature of the type of instruction here involved limits the effectiveness of an instructor to only a few hours per day.

The present invention resides in automating the above teaching methods heretofore carried out by human instructors. In this automated procedure the pupil is left alone in a room with a teaching machine according to the invention. During a teaching exercise an instructor normally does not make an appearance unless called by the pupil. Such free environment leaves the pupil in a mood to explore the keyboard of the typewriter more readily and to do a greater amount of work. For instance, when an instructor is present the pupil relies heavily on the instructor to guide and explain each step in the teaching process, but when the pupil is by himself he gains self reliance and uses more initiative. Also, the pupil finds greater enjoyment and incentive in operating an automated equipment than in merely operating a standard electric typewriter with a human instructor standing by. The clear mistake-proof pronunciation of the characters, words and sentences by the machine, the jam-proof character of the machine which enforces a progressive and orderly development of the subject matter presented to the pupil, and the free environment which incites the pupil to greater initiative are all factors which are conducive to children learning by themselves to read and pronounce letters and words, and to spell, print and type the same, at a very early age.

Another object of the invention is to provide an automated methodology for teaching children at any early age to read, spell, type and write words and sentences.

Another object is to provide an integrated machine which is adapted for teaching children through progressive stages to acquire superior communicative skills and typing ability.

Another object is to provide a machine for exhibiting and pronouncing the characters on the keyboard of a typewriter.

Another object is to provide the entire keyboard in a normally disabled condition wherein all the keys are either blocked or uncoupled, and to cause a key to be placed in an abled or encoded condition—i.e., to be unblocked or coupled to the mechanism which it controls—when the character on that key is exhibited so that only the exhibited character can be typed.

Another object is to provide a decode-encode means responsive to each typing operation to automatically exhibit and pronounce a succeeding character and concurrently to encode the key corresponding to the succeeding character.

Another object is to totally block the keyboard during a decode-encode operation until the key corresponding to the succeeding character is encoded.

Another object is to repronounce each character as the same is typed.

Another object is to permit a more rapid presentation of the successive characters to the pupil by causing the repronunication of a character to be eliminated provided the pupil depresses the respective key before the first pronunication is completed;

Other detailed objects are:

To provide adjustable means for delaying the pointer movement to a new character when an encoded key is depressed;

To advance the pointer of the exhibitor by one step responsive to pressing and releasing a key of the typewriter;

To provide an exhibitor card having printed matter on one side and having both encode and audio information prerecorded on the other side;

To permit the card holder to be shifted up and down only when (1) the machine is stopped and in a standby condition; (2) the pointer is in home position, (3) the machine is decoded and (4) the machine is inoperable to encode;

To provide a means responsive to encoding "carriage return" for (1) shifting the word audio carriage to a first track position, (2) returning the card exhibitor pointer to home position, (3) returning the encode head to home position, (4) advancing the card holder by one line, and (5) returning the typewriter carriage and advancing the line feed after the encode head and the pointer have returned home;

To provide means for blocking the keyboard during a decode-encode cycle comprising: (1) a ball raceway for blocking the remaining keys when the encoded key is depressed, (2) a blocking bail for blocking the entire keyboard when the encoded key is released until the encoding is completed and (3) a translator for blocking all the keys except the encoded key when the machine is in an encoded condition;

To provide an encode playback collector mechanism for selectively actuating (1) a logic circuitry to control an audio and/or visual apparatus in relation to the character exhibited and (2) a translator to encode the key of the typewriter corresponding to the character exhibited;

To provide a code start-stop switch which is moved to a decode preparation position at the end of encoding and to an encode preparation position at the end of decoding;

To provide an encode playback collector mechanism wherein the logic circuitry and the translator are activated in the sequence here named;

To provide an exhibitor card having a plurality of word audio tracks on the back side for each printed line on the front side and to provide means to scan the word audio tracks in succession while the card is at standstill;

To decode the machine responsive to the word audio head reaching the end of a word audio track;

To provide means settable to limit the length of scan of each word audio track by a voice-operated relay which returns the head to home position whenever the head has scanned a predetermied length of track without pickup of a recorded signal;

To decode the logic circuitry responsive to depressing the encoded key and to decode the translator responsive to releasing the key;

To cause the entire keyboard of the typewriter to be blocked when the machine is in a standby condition;

To automatically repronounce the exhibited character at intervals while the machine is in an encoded condition to prompt the pupil to press the encoded key;

To place the pointer advancing means in an arrested condition as a result of the pointer being moved to certain preselected characters requiring a preliminary encoding such as of "upper case" or "lower case" before the character itself is encoded;

To drop the arrested condition of the pointer advancing means responsive to depressing the key which is encoded by the preliminary encoding operation;

To provide a "filler code" for advancing the pointer while maintaining the keyboard in a blocked or disabled condition;

To provide fringe lights to indicate when certain "fringe" keys are to be operated especially when such operation is not clearly indicated by the exhibitor;

To activate a fringe light in combination with the activation of the poniter arrest means;

To use a nonprint space together with pointer arrest to explain a word just preceding or a character or word just following a "space" interval;

To arrest the pointer advancing means responsive to each advance of the pointer to a nonprint space and to drop the pointer arrest by a "filler code" when it is desired not to activate the keyboard audio or word audio machines, prior to the advance of the pointer to the next character;

To decode the machine and return the typewriter carriage, the pointer, the encode head and word audio head to start positions responsive to pressing the stop button to return the machine to a standby condition;

To operate the keyboard audio machine first by the logic circuitry and secondly by depressing the encoded key;

To permit a preset delay in the pointer advance and in the pronunciation of a new character while not delaying the repronunciation of the character; and To permit cut out of the repronunciation of the character if desired.

In the description of our invention reference is had to the accompanying drawings, of which:

Figure 4A:
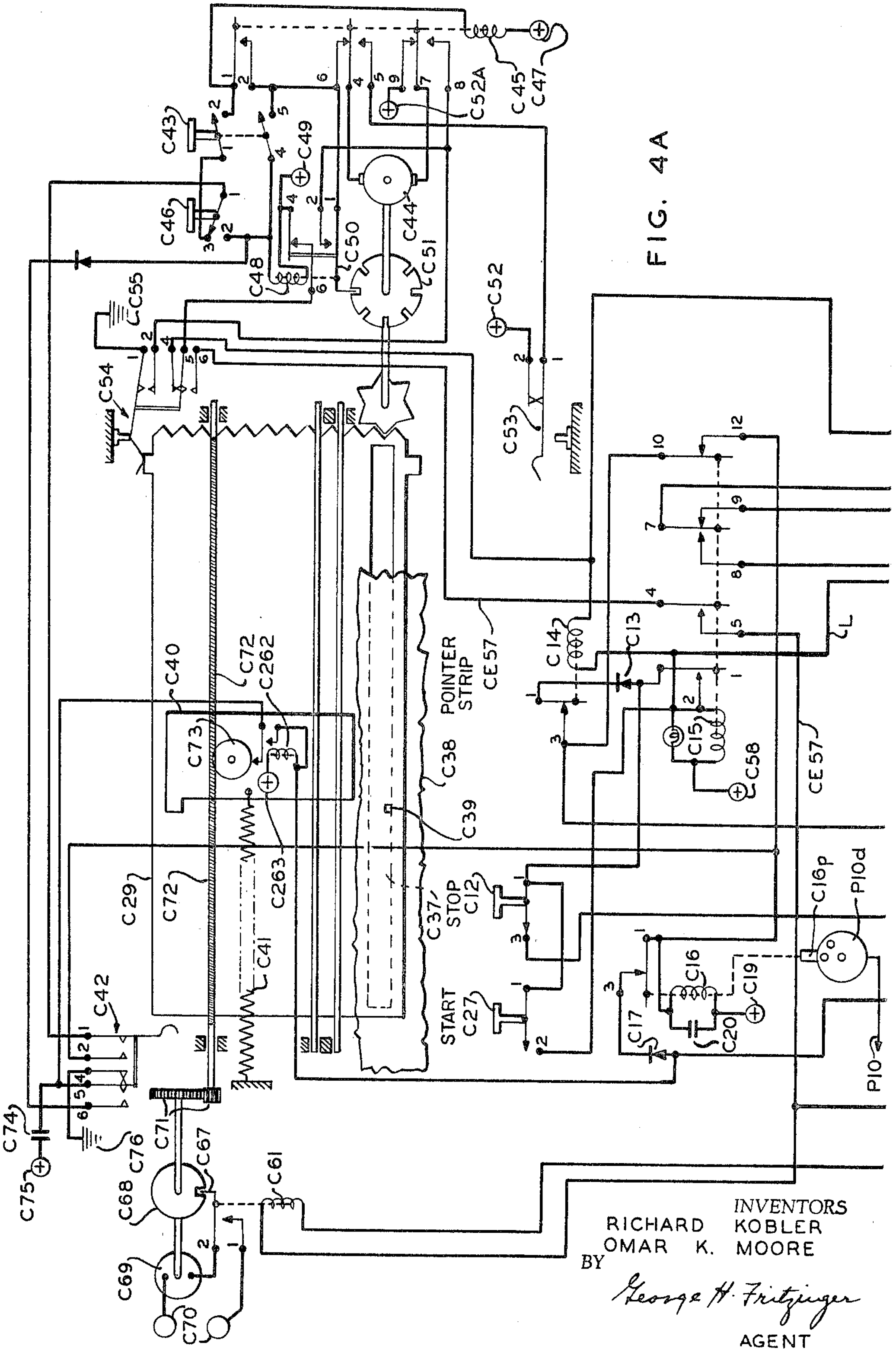
Figure 4B:
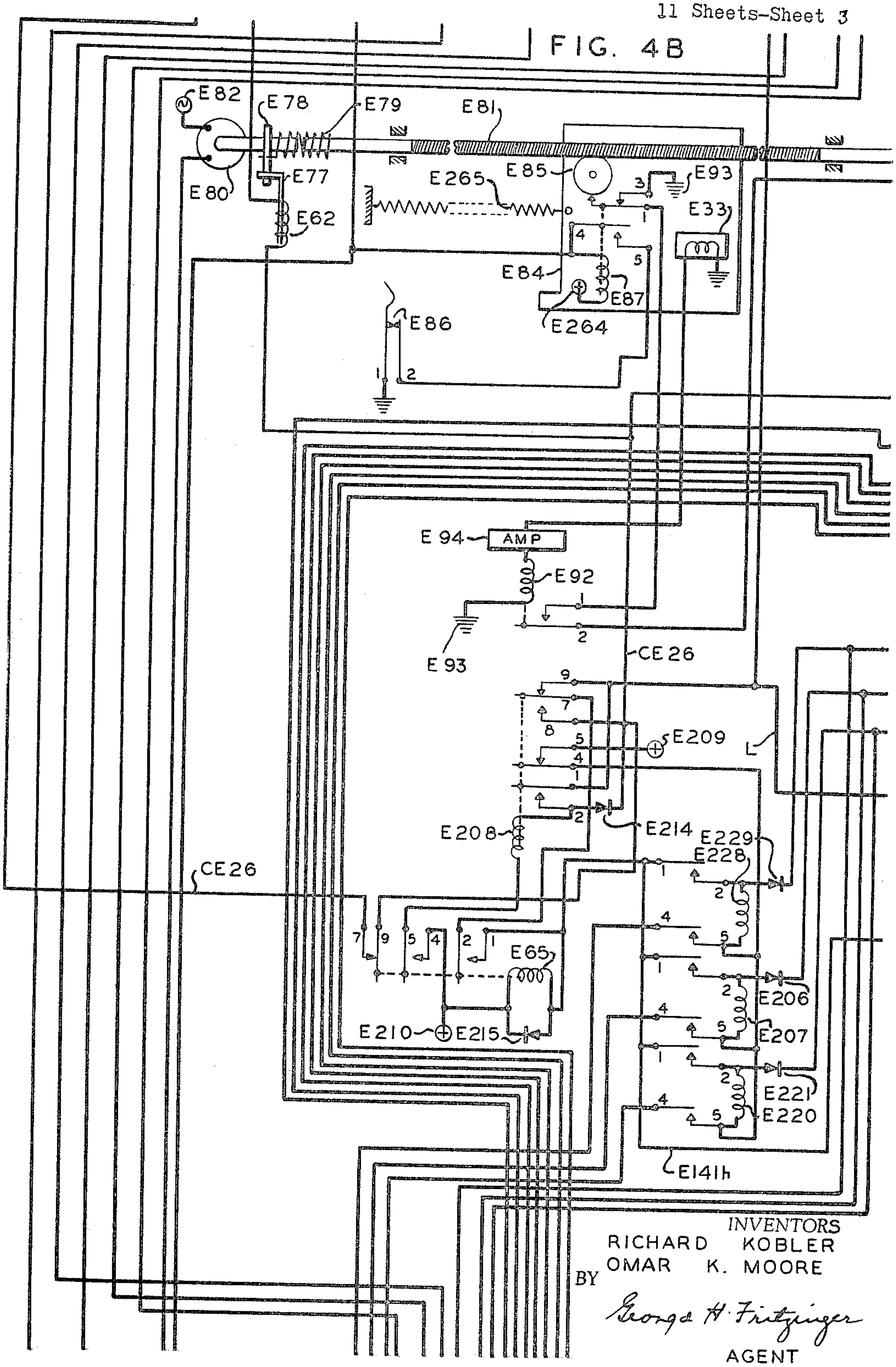
Figure 4C:
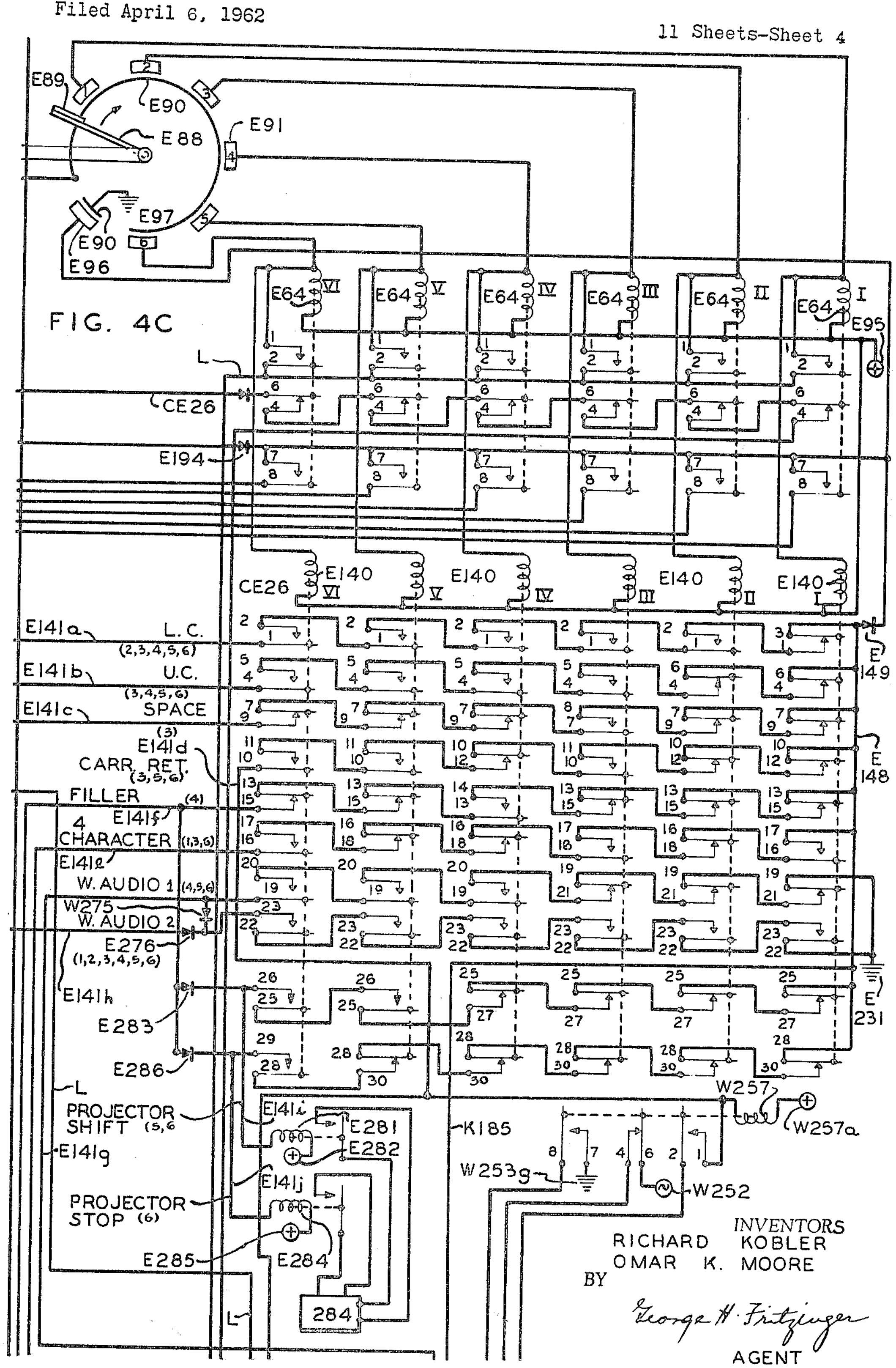
Figure 4D:
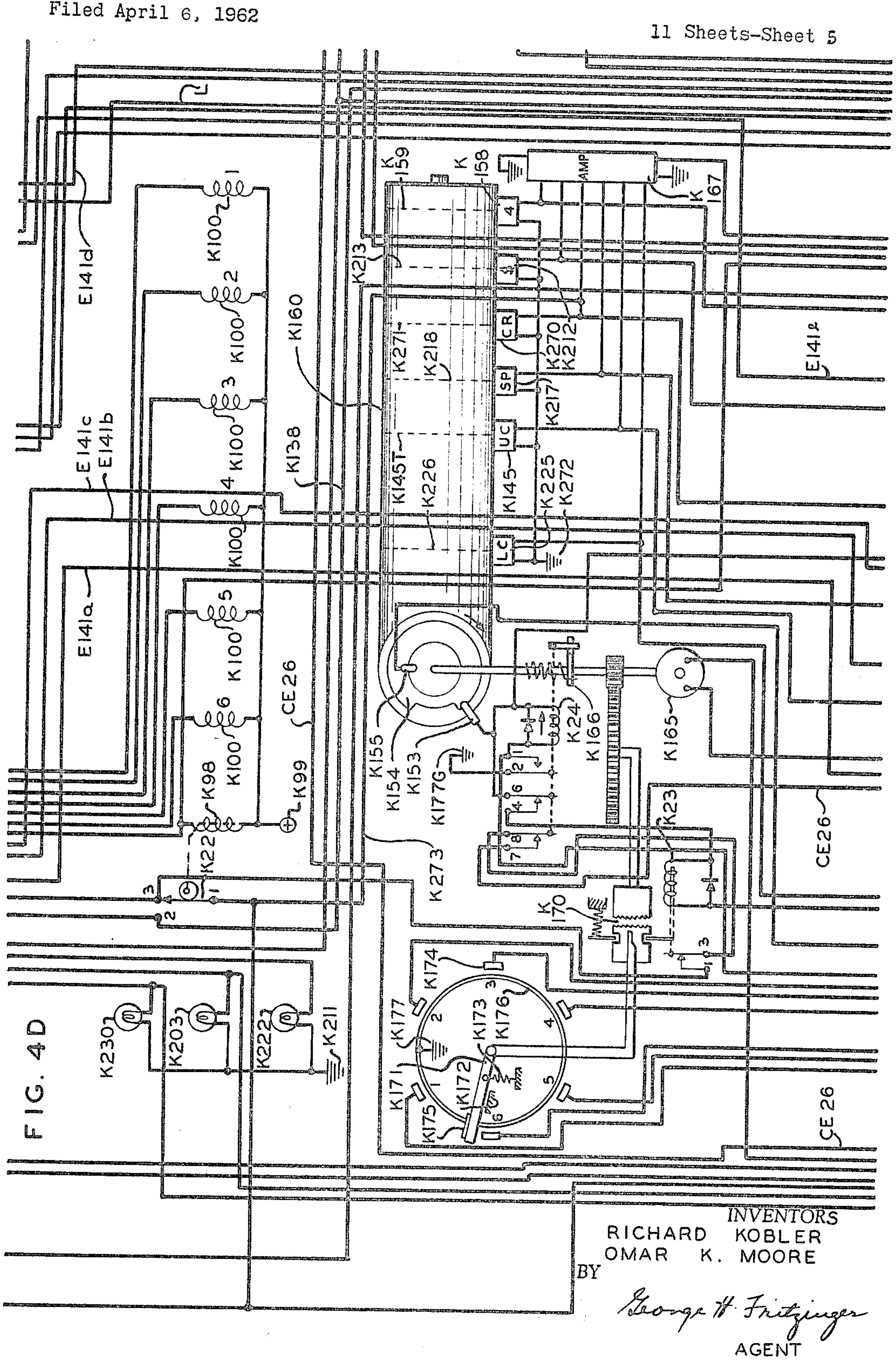
Figure 4E:
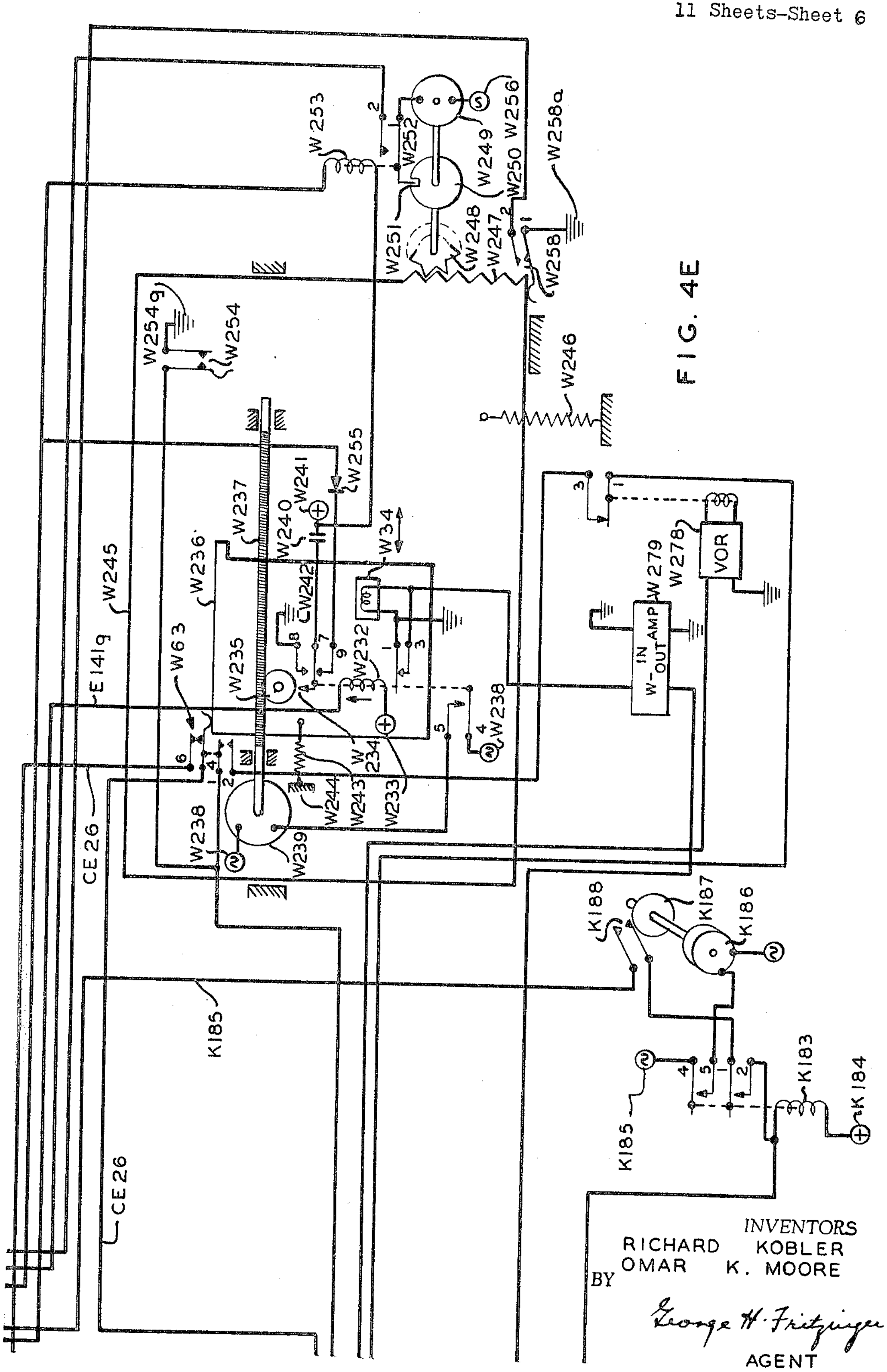
Figure 4F:
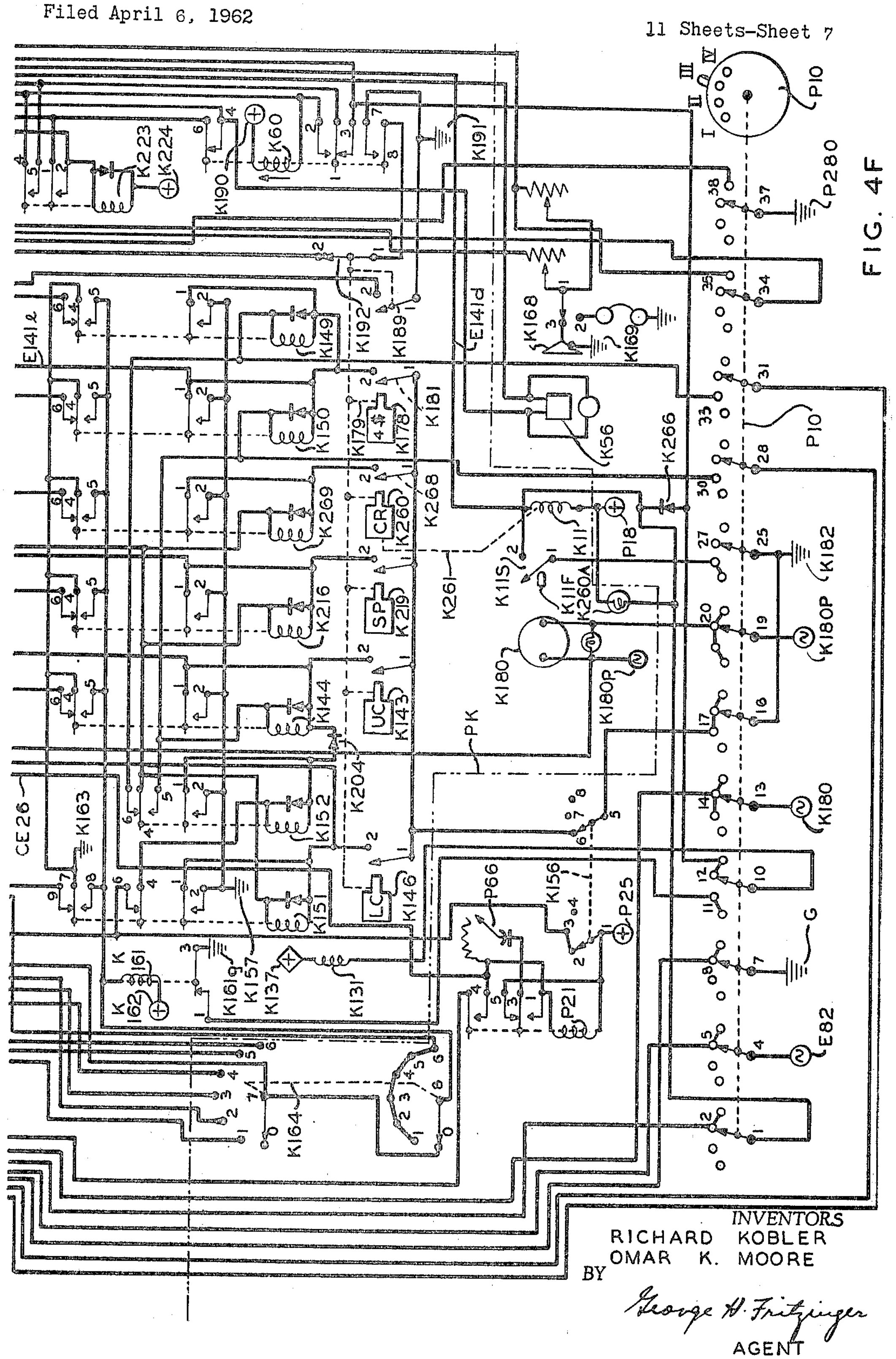
Figures 5, 6, 10:
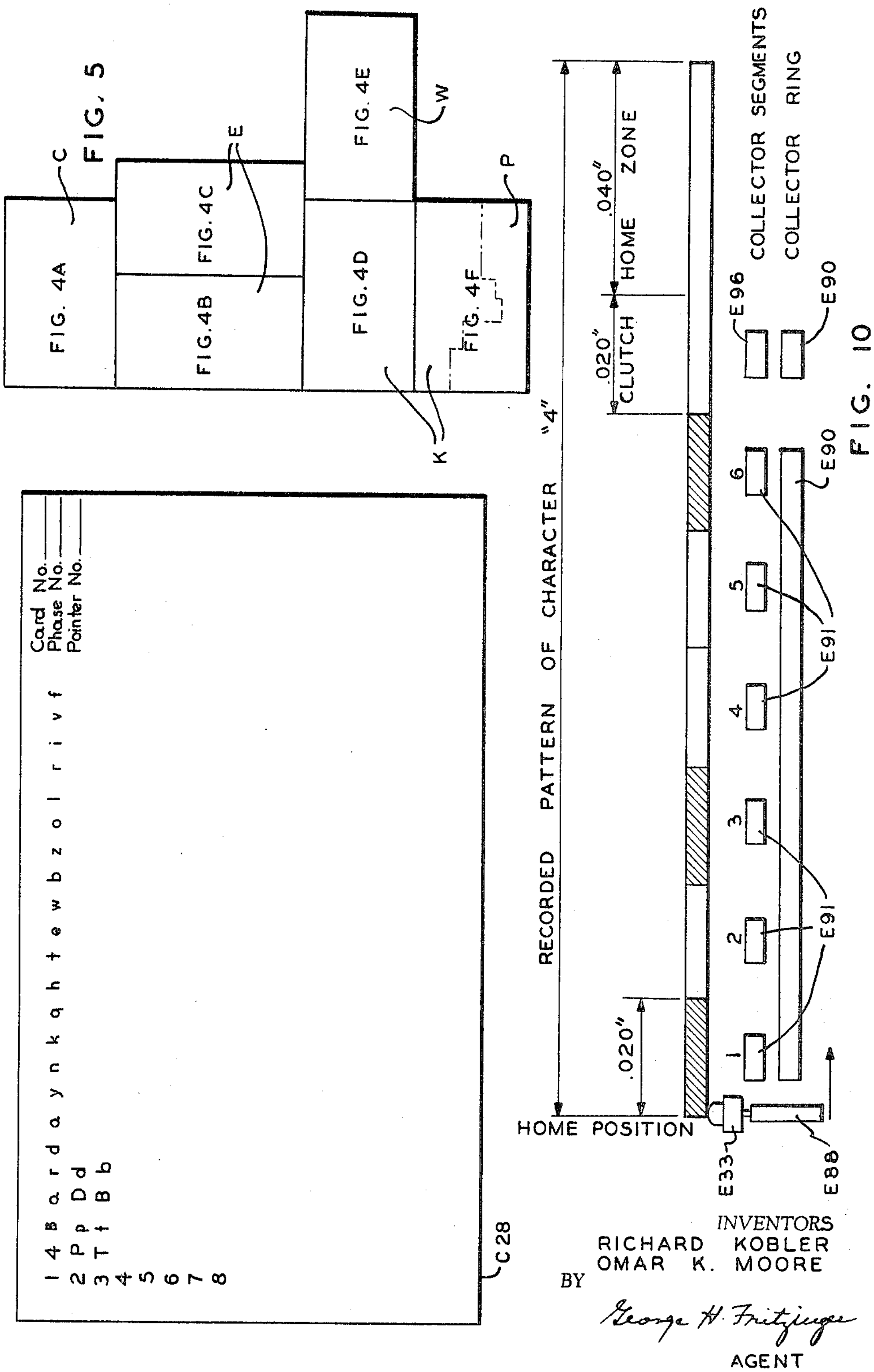

FIGURES 4A, 4B, 4C, 4D, 4E and 4F taken together constitute a schematic circuit diagram of the entire machine and taken individually constitute schematic circuit diagrams respectively of the card exhibiting machine, the encoder, the keyboard audio machine, word audio machine and control panel;

FIGURE 5 is a diagram showing the manner of assembling the sheets of FIGURES 4A–4F of the schematic circuit diagram.

Figures 7, 8, 9A, 9B, 9C, 9D:
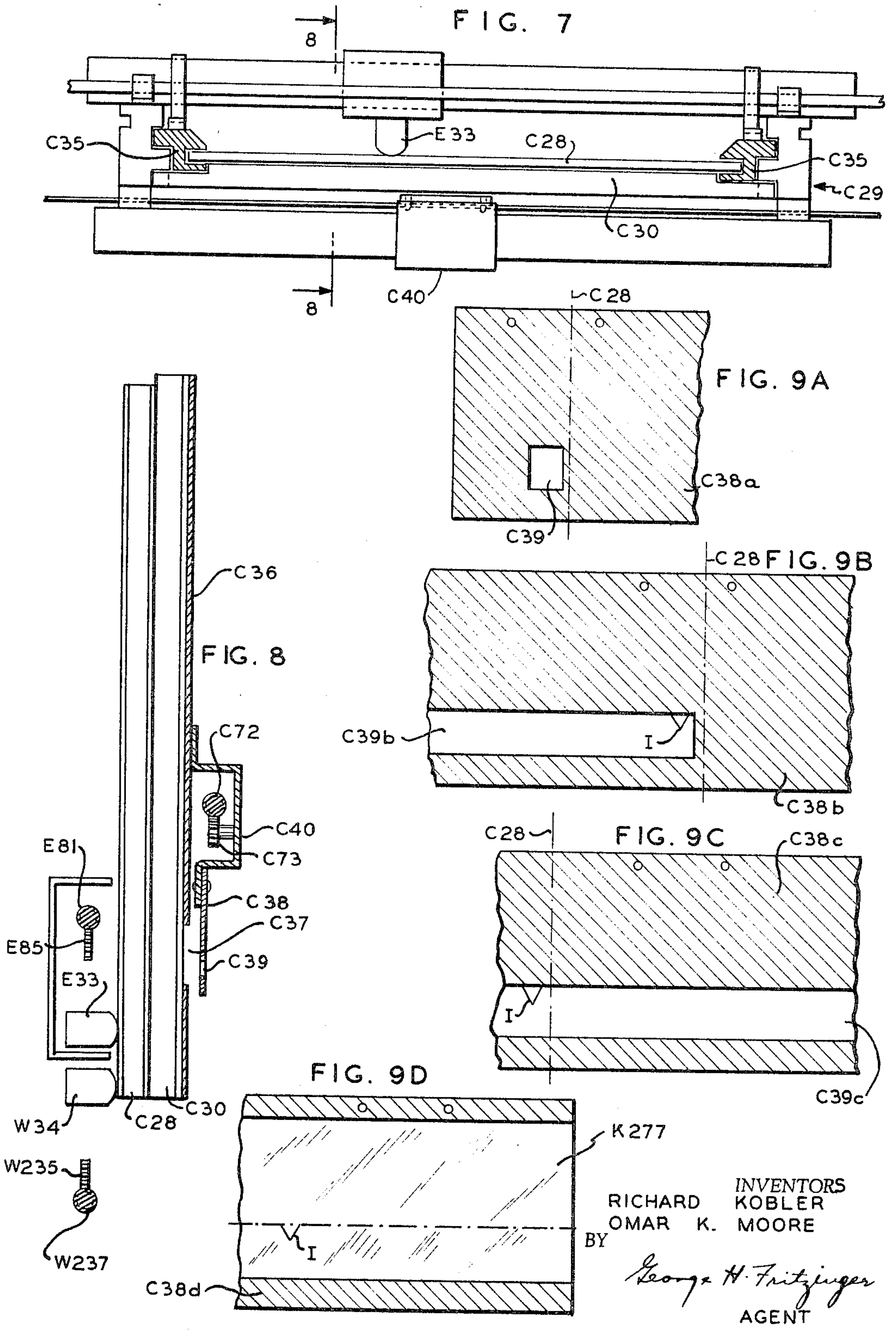
Figures 11, 13:
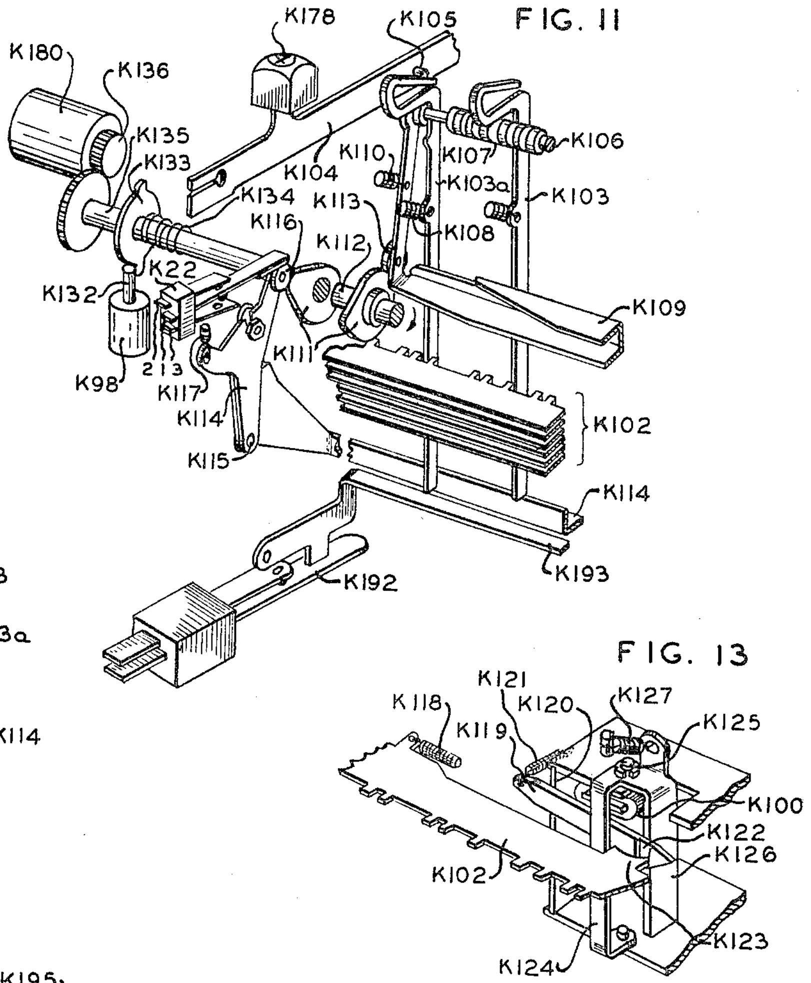
Figure 12:
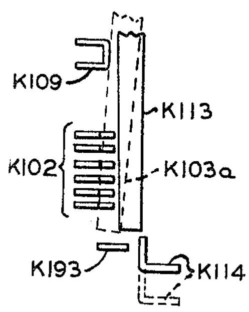
Figure 14:
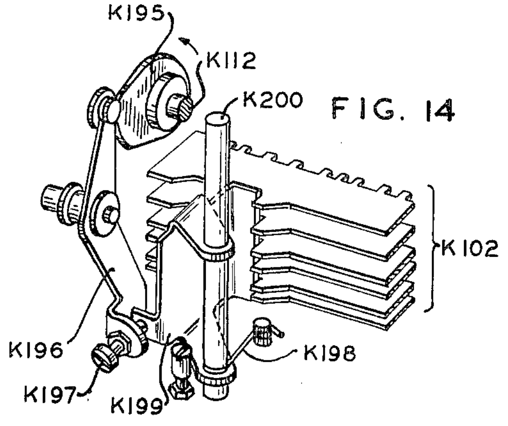
Figure 15:
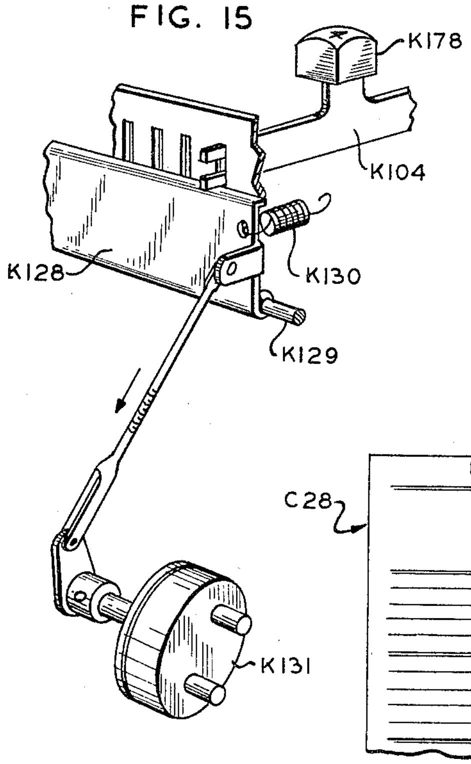
Figure 16:
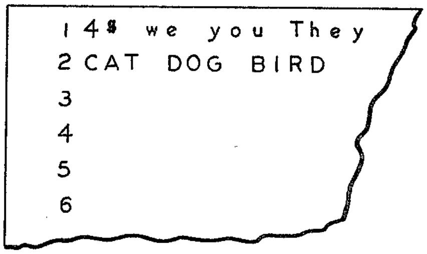
Figure 17:
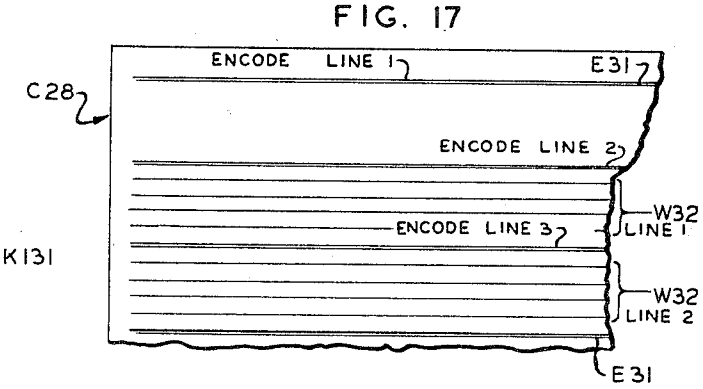
Figure 18:
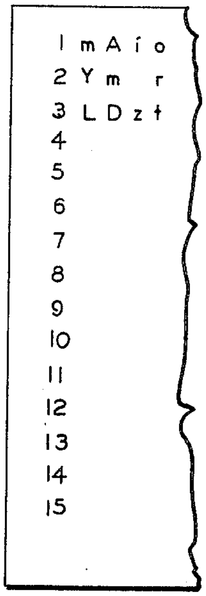
Figure 19:
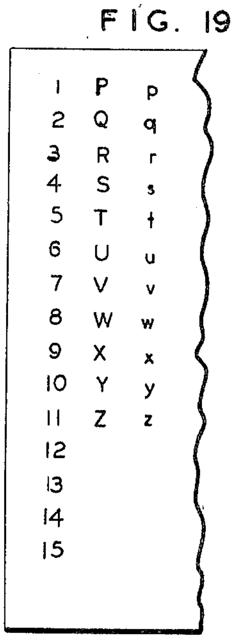

FIGURE 6 is a view of a portion of the print side of the exhibitor card showing randomly arranged lower and upper case characters;

FIGURE 7 is a top view of the card holder of the exhibiting machine;

FIGURE 8 is a sectional view on the line 8—8 of FIGURE 7;

FIGURE 9A is a fractional view of the pointer strip of the exhibiting machine with a single pointer hole to exhibit one character at a time;

FIGURE 9B is a fractional view of a pointer strip with an oblong window one line long and one line high and with a pointer at the forepart thereof;

FIGURE 9C is a fractional view of a pointer strip with an oblong window one line high and two lines long and with a pointer midway the length of the window;

FIGURE 9D is a fractional view of a pointer strip with an oblong window three lines high and two lines long and with a pointer midway the length of the window up one line from the bottom of the window;

FIGURE 10 is a diagram showing the pattern of recorded and nonrecorded bits according to the binary code for the code signal for the number 4, together with the relation of the encode head and collector arm relative to the encode track and collector segments;

FIGURE 11 is a fractional perspective view of the typewriter keyboard and translator mechanism showing the parts in the positions which they occupy at the end of the encode operation;

FIGURE 12 is a fractional view showing the relation of the translator bail, permutation bars and blocking bail to the seeker bars of the translator mechanism;

FIGURE 13 is a rear perspective view of a permutation bar showing the translator solenoid for unlatching the bar;

FIGURE 14 is a view of a common decoding cam mechanism for returning the permutation bars to latched unoperated positions, showing the cam in a midposition of its one half revolution of decode movement;

FIGURE 15 is a perspective view of the key lever lock bail mechanism for the typewriter;

FIGURE 16 is a fractional view of the print side of an exhibitor card showing a character and word arrangement;

FIGURE 17 shows by successive lines the encode and word audio track arrangement at the back side of the card;

FIGURE 18 is a fractional view of the print side of an exhibitor card adapted for an oral test of character pronunciation, and FIGURE 19 is a fractional view of the print side of an exhibitor card adapted for teaching the distinction between small and capital letters.

In describing the present system and apparatus the same is considered as being subdivided into main sections as shown by the individual drawings 4A to 4E which together form the schematic circuit diagram of the overall machine when assembled according to the diagram of FIGURE 5. These main sections comprise a keyboard audio machine K (FIGURE 4D and the portion of FIGURE 4F above the dash-dot line PK) including a typewriter and an audio machine for selectively pronouncing the respective characters designated on the keyboard, a control panel P (the portion of FIGURE 4F below the dash-dot line PK), a card exhibiting machine C (FIGURE 4A) for displaying a record card having printed matter on one side and code signals as well as words and statements magnetically recorded on the other side, a word audio machine W (FIGURE 4E) for reproducing the recorded words and statements, and an encoder E (FIGURES 4B and 4C) including a head for reproducing the code signals from the back side of the record card in the card machine (1) to activate the keyboard audio machine to pronounce the character designated by the card mechanism as well as to free the key of the typewriter bearing the same character, and/or (2) to activate the word audio machine W for reproducing prerecorded words and sentences from the back side of the record card in the card machine. The keyboard audio machine K herein described is of the type disclosed in the pending Moore et al. application aforementioned, but it is preferably of the improved form of this machine disclosed in the pending application Serial No. 151,666 of Whitney et al., filed November 13, 1961, and entitled Multi-Track Record-Reproduce System with Servo-Controlled Track Selector (now Patent No. 3,145,268, dated August 18, 1964). The card machine C is generally of the construction described in the pending Whitney application, Serial No. 138,332, filed September 15, 1961, and entitled Binary Coded Pulse Recording and Reproducing Apparatus and System (now Patent No. 3,124,645, dated March 10, 1964).

It should be noted that the term "encode" is herein employed for accomplishing two functions: (1) the selective activation of combinations of the so-called encode bit relays and of the encode audio relays, known as encoding the "logic," for activating the keyboard audio machine K to pronounce a preselected character and/or the word audio machine W to explain a preselected character, word or sentence, and (2) the selective activation of combinations of the so-called translator solenoids, known as encoding the "translator," for freeing a preselected key of the typewriter so that only that key can be depressed. Each encoding is carried out by reproducing a code signal from a prerecorded encode track comprising a series of recorded and non-recorded bits at different intervals according to a binary code, and utilizing the code signal to activate a predetermined combination of the logic relays and of the translator solenoids.

In the description which follows the elements of the respective main sections are designated by reference numbers with prefix letters of the respective main sections to which the elements pertain. For example, an element of the keyboard audio machine K is referred to as K11, etc., of the card machine C as C13, etc., of the control panel P as P10, etc. Also, electric switches are herein referred to by their general designation followed by a hyphen and by the contact numbers separated by a comma. Thus, contacts 7, 8 of switch P10 are written as P10–7,8.

Figures 1, 2, 3:
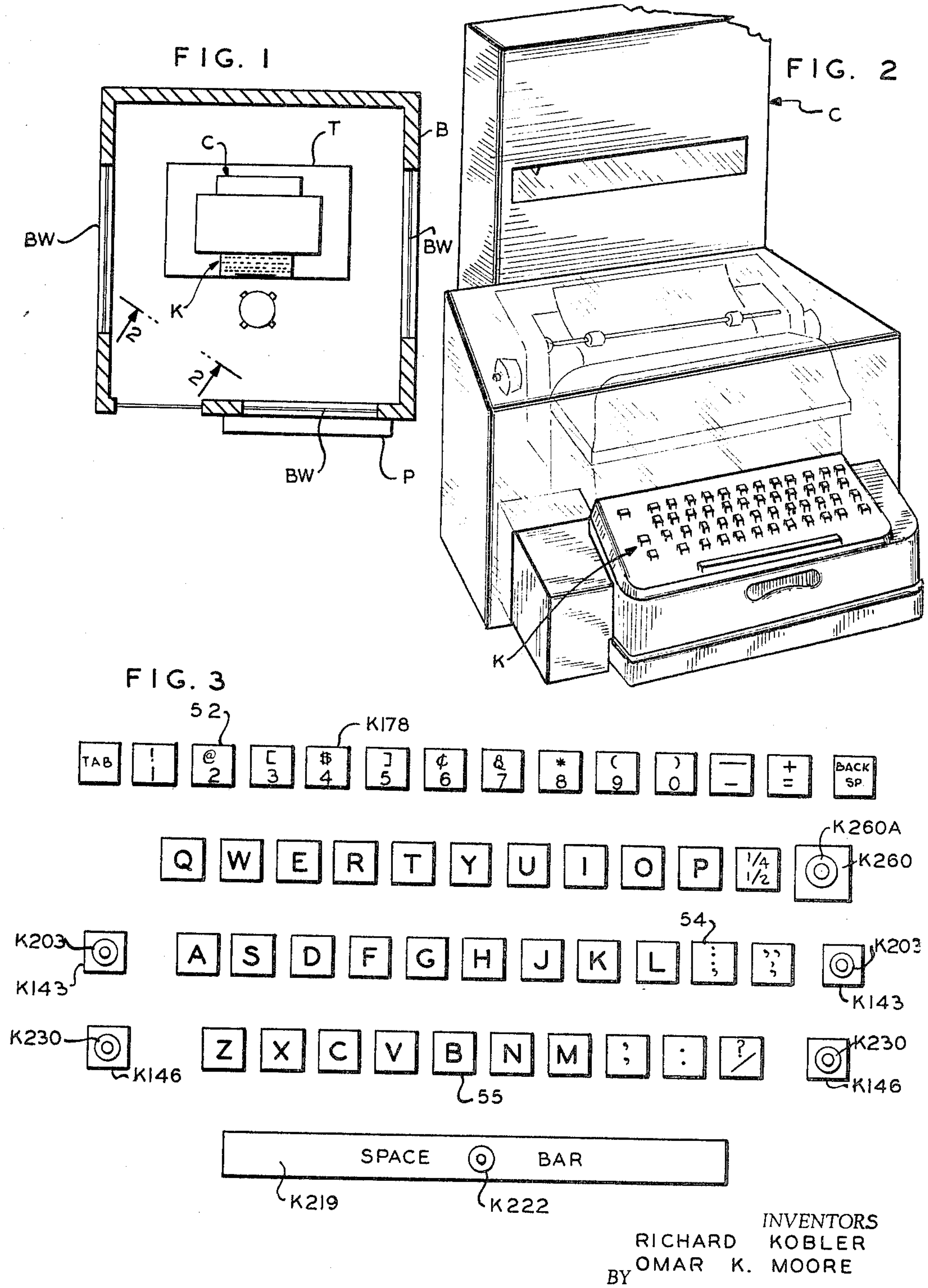
FIGURE 1 is a top plan view of a booth with a teaching machine for an individual pupil according to the invention.
FIGURE 2 is a front view of the teaching machine as seen from the line 2—2 of FIGURE 1.
FIGURE 3 is a plan view of a keyboard for the typewriter showing fringe lights for the keys for upper case shift, lower case shift, carriage return and space.

The portion of the present apparatus comprising at least the keyboard audio machine K, the card machine C, the encoder E and word audio machine W is placed on a suitable table T in a soundproof booth B as shown by the top plan view in FIGURE 1. The booth has one or more windows BW each of the one-way type which permits an outside person to see in but not the pupil to see out. The typewriter per se may be a so-called Flexowriter such as is manufactured by Friden Incorporated of San Leandro, California. This is an electric typewriter having a standard keyboard provided with a ball raceway to permit only one key to be depressed at a time and having a power roll and cam mechanism for driving the type bars against the platen as the keys are depressed, all as is described in the Moore et al. application. The machine itself is enclosed as by a transparent hood to leave only the keyboard accessible to the pupil.

The pupil sits in front of the machine in position to operate the keyboard. The card machine with the exhibitor card is positioned behind and above the keyboard audio machine in direct view of the pupil. After the instructor has given the pupil any needed preliminary instruction he leaves the pupil alone in the booth with the teaching machine. The control panel P has a selector switch P10 and other contacts as well as suitable instruments showing the activity of the pupil. When an instructor is present he will stand back of the panel P outside the booth in position to observe the pupil through the window BW in the back wall of the booth. The selector switch P10 on the panel P has an "off" position and four "on" positions designated I, II, III and IV as indicated in the schematic circuit diagram of FIGURE 4F. The instructor sets this selector panel switch to suit the type of instruction to be presented to the pupil. As will appear, instruction Phases III and IV are taught with selector switch P10 in position III and a sepecial part of instruction Phase IV when the selector switch is in position IV.

When the selector switch P10 is in position I it renders operative only the typewriter of the keyboard audio machine K. For example, the typewriter motor K180 (FIGURE 4F) is started from power source K180P through panel switch P10–19,20, and a panel switch P10–25,27 is closed to prepare the operating circuit for a carriage return solenoid K11. When the carriage nears the end of its travel a finger K11F projecting in advance thereof is moved against switch K11S to close the same and cause the carriage return solenoid K11 to be operated from plus terminal P18 to ground K182. Operation of the carriage return solenoid K11 also activates the line feed advance by one step in the usual way. Also in this phase I of instruction, a keyboard unlock solenoid K131 (FIGURES 4F and 15) is held activated by a circuit running from plus terminal K137 through panel switch P10–10,11, keyboard lock relay switch K161–1,3 and ground K161G. The keyboard is therefore blocked only when a key is depressed by the ball raceway mechanism before described. A typing paper of a continuous manifolded form is preferably used to permit long lengths to be stored in the machine so that it will be normally unnecessary for the instructor to load the machine during an instruction period.

In Phase I, the pupil explores the keyboard by pressing the keys as fast as he may desire but by operating only one at a time in view of the jam-proof feature provided by the ball raceway mechanism. Each time the pupil presses a key a respective cam unit is activated by the power roll in the well-known manner to strike the type bar against the sheet on the platen. In operating the keyboard the pupil is encouraged to use the proper touch system as by painting the pupil's finger nails with different colors and painting the keys to be operated by each individual finger with the same color. Also, to encourage proper division in the operation of the keys by the two hands a differential may be provided in the pressure required to operate the keys by the left hand as against the pressure required to operate the keys by the right hand. A period clock with a buzzer attachment and a stroke counter may be mounted on the panel P to aid the instructor with an indication of the activity of the pupil; however, these devices do not necessarily constitute a part of the present invention and are not herein described.

The selector switch P10 is thrown to its II position for the second phase of instruction. In Phase II, the pupil continues to explore the keyboard as in Phase I but the machine now pronounces automatically the characters as the same are typed. The ball raceway arrangement permits only one key to be depressed at a time, as before. Now, additionally, as described in the Moore et al. application, the entire keyboard is blocked even after a depressed key is released until the automatic pronunciation of the character is completed. For instance, when a key is depressed, say key K178 in FIGURE 4F, the respective character relay K149 is activated to close its contacts 4, 5 to complete a circuit from plus terminal K162 through keyboard lock relay K161 to ground K163. This opens contacts K161–1,3 and breaks the hold circuit of the keyboard unlock solenoid K131 to free a locking bail K128 (FIGURE 15) to be drawn by a spring K130 against the key levers so that the instant the depressed key is released the bail will snap under the key levers and block the entire keyboard against operation of any key until the automatic pronunciation is completed.

The means for automatically pronouncing the respective characters is described in the Moore et al. application and also herein under Phase III. Suffice to say for the present that when the key K178 is pressed while the machine is in a lower case condition (FIGURE 4D) the respective lower case relay K149 is activated to remove a mute from the head K158 registering with a track K159 on the drum K160 bearing a pre-recording of the pronunciation of the lower case character on the key K178. At the same time, the drive mechanism for the drum K160 is started to turn it through one revolution so that the machine will reproduce the prerecorded track K159 and pronounce the character. If an upper case shift key K143 is pressed it places the machine mechanically in upper case condition and operates a respective relay K144 to remove a mute from a head K145 and start the drum turning through one revolution so that the machine will pronounce upper case. The relay K144 is held operated to maintain the machine in condition to pronounce only upper case characters until a lower case shift key K146 is next pressed. For instance, if after pressing the upper case shift key K143 the pupil presses the key K178 a respective upper case relay K150 is activated instead of the relay K149. Activation of the relay K150 removes a mute from the head K212 and starts the drum K160 to cause the machine to pronounce the upper case character. Similarly, pressing any other key will now cause the typewriter to print the upper case character thereon and the machine to pronounce the upper case character. When the pupil next presses the lower case shift key K146 the machine is returned mechanically to lower case condition and the upper case relay K144 is dropped so that when any subsequent key is pressed the machine will pronounce the lower case character thereon.

The typewriter may have a standard keyboard as shown in FIGURE 3. Such keyboard includes certain machine-control keys which when pressed do not print any characters but perform only respective control functions such as (1) upper case shift, (2) lower case shift, (3) tab, (4) backspace, (5) carriage return, and (6) space. These keys are usually located on the fringe of the keyboard and are herein referred to generally as fringe keys. In order to aid the pupil in the use of the fringe keys and to particularly indicate when a fringe key is operated, certain of these keys may be provided therein with small "pencil" lights herein referred to as fringe lights. In Phase II operation at least upper case and lower case fringe lights are employed. For example when the pupil presses the lower case shift key K146 a lower case fringe light K230 (FIGURES 3 and 4D) is lit by a circuit running from plus terminal P25 (FIG. 4F) through keyboard audio control switch K156–1,2, drum switch K155–K153, upper case lock relay switch K152–4,6 selector switch P10–33,31 and fringe light K230 to ground K211. This fringe light stays on until the upper case shift key K143 is pressed. When the upper case shift key is so pressed the circuit for the lower case fringe light K230 is broken and the circuit for the upper case fringe light K203 is completed via upper case lock relay switch K152–4,5, the circuit running from plus terminal P25 to the contact 4 of relay K152 the same as before, and from contact 5 of the upper case lock relay through selector switch P10–30,28, upper case fringe light K203 and ground K211.

As the pupil explores the keyboard in Phase II operation and hears the pronunciation of each character he learns the sound identity thereof and learns also to associate the sound identity of each character with its visual identity. The pupil continues in this second phase of instruction until he learns to pronounce the characters himself and to find the respective keys of the keyboard from the sounds of the characters. Since the pronunciation of each character requires about one second, and the keyboard is locked against any successive key depression until the automatic pronunciation of each character is completed, the pupil is limited to about 60 characters per minute at a maximum. The machine may however be set to delay the pronunciation of each character responsive to pressing a key of the keyboard so as to give the pupil time to pronounce the character himself, as taught in the Moore et al. application. No further explanation of the Phase II operation is herein necessary in view of the full description thereof in the pending Moore et al. application and the fact that the same is largely redescribed herein under the Phase III operation.

The selector switch P10 is shifted to its III position for the Phase III of instruction as well as for most of Phase IV. In Phase III the card exhibitor C is operated for the first time. Firstly, as general description, the card exhibitor accepts a card with printed matter on the front side and with an iron oxide magnetic coating on the rear side, and has a pointer means which may be of any of several different types as later described to permit a focusing of the attention of a pupil on either single letters, words, a single line or several lines. When the instructor starts the machine the pointer is advanced one interval to the first letter and at the same time the encoding head on the machine reproduces the code signal from an encode track on the back side of the card to start the keyboard audio machine to play back the pronunciation of the first letter and simultaneously to encode the respective key of the typewriter so that only that key can be depressed. The machine then awaits the pupil to depress the encoded key. The moment the pupil finds and depresses the encoded key the respective character will be typed and repronounced by the keyboard audio machine while the keyboard remains blocked, and then the pointer will move forward to the next letter on the card to repeat the encode and audio procedure above-described. An important feature of the invention is in the automatic procedure by which when the encoded key is depressed the respective character is repronounced, the machine is decoded as to that character, the pointer is advanced to the next character, and the next character is encoded to cause the keyboard audio machine to pronounce the next character and to free the respective key of the typewriter. However, in going from lower case to upper case letters, or vice versa, the upper case shift key or lower case shift key, as the case may be, is encoded and either upper case or lower case is first pronounced. When the pupil next depresses the upper case or lower case shift key the machine repronounces upper case or lower case and follows by encoding the character designated by the pointer while the pointer remains at standstill. A specific description of the apparatus under Phase III operation herein next follows particularly with reference to the schematic circuit diagrams of FIGURE 4.

When the selector switch P10 is shifted to its III position the entire system including the card machine C, the encoder E and the word audio machine W as well as the keyboard audio machine K are placed in a standby condition. As an immediate operation, the carriage return and line feed solenoid K11 (FIG. 4F) of the keyboard audio machine K is operated momentarily via a circuit which runs from plus terminal P18 through carriage return (CR) solenoid K11, selector switch P10–1,2, diode C17 (FIGURE 4A) stop reset solenoid switch C16–3,1, start-stop relay switch C15–12,10, start code switch K22–3,1 (FIGURE 4D) and selector switch P10–8,7 (FIG. 4F) to ground G. The stop reset solenoid C16 receives power at the same time from the power terminal C19 via the same circuit to ground as that for the CR solenoid K11; however, operation of the stop reset solenoid C16 is delayed for 100 milliseconds by reason of a condenser C20 connected thereacross. When the stop reset solenoid C16 is operated it opens its contacts 1, 3 to drop out the CR solenoid K11. During the 100 millisecond interval in which the CR solenoid K11 is operated it returns the carriage to home position and advances the line feed by one step in the normal way. After the 100 millisecond interval the stop reset solenoid C16 is held operated until the machine is started by pressing the start switch C27 (FIG. 4A) as is hereinafter explained.

A further immediate operation responsive to shifting the selector switch P10 to its III position is to activate a pointer delay relay P21 (FIG. 4F) from ground G over P10–7,8, code switch K22–1,3 (FIG. 4D) advance clutch solenoid switch K23–1,3, drive clutch solenoid switch K24–8,7, relay P21 (FIG. 4F) and plus terminal P25. The resultant closure of contacts 4, 5 of the pointer delay relay P21 prepares an encode start line CE26 by connecting the same also to ground G but the encode operation is delayed until the operator presses the start switch C27.

The operator next places a record card C28 in a holder C29 shown in FIGURES 7 and 8 and diagrammatically indicated in FIGURE 4A. Since the card machine may be generally of the mechanical construction described in Whitney Patent No. 3,145,268 aforementioned, a diagrammatic showing of portions of the machine as appears in FIGURE 4A is sufficient for the present purposes. The printed side of the card faces to the front and is visible through a transparent plate C30 on the front side of the card holder. The card first used in the Phase III operation may be one having randomly arranged characters of both upper and lower case as illustrated in FIGURE 6. A card eleven inches wide and nine inches high will receive 25 characters to a line and 15 lines at ½" spacing for a total of 375 characters. The back side of the card is coated with a magnetic oxide and has five prerecorded magnetic tracks at 100 mil intervals for each printed line on the front side of the card as shown in FIGURE 17. One of each group of five tracks on the back side comprises an encode track E31 bearing recorded bits according to a 6-unit binary code for each printed letter and word on the front face of the card, and the remaining tracks of each group are audio tracks W32 bearing recorded explanations of the characters and words printed on the front side. Mounted for movement crosswise of the card along the backside thereof is a magnetic head E33 (FIG. 4B) of the encoder E and a magnetic head W34 (FIG. 4E) of the word audio machine W (FIGURE 8). In each vertical positioning of the card holder the encode head E33 registers with the encode track E31 and the word audio head W34 registers with one of the word audio tracks W32 provided for the printed line then in view. In order to provide suitable spacing between the encode head E33 and the word audio head W34 at the back side of the card the audio tracks for each printed line are positioned as a group after the encode track for the next succeeding line.

The card holder C29 (FIGURES 7 and 8) is an upright U frame having grooved guide rails C35 at the sides open to the top to receive the card C28 while the card holder is in its uppermost position. When the card is fully inserted in the holder it is backed at its front side by the transparent plate C30 to support the card against the pressure exerted thereon by the encode and audio heads E33 and W34 at the back side of the card. In front of the card holder plate C30 is a masking plate C36 having a window C37 approximately one and one-half inches high and ten inches wide extending laterally of the machine. When the card holder is in its downmost position only the top line of the printed matter is visible through this window. In its next step upwardly two lines become visible and in the next further step as well as in all succeeding steps upwardly three lines are visible. However, an opaque pointer strip C38 is employed across the window which when a single character is to be exhibited at a time is provided with a single oblong hole C39 approximately one-half inch long and three-eighth inch high as shown in FIGURE 9A. The pointer strip is carried by a pointer carriage C40 which is mounted for movement crosswise of the machine. This pointer carriage is biased to home position by a spring C41 (FIGURE 4A). When the carriage is in home position the pointer hole C39 stands one step to the left of the first of the printed characters on the card, and the pointer home switch C42 is held operated by pressure of an upper lefthand protrusion of the carriage C40 against a pole member of this switch.

After the operator has inserted a record card in the holder C29, she presses a manual down switch C43 to activate a card holder motor C44 to drive the holder in a downward direction (FIGURE 4A). This operation occurs as follows: the pressing of the down switch C43 closes its contacts 1, 2 to activate a card-down relay C45 by connecting ground G (FIG. 4F) via the selector switch P10–7,8, code start switch K22–1,3 (FIG. 4D) start-stop relay switch C15–10,12 (FIG. 4A) pointer home switch C42–2,1, manual card-up switch C46–1,3, card-down switch C43–1,2, card-down relay C45 and plus terminal C47. The resultant activation of the card-down relay C45 closes its contacts 1, 2 to activate a centralizer solenoid C48 from plus terminal C49 via closed contacts 4, 5 of down switch C43, contacts 1, 2 of card-down relay C45 and to ground by the same circuit provided the card-down relay C45 above-described. Activation of the centralizer C48 withdraws a pawl C50 from a notched centralizer wheel C51 to free the motor C44 to drive the card holder down. The closing of the card-down relay switch C45–4,5 completes a circuit for the card holder motor C44 from plus terminal C52 via card stop switch C53–2,1 to one terminal of the motor, and the closing of the card-down relay switch C45–7,8 completes a circuit for the other terminal of the motor via the centralizer solenoid switch C48–2,1 and card-down relay C45–2,1 to ground G by the same circuit provided the relay C45. The card holder motor C44 is thus operated in a direction to drive the card holder down continuously until either the manual down switch C43 is released or until the motor circuit is broken by the card holder reaching its downmost position and opening the card holder stop switch C53–1,2. The centralizer wheel C51 is notched at distances corresponding to successive lines of printed matter registering with the pointer hole C39. If the manual down switch C43 is released while the holder is in an intermediate position the centralizer relay C48 is dropped by the opening of the switch C43–4,5 but a downward driving of the card holder does not stop until the pawl C50 drops into a notch of the centralizer wheel C51 to open the switch C48–1,2 and thereby drop out the card-down relay C45. When the card-down relay C45 is thus dropped it in turn opens the motor down drive circuit at C45–4,5 and C45–7,8.

In the downmost position of the card holder the uppermost line of the printed matter on the card is in line crosswise of the machine with the pointer hole C39 and the pawl C50 is in line with a notch of the centralizer wheel C51 so that when the manual down switch C43 is next released the centralizer solenoid C48 is dropped out and the pawl C50 engages the notched centralizer wheel to open switch C48–1,2 and drop out the card-down relay C45. The drop out of the card-down relay C45 closes its contacts 4, 6 and 7, 9 to prepare a motor circuit of reverse polarity for the card holder motor C44 from plus terminal C52A via centralizer switch C48–1,2 to ground C55 when the manual card-up switch C46 is next pressed.

The instant the card holder is moved from its uppermost positon a card-up end switch C54 is released to close its contacts 1, 2 both to provide a more direct connection to ground at C55 for the card-down relay C45 and the motor C44, and to prepare an up-drive circuit for the card holder drive motor C44 when the manual up-switch C46 is pressed. Also the card-up end switch C54–4,5 is opened to prevent operation now of a buzzer K56 (FIG. 4F) and of a card-up end stop relay C14 later described. Further, the card-up end switch C54–5,6 is closed to prepare drive circuits for the card machine C and encoder E by supplying current from plus terminal C49 to a common advance circuit CE57 for these two machines.

By way of example, the centralizer wheel C51 may have eight peripheral notches to move the card holder by eight printed lines in one revolution of movement. Further, the centralizer wheel may be driven at a rate of 15 r.p.m. (one-fourth r.p.s.) to move the card holder at a rate of one line per .5 second. Thus, any momentary depression of the manual down switch C43 of less than one-half second will advance the card holder by one line of printed matter on the card.

If the operator endeavors to stop a downward movement of the card holder in an intermediate position to exhibit a particular intermediate line of the printed matter but overruns that point before releasing the manual down switch C43, she will next momentarily press the manual-up switch C46. When this is done, the card holder will be driven upwardly whether or not the manual down switch C43 has already been released because when both the manual up and down switches C46 and C43 are pressed simultaneously the up switch C46 is controlling since it breaks the circuit of the down switch at C46–3,1. Pressing the manual up switch C46 activates the centralizer solenoid C48 from plus terminal C49 via manual up switch C46–2,1, pointer home switch C42–1,2, start-stop relay C15–12,10, code start switch K22–3,1 and selector switch P10–8,7 to ground G. Operation of the centralizer solenoid completes a motor circuit of reverse polarity from plus terminal C52A via C45–7,9, motor C44, C45–4,6, C48–1,2 and C54–2,1 to ground C55. The card holder is therefore driven in a reverse or upward direction until either the manual up switch C46 is released or until the card-up end switch C54–2,1 is opened by the card holder moving against this switch. In the upward driving of the card holder as well as in the downward driving thereof ,the pointer carriage C40 must be in home position, the start-stop relay C15 must be unoperated, and the keyboard audio machine K and word audio machine W must be in their home positions.

When the card holder is driven upwardly from its downmost position the card stop switch C53 is closed with no effect other than to prepare the circuit of the card holder motor C44 for driving the card holder downwardly when the manual down switch C43 is again pressed. When the card holder reaches its upper-most position a notch of the centralizer wheel C51 stands aligned with the pawl C50 to permit the centralizer solenoid C48 to drop out the instant the manual up switch C46 is released.

The present overall machine or system is started in its teaching opeartion by pressing the start switch C27 to activate the start-stop relay C15 from plus terminal C58 via start switch C27–2,1, stop switch C12–1,3 and selector switch P10–8,7 to ground G. If the operator should press this start switch while the card holder is in its uppermost or loading position the card end buzzer K56 (FIG. 4F) in the keyboard audio mechanism and the card-up end stop relay C14 (FIG. 4A) in parallel therewith are operated from plus terminal C49 through centralizer solenoid switch C48–4,6, card-up end switch C54–5,4, buzzer K56 and relay C14 in parallel, start-stop relay C15–2,1, stop switch C12–1,3 and selector switch P10–8,7 to ground G. The buzzer will thus apprise the operator of the necessity of shifting the card holder downwardly from its loading position into its exhibiting range before attempting to start the system in its teaching operation. If the start switch C27 has been so pressed before the card holder has been moved downwardly from its uppermost position the operator will next have to press the stop switch C12 to drop out the start-stop relay C15. This dropping out of the start-stop relay C15 is necessary to permit the card holder drive to be operated because the circuit for the centralizer solenoid is completed via start-stop switch C15–12,10 and this switch is closed only when the start-stop relay C15 is not operated. The effect of operating the card-up end stop relay C14 simultaneously as the buzzer K56 is operated is to open an alternative ground circuit for the start-stop relay C15 through diode C13 (provided for reasons hereinafter described) whereby to permit the start-stop relay C15 to be dropped by pressing the stop switch C12.

As a further precautionary means, the card holder must be in its operative range before either the card machine C or the encoder E can be started by pressing the start switch C27. For example, the common power circuit CE57 for the card machine C and encoder E is not connected to plus terminal C49 until the card holder has been moved out of loading position closing switch C54–5,6 and the centralizer solenoid C48 has been dropped out to engage the pawl C50 with the notched wheel C51 to close the switch C48–4,6. As will be understood, any operative position of the card holder is one placing a selected one of the printed lines on the card in alignment crosswise of the machine with the pointer hole C39.

By way of illustrative example, the first printed character in the first line of the card shown in FIGURE 6 is the lower case character 4. Let it be assumed that the pointer hole C39 is in registration with the first line and is in home position just to the left of the number 4, and that the typewriter of the keyboard audio machine K is in a lower case condition and the keyboard audio machine is stopped in home position. The pointer delay relay P21 stands operated from plus terminal P25 to ground G and the system stands ready to teach the lower case character 4 when the start switch C27 is pressed.

The operation of the start-stop relay C15 responsive to pressing the start switch C27 closes contact C15–1,2 to provide a hold circuit for the relay and to prepare a ground circuit for the buzzer K56 without however operating the buzzer since the card-up end switch C54–4.5 is now open. The closing of the start-stop switch C15–1,2 also connects ground G to a "lock line" L which leads through normally close contacts 4,6 of a decode relay K60 (FIG. 4F) to a group of encode relays later described. The closing of the start-stop relay switch C15–4,5 activates a pointer advance or drive solenoid C61 (FIG. 4A) of the card machine and an encode advance or drive solenoid E62 (FIG. 4B) of the encoder E since it completes connection of the plus terminal C49 via common power line CE57 to one side of each of these solenoids and the other sides of these solenoids are connected already to circuits running from ground G via selector switch P10–7,8, code start switch K22–1,3 (FIG. 4D), advance clutch solenoid switch K23–1,3, drive clutch solenoid switch K24–8,7, pointer delay relay switch P21–5,4 (FIG. 4F), word audio home switch W63–4,6 (FIG. 4E) and six series contact sets of encode bit relays E64–4,6 to the encode advance solenoid E62 (FIG. 4B) and over the pointer hold switch E65–9,7 to the advance solenoid C61 (FIG. 4A). Further, of immediate effect, the start-stop switch C15–10,12 is opened to drop the stop reset solenoid C16 and cause its plunger to engage the selector switch P10 to lock the same in its III position. Also, this opening of the switch C15–10,12 withdraws ground connection from the manual card down and up switches C43 and C46. The lock on the selector switch P10 may comprise a disk P10*d* connected to the shaft of the switch and provided with holes aligned with the plunger C16*p* of the stop reset solenoid respectively when the switch is in its III and IV positions as indicated in FIGURE 4A.

At this point it should be noted that the pointer delay relay P21 (FIG. 4F) has an RC delay circuit P66 comprising a condenser and potentiometer which when connected thereacross delays the operation of the relay. The relay P21 itself receives energizing current the instant its circuit is closed from the plus terminal P25 to ground G but the delayed operation of the relay withholds the closing of the contacts 4,5 for a moment to delay completion of the encode start line CE26. As a result, the next encode operation with its pointer advance is delayed according to the setting of the circuit P66. For the present this delay circuit is considered as being open as shown in FIGURE 4F. When the delay circuit is open the relay P21 is activated and dropped concurrently as the portion of the encode start line CE26 is closed and open from P21–5 to ground G via switch K24–7,8, switch K23–3,1 and code start switch K22–3,1.

Activation of the pointer advance solenoid C61 (FIG. 4A) withdraws a pawl C67 from a singly notched wheel C68 on the shaft of a pointer advance motor C69, and it closes a switch C61–1,2 to connect this motor across power terminals C70. The motor C69 drives the wheel C68 at a speed of 600 r.p.m. This wheel is connected through 4 to 1 step-up gearing C71 to a feed screw C72 to drive the latter at 2400 r.p.m. The pointer carriage C40 has a normally locked circular feed nut C73 journaled thereon which meshes with the feed screw C72 to drive the carriage through a distance of ⅜" in 100 milliseconds during each turn of the motor shaft. As is later described, the pointer advance solenoid C61 is dropped out in less than 100 milliseconds by the opening of the first of the six encode bit relay switches E64–4,6 with the result that the pawl C67 will drop back into the notch of the centralizer wheel C68 and open the switch C61–1,2 to stop the motor C69 at the end of one revolution. Thus, upon each activation of the motor C69 the pointer hole C39 is advanced ⅜". In the initial advance of the pointer hole the same is moved from its home position into registration with the first printed character 4.

As the pointer carriage C40 is advanced one step from home position the pointer home switch C42 is released into the position shown in FIGURE 4A to produce the following results: (1) to open its contacts 1,2 and remove ground connection from the manual up and down switches C46 and C43 thereby to prevent any possible manual operation of the card holder except when the pointer carriage is in home position; (2) and to close its contacts 4,5 to charge a condenser C74 from plus terminal C75 and ground C76 for the purpose of providing a power pulse to advance the pointer carriage C40 by a subsequent step as will appear.

The activation of the encode advance solenoid E62 withdraws a dog E77 from the peripheral finger of a clutch collar E78 secured at one end to a clutch spring E79 (FIGURE 4B). This clutch spring is wrapped on a shaft extension of encode motor E80 and on aligned shaft extension of feed screw E81. The encode motor E80 was started the instant the selector switch P10 was shifted to its III position, by a power circuit running from a first power terminal E82 through the motor and through selector switch P10–5,4 to a second power terminal E82. The clutch spring E79 is wound in a direction causing it to be held frictionally free of the motor shaft extension so long as the respective end of the clutch spring is held stationary by the dog E77 engaging the clutch collar E78. The instant the encode advance solenoid E62 is activated by closing switch C15–4,5 the clutch collar E78 is released to allow the clutch spring E79 to grip the motor shaft and couple it to the feed screw E81. The motor E80 drives the feed screw one revolution in 150 milliseconds, but in much less than this time, the same as with the pointer advance solenoid C61, the solenoid E62 is dropped out by the encode bit relay switches E64–4,6 to return the dog E77 in position to stop the clutch collar and disengage the clutch spring E79 when one revolution of the feed screw is completed.

An encode carriage E84 carries the encode head E33 along an encode track E31 on the back side of the card C28 (FIGURE 17). Journaled on the encode carriage is a normally locked circular feed nut E85 which meshes with the feed screw E81. The feed screw E81 has threads of such pitch that one revolution thereof will advance the encode head approximately 180 mils. This is equal approximately to one-half the distance of one step of pointer advance to permit two encodings for each printed character. This is necessary to take care of lower and upper case conditions as will appear. Since the encode head must start at approximately normal speed the encode motor E80 is kept running the full time the selector switch is in its III position. During the initial advance of the encode carriage E84 from home position the encode home switch E86 is released into a closed position, but this merely prepares a circuit for an encode reset solenoid E87 as later described.

Each encoding in the track E31 on the back side of the card comprises a prerecorded series of six blank or recorded spaces—i.e., recorded or nonrecorded bits—according to a six unit binary code for the successive characters printed on the front side of the card. For example, the code for the lower case character 4 consists of recorded bits in intervals 1, 3 and 6 and blank bits in intervals 2, 4 and 5, as shown in FIGURE 10. Each bit is approximately 20 mils long causing therefore the six bits to take up approximately 120 mils of each 180 mil interval reserved for each character. The last of the six bits is followed by a nonrecorded read out or "clutch" bit also 20 mils long and then by approximately a 40 mil "home zone." Since a 180 mil interval is traversed in 150 milliseconds, each bit is reproduced in approximately 16 milliseconds.

In an encoding process during which time the encode head E33 scans a 180 mil distance the encode bit relays E64 (FIG. 4C) are activated selectively according to the positioning of the recorded bit intervals of the code signal, and once a bit relay is activated it is maintained by a hold circuit. Thus, the encode bit relays E64 numbered I, III and VI are activated as the encode head scans the code signal for the lower case character 4. This encoding is accomplished by means of a collector arm E88 and commutator E91. The collector arm is rotated in unison with the feed screw E81 through one full revolution as the encode head E33 scans a 180 mil distance. As the collector arm starts from home position shown in FIGURE 4B it carries a brush E89 which connects a slip ring segment E90 with six commutator segments E91, in succession, marked from 1 to 6. The successive connections are made while the encode head is passing approximately the central portion of the respective bits on the record track. Since the six bits are distributed equally within the first two-third distance of a 180 mil interval on the encode track, the six commutator segments are spaced equally within a 240° interval of a full revolution of the collector arm. The commutator segments are connected respectively to the six bit relays E64, and the slip ring is connected through a normally open encode signal relay switch E92–2,1 (FIG. 4B) and a normally closed encode reset solenoid switch E87–1,3 to ground E93. The encode signal relay E92 is connected to the output of a signal amplifier E94 having its input connected to the encode head E33. Thus, during the encoding of the lower case character 4 having recorded bits at intervals 1, 3 and 6, the encode signal relay E92 will be activated momentarily to connect the slip ring E90 to ground E93 as the collector arm is passing commutator segments E91 numbered 1, 3 and 6. This means that the encode bit relays E64, numbers I, III and VI, will receive momentary ground connections and will be activated from plus terminal E95 during the encoding process. Once operated, a bit relay E64 receives permanent ground over its hold switch E64–1,2 and the lockline L running through the decode relay switch K60–6,4, (FIGURE 4F) start-stop relay switch C15–2,1, stop switch C12–1,3 and selector switch P10–8,7 to ground G.

As the collector arm E88 is moved past the clutch segment E96 the same is connected momentarily for a duration of about ten milliseconds to ground E97 (FIG. 4C). This completes a read out circuit for the logic circuitry and for the translator by supplying a momentary ground connection for a one-half revolution code clutch solenoid K98 (FIGURE 4D) to cause a momentary activation of this code solenoid from plus terminal K99, the function of which is later described.

Each of the six encode bit relays E64 has a normally closed pair of contacts 4–6 the group of which are connected serially in the encode start line CE26. As beforedescribed, the encode start line completes ground for both the pointer advance solenoid C61 (FIG. 4A) of the card machine and the encode advance solenoid E62 (FIG. 4B) of the encode machine. Thus, the first of the encode bit relays E64 to be operated will interrupt the encode start line and drop out both the pointer advance solenoid C61 and encode advance solenoid C62. In the encoding of the lower case character 4, the encode bit relay E64, number I, is activated about 10 milliseconds after the start of the encoder E. The encode start line is therefore interrupted in about 10 milliseconds after the start of the encoder E and of the card machine C to drop out the encode advance solenoid E62 and pointer advance solenoid C61 to make the same ready to disengage the encode clutch E79 after one revolution of the feed screw E81 and to stop the pointer advance motor C69 after one revolution thereof. The latest the encode start line could be interrupted would be in the case that the code signal for a character consists of only one recorded bit in the sixth interval. In that event, the encode bit relay E64, number VI, would be the one first to be activated. The interruption of the encode start line would in that event occur in about 90 milliseconds from the start of the encode operation—which is still however well prior to the completion of the 100 millisecond interval required for one revolution of the pointer advance motor C69 and is well in advance of the 150 millisecond interval required for one revolution of the encode motor E80—to assure limitation of the pointer advance motor C69 and of the feed screw E81 each to one revolution of movement. The pointer carriage is therefore limited in its advance to a single interval from one character to the next and the encoder is limited to a single corresponding 180 mil interval of advance during each encode operation.

The encoding process has two functions: (1) to unlock the key of the typewriter of the keyboard audio machine which bears the character designated by the pointer hole C39 of the card machine, and (2) to selectively activate the keyboard audio machine to pronounce that designated character. The operation by which the respective key of the typewriter is unlocked is herein next described.

The selective key unlocking is achieved by a translator mechanism shown in FIGURES 11, 12, 13 and 14, which comprises six translator solenoids K100 (FIGURE 4D), one for each bit relay E64, marked respectively from 1 to 6. Each bit relay E64 has a set of normally open contacts 7, 8 which are closed when the relay is activated. Closure of these contacts 7, 8 completes an activating circuit for the respective translator solenoid K100 running from plus terminal K99 through the translator solenoid K100, respective switch E64–8,7, clutch commutator segment E96 and ground E97, but for only the moment that the collector arm brush E89 is traversing the clutch commutator segment E96. However, such momentary operation releases a respective permutation bar K102 into an operated position. One of the keys of the typewriter is freed depending upon the combination of the permutation bars so released as next described.

There are six permutation bars K102 horizontally disposed and each differently notched along its back edge. At right angles to the permutation bars are vertically disposed seeker bars K103, one for each key lever K104 of the typewriter (FIGURE 11). Each seeker bar has an elongated forwardly extending loop at its upper end disposed below a side pin K105 on the respective key lever. At a clearance distance below the looped upper end portions of the seeker bars is a transverse frame rod K106 having guide slots K107 receiving the respective seeker bars and guiding the upper portions thereof while allowing the lower portions to be shifted forwardly and rearwardly. Connected to the seeker bars are respective tension springs K108 extending obliquely forwardly and upwardly therefrom both to hold the seeker bars in the guide slots and to maintain contact thereof with the undersides of the respective side pins in the key levers. These tension springs also bias the lower portions of the seeker bars forwardly towards the six permutation bars K102 disposed in close parallel relation crosswise of the lower portions of the seeker bars. Hinged on end portions of the frame rod K106 are the side arms of a translator bail K109 which extends transversely past the front side of the central portions of the seeker bars K103. This bail is biased forwardly by spring K110 and is controlled by a cam K111 on a code shaft K112 through contact of the cam with a roller K113 journaled on a stud at one end of the bail. This is a single lobe cam which when in a one-half revolution operated position shown in FIGURE 11 causes the translator bail to be displaced ahead of the seeker bars under influence of the spring K110 whereby to free the seeker bars to move against the permutation bars under influence of the springs K108. When the cam K111 is in a nonoperated position at 180° from the position shown in FIGURE 11 the translator bail is in a rearward position holding the seeker bars disengaged from the permutation bars.

Below the seeker bars there is a transverse blocking bail K114 having side arms pivoted on a transverse axis positioned ahead and above the cross member of the bail, the pivot for the left end of the bail being shown at K115 in FIGURE 11. The left arm of the blocking bail has a finger upstanding from its pivot axis to which a roller K116 is journaled. The blocking bail is urged clockwise as seen in FIGURE 11 by a tension spring K117 to cause the roller K116 to ride on the cam K111 at a point diametrically opposite that at which the roller K113 of the translating bail rides on the cam. When the cam K111 is in its one-half revolution operated position shown in FIGURE 11, the blocking bail K114 is held in a counterclockwise position placing the cross member of the bail directly below all seeker bars K103 then held in rearward positions as by the translator bail K109. All keys of the typewriter whose seeker bars are so blocked by the blocking bail K114 are locked against being depressed. However, upon the translator bail being in a released position and the permutation bars being shifted to free a seeker bar to move forwardly under influence of its tension spring K108, the freed seeker bar K103*a* will have its lower end displaced forwardly of the blocking bail K114 to permit the respective key of the typewriter to be depressed, as indicated in FIGURE 12.

The permutation bars K102 are biased rightwardly as seen in FIGURE 13 by respective tension springs K118 but prior to an encoding operation they stand latched in leftward positions by respective armature pawls K119 of the translator solenoids K100. Each armature pawl K119 extends along the respective permutation bar K102 and is fulcrumed at K120 near its left end. A tension spring K121 is connected to the very left end of the armature pawl to bias the armature pawl forwardly against the respective permutation bar. In the front face near the right end of each armature pawl is a transverse slot K122 engageable by a projecting tooth K123 on the respective permutation bar. Each tooth K123 has an inclined rearward face such that when the permutation bar is shifted leftwardly to an unoperated position the armature pawl K119 will snap forwardly to cause the tip of the tooth K123 to engage the slot K122 and latch the permutation bar in a leftward unoperated position. Upon any momentary energization of the translator solenoid K100 the armature pawl K119 is disengaged and the permutation bar is snapped to the right into an operated position with the tooth K123 moving past a rearwardly curved tip of the armature pawl to the right of the slot K122.

To assure that the armature pawls K119 will not be retained by residual magnetism in contact with the cores of the translator solenoid coils K100 when the permutation bars are returned mechanically to unoperated position, a release bail K124 is pivoted on a vertical axis K125 to the frame of the translator solenoid K100 and provided with an arm K126 spaced counterclockwise from the bail (FIGURE 13). The armature pawl K119 extends through the space between the bail and arm past the back side of the bail and past the front edge of the arm. The bail is lightly biased counterclockwise as it appears in FIGURE 13 by a tension spring K127. When a solenoid K100 is activated the release bail K124 has no useful function, but when a permutation bar is shifted rearwardly to a latched position in the decoding operation as later described the left side of the tooth K123 is pressed leftwardly against the release bail K124 to turn it clockwise. In this clockwise movement of the release bail the arm K126 is moved forwardly against the back side of the armature pawl K119 to release it from the core of the translator solenoid K100, should it have been held in contact therewith by residual magnetism, whereupon the pawl will be shifted forwardly into engagement with the tooth K123 under influence of the spring K121 to latch the permutation bar.

The notches in the six permutation bars are so arranged that when all the bars are in their latched non-operated positions—their rightward positions as they appear in FIGURES 11 and 14—there is no vertical alignment of the notches along any of the seeker bars to permit the lower portion of any seeker bar to be shifted forwardly by its spring K108 into a position off from the blocking bar K114 therebelow. All keys of the typewriter stand therefore blocked against being depressed. However, the notches are arranged in accordance with the binary coding for the respective characters designated on the keys of the typewriter so that when those permutation bars are released which correspond to the recorded bit intervals in the code signals for a given character, the notches in all six permutation bars will be aligned along a respective seeker bar to permit the lower end of that bar to be shifted forwardly free of the blocking bail as the translator bail K109 is released. For example, when the permutation bars K102, Nos. 1, 3 and 6 corresponding to the recorded bit intervals in the code signal for the character 4 are released the notches are aligned with respect to the seeker bar K103*a* for the key K178 having the character 4 printed thereon. Since, as before described, the translator solenoids E100, Nos. 1, 3 and 6 are momentarily activated in the encoding of the number 4, permutation bars K102, Nos. 1, 3 and 6 will be released and the seeker bar for the key K178 having 4 printed thereon will stand free of the blocking bail K114 to permit only that key to be depressed.

The latching of the keys of the typewriter by the translator mechanism is operative on the key levers of the typewriter by way of the seeker bars K103 as above explained. However, there is provided a lock for all of the keys of the typewriter which is operative directly on the key lever K104 in the manner taught by the pending Moore et al. application beforementioned. This keyboard lock comprises a locking bail K128 hinged at its lower end on a frame rod K129 and biased by a spring K130 into a position underlying the forward end portions of the key levers. (FIGURE 15). An unlock solenoid K131 is coupled to the locking bail K128 to withdraw the bail from all of the key levers and to release the same when the solenoid is activated. Upon the unlock solenoid K131 being dropped while a key lever is depressed the locking bail K128 is withheld from return movement to a locking position by the end of the depressed key lever until the depressed key lever is released.

When the one-half revolution clutch solenoid K98 (FIGS. 4D and 11) is operated it withdraws a dog K132 from a clutch collar K133 secured at one end to a clutch spring K134 (FIGURE 11). This clutch spring couples a shaft K135 to the code shaft K112 in the manner of the clutch E77–E79 before described. The shaft K135 is driven at 600 r.p.m. by the typewriter motor K180 through 3:1 step down gearing K136. The clutch collar K133 has two teeth in this instance spaced at 180° from each other. Momentary activation of the solenoid K98 of a duration less than the time required for the shaft K135 to turn one-half revolution, will cause the shaft K112 to be turned through a first one-half revolution for encoding purposes and to be then stopped.

When the machine was in standby condition the cam K111 stood in a position displaced 180° from the position it has in FIGURE 11. The translator bail K109 is then in a rearwardly operated position holding the seeker bars displaced from the permutation bars and in positions overlying the blocking bail K114. At the same time the blocking bail K114 is in a downward position indicated by dash-dot lines in FIGURE 12 to free each seeker bar so that the respective keys of the typewriter may be depressed. In the encoding of the numeral 4 the translator solenoids K100, Nos. 1, 3, and 6 as well as the clutch K98 were energized momentarily, as before-described. This selective activation of the translator solenoids released the permutation bars 1, 3 and 6 to provide a free space for forward shifting of the seeker bar K103*a* coupled to the key lever K104 for the key 4. The concurrent one-half encoding revolution of the cam K111 caused the blocking bail K114 to be moved upwardly into a blocking position and caused the translator bail K109 to be released to a forward position to allow the seeker bar associated with the key 4 to move free of the blocking bail while leaving all other seeker bars in positions blocked by the bail. The key bearing the 4 designation is therefore the only key which can now be depressed.

The code switch K22 (FIGS. 4D and 11) is controlled also by the cam K111 via the blocking bail K114 as shown in FIGURE 11. When the machine is in standby condition the code switch K22 is in its start position wherein contacts 1, 3 are closed. In the final portion of an encode operation as when the collector arm E88 passes the clutch segment E96 the clutch solenoid K98 is momentarily operated to start the cam K111 running through one-half revolution. During the ensuing 50 milliseconds the code switch K22 is moved from its start position (contacts 1, 3 closed and contacts 1, 2 open) to its stop position (contacts 1, 3 open and contacts 1, 2 closed). The opening of contacts 1, 3 holds open the encode start line CE26. The closing of contacts 1, 2 of the code switch activates the key unlock solenoid K131 (FIG. 4F) from plus terminal K137 through solenoid K131 to ground via selector switch P10–10,12, decode relay switch K60–3,1, decode relay hold line K138 (FIG. 4D), code stop switch K22–2,1 and selector switch P10–8,7 (FIG. 4F) to ground G. Thus, the encoding function of unlocking the number 4 key is accomplished. The closing of the code switch K22–1,2 also prepares a hold circuit for the decode delay K60, as will appear. The drop out of the pointer delay relay P21 (FIG. 4F) caused at the end of the encode operation by the opening of code switch K22–1,3 is of no immediate effect when the pointer delay circuit P66 is open.

The additional operation of selectively activating the keyboard audio machine K to pronounced the character designated by the pointer C39 is carried out by means of a set of six encode audio relays E140, marked I to VI (FIG. 4C). These encode audio relays are connected in parallel with the respective encode bit relays E64 and are operated simultaneously therewith. Thus, in encoding the number 4, the encode audio relays E140, Nos. I, III and VI are activated as the collector arm E88 passes the commutator segments 1, 3 and 6. Once activited, the encode audio relays are held operated by the encode bit relay switches E64–1,2. Each encode audio relay has as many sets of contacts as there are total number of characters and control functions to be encoded. Since for illustrative purposes only ten representative encode operations are herein specifically described each encode audio relay is herein shown as having a total of ten single-pole double-throw switches. These switches are marked by the numbers 1–3, 4–6, 7–9, 10–12, 13–15, 16–18, 19–21, 22–24, 25–27 and 28–30. The first number of each of these ten switches represents the pole member, the second number represents the normally open contact and the third number represents the normally closed contact. Corresponding switches of the six encode audio relays are connected serially in respective encode circuits labeled in FIGURE 4C by the character which the circuit encodes and by numbers designating the recorded bit intervals in the code signals of the respective characters. Thus, there are ten encode lines E141 with suffix letters from *a* to *j*. These encode lines are marked respectively LC the lower case, UC for upper case, Space, Carriage Return, Character, Filler, Word Audio 1 with pointer delay, Word Audio 2 without pointer delay, Projector Shift and Projector Stop. All except the word audio encode lines E141*g* and E141*h* are merged at line E148 and connected through a diode E149 to the clutch segment E96 for momentary connection to ground E97 as the collector arm E88 passes the clutch segment. The six switches in each encode line are normally open or closed according to whether the code signal for the respective character or control function has recorded or non-recorded bits in the space intervals represented by the respective switches. Thus, noting that the lower case character 4 has a code signal comprising recorded bits intervals 1, 3 and 6, the switches in the encode line E141*e* for this character, Nos. 1, 3, and 6, are open and those numbered 2, 4 and 5 are closed. Since the encode audio relays E140, numbers 1, 3 and 6 are actuated in encoding the lower case character 4, the encode line E141*e* for this character receives a through connection to ground—the only circuit so completed through the encode audio relay circuits—at the moment the collector arm E88 passes the clutch segment E96.

The encode audio lines E141*a* to E141*e* are connected to respective character or function control relays in the keyboard audio machine K to provide momentary selective activation of these relays according to the particular character and control functions being encoded, the same as when the respective typewriter keys are pressed as described in the Moore et al. application aforementioned. Since reference to this application may be had as to mechanical details the keyboard audio machine K is herein described only with reference to the diagrammatic circuit diagram shown in FIGURE 4D. The encode circuit E141*e* is connected to two character relays in the keyboard audio machine K: a lower case character relay K149 (FIG. 4F) and an upper case lock relay K150. The momentary ground fed to these relays finds a complete circuit however only through the lower case character relay K149 because we originally assumed that the typewriter was in a lower case condition—a condition obtained whenever a lower case shift relay K151 was last momentarily activated and an upper case shift relay K152 is not activated. The through circuit at the power side of the lower case character relay K149 is found via upper case shift relay switch K152–6,4, drum brush K153, drum slip ring K154, drum brush K155, keyboard audio control switch K156–2,1 and plus terminal P25.

On activation of lower case character relay K149 its contacts 1, 2 are closed to provide a hold circuit to ground K157. The advantage of diode E149 (FIGURE 4*c*) is now apparent, since it prevents ground K157 from being fed back over encode line E141*e*, contacts 7, 8 of encode bit relays E64 and through translator solenoids K100 to plus terminal K99. The opening of contacts 4, 6 of lower case character relay K149 removes a mute or "short" circuit from a magnetic head K158 which registers with a track K159 on a drum K160 bearing a recordation of the pronunciation of the numeral 4. The closing of contact 4, 5 of the lower case character relay K149 operates a keyboard lock relay K161 from plus terminal K162 to ground K163, and it activates a drum clutch solenoid K24 from plus terminal P25 through keyboard audio control switch K156–1,2, drum brush switch K155–153, drum clutch solenoid K24, time delay switch K164–8,0, character relay switch K149–5,4 and ground K163. The resultant activation of keyboard lock relay K161 is without effect at the present because its contacts 1, 3 are in an open circuit in view of selector switch P10–11,10 being now open.

The activation of drum clutch solenoid K24 engages a one-revolution clutch K166 to couple a keyboard audio motor K165 to the drum K160. The shaft of the motor K165 is driven at 60 r.p.m. to turn the drum one revolution in one second. Near the end of a revolution of rotation of the drum the same enters a home end zone wherein the brush K153 rides onto an insulating strip to drop out the drum clutch solenoid K24 and limit rotation of the drum to a single complete revolution. The resultant playback of track K159 feeds audio signals through amplifier K167 and speaker K168 to ground K169 causing the machine to pronounce the number 4.

The time delay switch K164 (FIG. 4F) has two pole members numbered 8 and 7. When this time delay switch is turned from zero position to connect pole 7 to one of contacts 1 to 6 and to connect pole 8 to its 1 contact, the circuit of the drum clutch solenoid K24 is broken at K164–8,0 and a circuit for advance clutch solenoid K23 is closed via drum brush switch K155–K153, drum clutch solenoid switch K24–6,4, solenoid K23, time delay switch K164–1,8, lower case character relay switch K149–5,4 and ground K163. Activation of advance clutch solenoid K23 closes clutch K170 to start driving advance clutch arm K171 from home position K172 against force of return spring K173. Disposed at equal intervals about the axis of the arm K171 are six commutator segments K174 connected respectively to the contacts 1–6 of pole 7 of time delay switch K164. Advance clutch arm K171 is driven for example at rate of one segment interval per second. Thus, if time delay switch K164 is set at its 1 position placing pole 7 in contact with its 1 contact, a circuit to ground for drum clutch solenoid K24 will be completed after one second delay via K164–7,1, the "one second" commutator segment K174, brush K175 of arm K171, ring K176 and ground K177. There occurs therefore a one second delay in the pronunciation of the character 4. Such delay may be provided for the purpose of giving the student time to pronounce the character himself before the automatic pronunciation is started.

When drum clutch solenoid K24 is activated the following operations occur: (1) its contacts 6, 4 are opened to drop the advance clutch solenoid K23 and disengage clutch K170 causing spring K173 to snap kack the advance clutch arm K171 to home position, (2) its contacts 1, 2 are closed to provide a continuing connection to ground at K177G for drum clutch solenoid K24 after its original ground circuit through advance clutch switch K174–176 is broken, and (3) its contacts 7, 8 are opened to disable the encode start line CE26 and prevent a succeeding encoding operation from starting until the drum clutch solenoid is dropped.

The wide notch in the drum slip ring K154 defines a so-called home end zone for the drum at the beginning of which the drum clutch solenoid K24 is dropped by the opening of the drum switch K153–155. The instant the drum clutch solenoid is dropped its contacts 7, 8 are closed to start the next encoding operation. Since an encode operation requires approximately 150 milliseconds the drum must traverse this end zone in less than that time so that when a succeeding encode ground connection is fed to one of the keyboard character or functional control relays the drum switch K153–155 will already have been closed and power will again be available from plus terminal P25 to the drum clutch solenoid K24 to start a succeeding pronunciation by the keyboard audio machine.

The opening of the drum switch K153–154 at the end of the pronunciation of the selected character 4 not only drops out the drum clutch solenoid K24 but also the character relay K149 to restore the mute on the magnetic head K158. Since at the end of an encode operation the code stop switch K22–1,2 is closed the keyboard unlock solenoid K131 (FIGS. 4F and 15) is now activated. However, as before-described, the translator blocks all the keys except the key bearing the designation 4, the character indicated by the pointer C39. Since all of the seeker bars K103 of the keys except the 4 key are directly over the blocking bail K114, the machine remains in this condition awaiting the pupil to depress the 4 key.

When the pupil depresses the 4-key, designated K178 in FIGURE 4F, it moves a cam unit K179 of the typewriter, diagrammatically indicated, in contact with the power roll to drive the type bar against the platen and to close momentarily a key lever switch K181. The cam unit K179 need not be herein described since the same is shown and described in the Moore et al. application aforementioned. The closure of the key lever switch K181 supplies ground to the character relay K149 through selector switch K156–6,5 (FIG. 4F) and selector switch P10–17,16 to ground K182. As a result the character relay K149 is operated the same as when the relay was operated from the encode start line K141*e* before explained. The keyboard audio machine is therefore operated to repronounce the character 4 responsive to depressing the key K178.

If the pupil should delay pressing the encoded key 178 for an unreasonable period it is desirable to prompt the pupil by having the machine repronounce the encoded character 4 at intervals until the pupil does press the key. This prompting action is incited by actuation of a relay K183 (FIGURE 4E) from plus terminal K184 to ground G through decode relay switch K603,1 decode relay hold line K138, code stop switch K22–2,1 and selector switch P10–8,7. Activation of the relay K183 closes its contacts 2, 1 to prepare a ground circuit K185 from the encode lines E141*a*–E141*f* to the same ground G, and it closes its contacts 4, 5 to start a clock motor K186 running. After an interval of say ten seconds the motor K186 will have driven the cam K187 through approximately one revolution to close a switch K188 to complete a ground connection for the audio character relay K149 via encode audio relay switches E140–16,18, ground circuit K185 switch K183–1,2 decode relay switch K60–3,1 code stop switch K22–2,1 and selector switch P10–8,7 to ground G. This reactivation of the keyboard audio machine causes it to repronounce the encoded character 4 in the manner hereinbefore described.

If the pupil does not press the encoded key K178 in about ten seconds—the operate interval for the clock motor above assumed—the machine will again repronounce the encoded character 4, etc.

When the pupil presses a key of the typewriter the character is typed in the usual way and the carriage is advanced by one interval. Additionally, by the circuitry provided in accordance with the invention, the encoded key is decoded and the next character on the exhibitor card C28 is encoded. By way of example, the next character shown on the card in FIGURE 5 is the dollar sign $. The dollar sign appears also on the key 4 but in the upper case position. The encoding of the dollar sign requires therefore a prior encoding of upper case to enforce the pupil to press the upper case key before pressing the dollar key.

The decoding of the lower case character 4 as the respective key is depressed is initiated by a common key switch K189 (FIGURE 4F) which is momentarily closed by a cam unit driven from the power roll of the typewriter, the same as the cam units for the respective typing bars. Closure of the common key switch K189 as a key is depressed activates the decode relay K60 from plus terminal K190 to ground through start switch C15–7,8 common key switch K189 and ground K191. The resultant closure of decode relay switch K60–2,1 provides a hold circuit for the decode relay through decode hold line K138, code stop switch K22–2,1 and selector switch P10–8,7 to ground. The opening of decode relay switch K60–4,6 opens the lockline L for the encode bit relays E64 and encode audio relays E140 to drop out these relays which stood operated—this being herein referred to as decoding the logic. The closing of decode relay switch K60–7,8 prepares a circuit for clutch solenoid K98 which would now be operated except that prior to the momentary operation of the common key switch K189 as a key of the typewriter is depressed a bail switch K192 (FIGS. 4F and 11) in series therewith is opened by the respective seeker bar K103 being pressed against a bail K193 to operate the bail switch as shown in FIGURE 11 and 12. Thus, until the depressed typewriter key is released the clutch solenoid K98 is not activated to drive the code shaft K112 through its one-half revolution of decoding movement for decoding the translator permutation bars K102. This delay in decoding the translator until the depressed key is released is to assure that all seeker bars K103 are disengaged from the permutation bars K102 before the latter are cammed back into their unoperated latched positions; otherwise, jamming of the permutation bars against the activated seeker bars would result.

When the depressed key of the typewriter is released ground K191 is connected to the clutch solenoid K98 causing activation thereof from the plus terminal K99. This ground is however prevented by diode E194 (FIGURE 4*c*) from being carried through contacts 7, 8 of the activated encode bit relays E64 to the respective translator solenoids K100 and causing the latter to be operated from the plus terminal K99. This is important since such activation of the translator solenoids could prevent the respective permutation bars from becoming latched when they are cammed back to their unoperated positions. Responsive to this activation of the clutch solenoid K98, the code shaft K112 is driven from the position shown in FIGURE 11 through one-half revolution of decode movement. The limitation to one-half revolution is due to the fact that in the initial movement of the code shaft it opens the code stop switch K22–1,2 to drop out the decode relay K60, which in turn opens its contacts 7, 8 to drop out the clutch solenoid K98. The one-half decode revolution of the code shaft K112 causes a cam K195 to drive a bell crank lever K196 counterclockwise as shown in FIGURE 14. On the lower end of this lever is a turned-over lug through which is threaded an adjusting screw K197. In response to a return spring K198 a decode bail K199 pivoted on shaft K200 is held in constant engagement with this adjusting screw. At the back end of the decode bail is a wide turned-over arm operating against catch members on the permutation bars K102. In the first portion of the one-half revolution of decode movement of the shaft K112 the cam K195 shifts the permutation bar into latched positions as shown in FIGURE 14. During the remaining portion of the one-half revolution of the decode movement of shaft K112 the lever K196 rides off the lobe of the cam K195 and the decode bail K199 is withdrawn by spring K198 from the permutation bars to permit them to be snapped selectively into operated positions during the next encode operation.

Also, during the decode movement of the shaft K112 the cam K111 pushes the translator bail K104 rearwardly to move all of the seeker bars K103 away from the permutation bars, return the code switch K22 to start position (Contacts 1, 3 closed), and to turn the blocking bail K114 clockwise to move it downwardly from the lower ends of the seeker bars whereby to free the keys from the translator. However, whether or not a key can be depressed depends on the positioning of the key lever lock bail shown in FIGURE 15.

For example, it should be noted that when the encoded key is depressed the resultant momentary closing of the common key switch K189 activates the decode relay K60 which in turn opens its contacts 1, 3 to drop the unlock solenoid K131. This releases the locking bail K128 for the key levers and causes it to be drawn by the spring K129 against the end of the operated key lever into a position standing ready to lock the entire keyboard the instant the depressed key is released. Not until a succeeding character is encoded and the code switch K22 is moved from its 3 position to its 2 position is this unlock solenoid K131 reactivated from the plus terminal K137 through the decode relay switch K60–3,1 to remove the common lock from the key levers themselves. At that instant, all of the typewriter keys except the encoded key continue to be held locked by the translator mechanism.

A decoding of the translator from the instant the clutch solenoid K98 is activated to the instant the code shaft K112 completes one-half revolution requires approximately 50 milliseconds. An encoding operation requires approximately 150 milliseconds for the encode feed screw E81 to turn through one revolution to encode the logic and requires another 50 milliseconds to drive the code shaft K112 through a one-half revolution to encode the translator.

At the end of decoding the translator the code start switch K22–1,3 is closed but the encode start line CE26 is not completed to start the encoding operation until the drum clutch solenoid K24 is dropped to close its contacts 7, 8. If the pupil releases the encoded key promptly the code start switch K22–1,3 will be closed before the switch K24–7,8 and a new encoding will start when the drum enters its home end zone. On the other hand, if the pupil does not release the encoded key promptly—i.e., until after the automatic pronunciation is completed—the start of a new encode operation is delayed until 50 milliseconds after the key is released.

If a pupil should already have learned the keyboard of the typewriter sufficiently well to depress and release the encoded key during the first pronunciation of the character designated by the card exhibitor C, the machine will go immediately after the pronunciation of the character into its decode-encode cycle without repronouncing the character. This feature permits the advanced pupil to accelerate his operation of the teaching machine. The reason the repronunciation does not take place under these conditions is that the momentary closing of the common key swtch K189 responsive to so pressing the key does not reactivate the respective encode audio relay because it stands already activated from the encode logic circuits. However, the momentary closing of the common key switch K189 as a key is so depressed activates the decode relay K60 via start-stop relay C15–7,8 whether or not the automatic pronunciation is completed to start decoding the logic, and the closing of the bail switch K192 as the key is next released activates the one-half revolution code clutch solenoid K98 to start decoding the translator. During the decoding of the translator the code stop switch K22–1,2 is first opened to drop the decode relay K60 and 50 milliseconds later the code start switch K22–1,3 is closed. Upon the drum next entering its home end zone at completion of the first pronunciation of the encoded character, the drum switch K24–7,8 is closed to activate the pointer delay relay P21 which in turn closes the switch P21–4,5 in the encode start line to start the next encode operation. Thus, by depressing the encoded key before the first pronunciation is completed and then releasing the same the advanced pupil skips the repronunciation of the character and goes immediately to the next character on the exhibitor card C28.

When the pointer is advanced from a lower case character to an upper case character, and vice versa, the machine first encodes upper case or lower case, as the case may be, and pronounces the same. The pupil must then press either the upper case or lower case shift key before the machine pronounces the character designated by the pointer, and in pressing the upper case or lower case shift key the pointer remains at standstill during the ensuing encoding operation. The encoding of upper case is herein next described.

As the code switch K22–1,3 is closed followed by the closing of the drum clutch solenoid switch K24–7,8, the pointer delay relay P21 is operated from the plus terminal P25. The resultant closing of contacts 4, 5 of the pointer delay relay supplies the encode start pulse to the pointer advance solenoid C61 of the card machine and to the encode advance solenoid E62 of the encoder E, the encode start circuit running from ground G through selector switch P10–7,8, code switch K22–1,3, advance clutch switch K23–1,3, drum clutch solenoid switch K24–8,7 pointer delay relay switch P21–5,4, word audio home switch W63–4,6 and encode bit relay switches E64–4,6 (FIG. 4E) to the encode advance solenoid E62 and from the switches E64–4,6 over the pointer hold relay switch E65–9,7 to the pointer advance solenoid C61. The other sides of the encode advance solenoid E62 and the pointer advance solenoid C61 are connected through start-stop relay switch C15–5,4, card up end switch C54–6,5 and card up solenoid switch C48–6,4 to plus terminal C49. The encode operation then proceeds in the same manner as before described in encoding the lower case character 4: i.e., (1) the pointer hole index C39 is stepped ahead one interval to expose the $, (2) the encode head E33 is advanced through a 180 mil interval to play back recorded bits in the encode track numbers 3, 4, 5 and 6 for upper case; (3) the upper case shift key K143 is encoded by the translator permitting only it to be depressed; and (4) the drum K160 is started through one revolution of movement with the head K145 unmuted and scanning track K145T bearing the recorded pronunciation of upper case. Now, however, several additional encode operations occur which are associated with upper case; i.e., (1) the keyboard audio circuitry becomes locked in upper case; (2) a fringe light E203 is lit to apprise the pupil that the upper case shift key K143 is next to be depressed; and (3) the pointer C39 is arrested over the $ on the exhibitor card C28 to enable the machine to accept the encoding of the $ without pointer movement. These latter operations are herein next described in detail.

As the encoder E plays back recorded bits at intervals 3, 4, 5 and 6 the collector arm E88 registers with the commutator segments E91 of the same numbers to activate in succesion the encode bit relays E64 and encode audio relays E140 of the same numbers. When the collector arm E88 reaches the clutch segment E96 a momentary ground connection is fed from ground E97 through diode E149, encode audio circuit E141*b* and diode K204 to upper case lock relay K152 now connected to plus terminal P25 through lower case relay switch K151–4,6 and keyboard audio control switch K156–2,1. The associated upper case relay K144 is however not yet activated because it has no connection to any power source. Activation of the upper case lock relay K152 closes its contacts 1, 2 to provide a lock circuit to ground K157 to maintain the relay operated until the lower case relay K151 is again activated. Also, activation of the upper case lock relay K152 opens its contacts 4, 6 to disconnect the power connection from all lower case character relays and it closes contacts 4, 5 to connect upper case relay K144 to plus terminal P25 but now via drum switch K153–155. Activation of the upper case relay K144 closes its contacts 1, 2 to provide a hold circuit to ground K157 and to connect also the encode audio circuit E141*b* to ground K157 so long as the upper case relay is operated. Activation of the upper case relay K144 also opens its contacts 4, 6 to remove a mute from head K145 and closes its contacts 4, 5 to start the keyboard audio drum K160 running through one revolution of motion to pronounce upper case. As the drum enters the home end zone the drum switch K153–155 is opened to drop out the upper case relay K144 and remove ground K157 from the encode audio circuit E141*b*; however, the upper case lock relay K152 stays locked in operated position because it receives power from plus terminal P25 without going through the drum switch K153–155. The diode K204 is necessary so that ground connection to the upper case lock relay K152 will not now be fed through to the upper case relay K144 and prevent it from being dropped out.

The momentary ground connection on the encode upper case audio circuit E141*b* is fed also through diode E–206, pointer light relay coil E207 and pointer release relay switch E208–4,5 to plus terminal E209. The pointer light relay E207 is therefore activated to close its contacts 2, 1 to activate the pointer hold relay E65 from plus terminal E210, and closes its contacts 4, 5 to activate a fringe light E203 from plus terminal E209 to ground E211. Activation of this fringe light is to inform the pupil that the upper case key is to be pressed.

As the pointer hold relay E65 is activated, it closes its contacts 1, 2 to provide a hold circuit over pointer release relay switch E208–7,9, start stop relay C15–2,1, stop switch C12 and selector switch P10–8,7 to ground G. Also it closes its contacts E65–4,5 to connect plus terminal E210 to pointer release relay E208 but without yet activating the same, and it opens contacts 7, 9 to disconnect pointer advance solenoid C61 of the card machine C from the encode line CE26 so that the pointer C39 will not be advanced during the next encode operation.

Upon completion of the automatic pronunciation of upper case by the keyboard audio machine the pupil is to depress the upper case shift key K143. When this is done it shifts and locks the typewriter in upper case condition in the usual way. Furthermore, it results in a series of functions similar to those performed when the key 4 was depressed (1) it causes upper case to be repronounced, (2) it decodes the logic for upper case by the common key switch K189 being momentarily closed to activate the decode relay K60 which in turn opens its contacts 4, 6 to open the lockline L, and (3) it prepares the bail lock for the keyboard by dropping the keyboard unlock solenoid K131 at its contacts 3, 1 so that when the depressed key is released the keyboard will become locked. As the pupil next releases the upper case key the following series of operations occur: (1) the entire keyboard is locked, (2) clutch solenoid K98 is activated to decode the translator for the upper case key, (3) the code switch K22–1,2 is opened to drop the decode relay K60 and prepare the lockline L, and (4) the code switch K22–1,3 is closed. When the drum clutch solenoid K24 is also dropped the encoding of the next character begins—which in the present illustrated example is the encoding of the dollar sign $.

The code signal for the $ is the same as for the lower case character 4 since both symbols are on the same typewriter key. Thus, prerecorded bits at intervals 1, 3, and 6 are reproduced by the encoder E starting the moment the encode line CE26 is completed. However, the pointer hold relay E65 now stands operated to disconnect the pointer advance solenoid C61 from the encode line with the result that the pointer C39 now stands still. Responsive to the code signalling the encode bit relays E64 and encode audio relays E140 numbers I, III and VI are operated to complete the encode audio circuit E141*e* from ground E97 to the keyboard audio machine. In this case, however, it is the upper case audio relay K150 for the $ designation that is operated through upper case lock relay switch K152–5,4, drum switch K153–155 and keyboard audio control switch K156–2,1 to the plus terminal P25. Operation of the upper case audio relay K150 closes its contacts 1, 2 to provide a hold circuit therefor, opens contacts 4, 6 to remove a mute from the magnetic head K212 registering with a track K213 bearing a prerecorded pronunciation of dollar sign, and closes contacts 4, 5 to start the drum K160 running through one revolution to pronounce dollar sign. When in the encoding operation the collector arm E88 reached the clutch segment E96 the translator solenoids E100, numbers 1, 3 and 6 were also momentarily activated to release the respective permutation bars and therefore unlock the key bearing the 4 designation; also, the clutch solenoid K98 is activated through diode E194 to drive the code shaft K112 through its one-half revolution of encode movement. This operation of the code shaft releases the translator bail K109 from the seeker bars K103 to permit the seeker bar for the key with the $ designation to engage the permutation bars and become thereby unlocked, raises the blocking bail K114 into blocking position to block all other seeker bars, and opens code switch K22 at its 1, 3 contacts and closes the same at its 1, 2 contacts. The machine now waits for the depressing of the key with the $ designation.

To back-track to the point where the encode start line CE26 was connected to ground to start the encoding operation, the pointer release relay E208 was at that point also activated from plus terminal E210 through diode E214 and the encode start circuit to ground G. Activation of this relay closed contacts E208–2,1 to provide a hold circuit to ground via the lockline L so long as pointer hold relay E65 is operated. However, ground connection via the lockline L is prevented from being fed back to encode start line CE26 by reason of the diode E214. Also, activation of the pointer release E208 opened its contacts 3, 5 to drop out the pointer light relay E207 and extinguish the fringe light E203, and it shifted its contact 7 from contact 9 to contact 8 but without immediately dropping the pointer hold relay E65 because (1) the drop out of this relay is delayed by a diode E215 connected thereacross and (2) the shift in circuit from the lockline L to the encode start line CE26 maintains a ground connection to the pointer hold relay E65 for the duration of the encode pulse—which is from the time the encode start line CE26 was first closed until the time the first of the encode bit relays E64 is activated to open its 4, 6 contacts, a time ranging from 10 to 96 milliseconds as before explained. The benefit in so delaying the dropping out of the pointer hold relay is to delay the next pointer advance until the encoding is completed. When the pointer hold relay E65 is dropped it opens its contacts 4, 5 to drop the pointer release relay E208 and it closes its contacts 7, 9 to return connection of the pointer advance solenoid C61 of the card machine C to the encode line so that when the next encode start pulse is supplied the pointer will be advanced. The drop out of the pointer release relay E208 is of no immediate effect.

When the pupil presses the key K178 with the $ designation while the machine is in upper case, the machine will repronounce dollar sign and the pointer will advance to the next character. Since the next character is the lower case letter *a* the machine will first automatically pronounce lower case, the same as when going from the lower case number 4 to the upper case $ designation the machine first pronounced upper case. The typewriter remains locked in upper case for the moment but in the encoding of lower case which followed the release of the key with the $ designation, the lower case shift key K146 is freed to permit only that key to be depressed. Thus, the pupil is enforced as a next operation to press the lower case shift key and return the typewriter to lower case condition. For instance, as the key K178 with the $ designation is pressed the logic for the $ designation is decoded by the common key switch K189 being closed momentarily to operate the decode relay K60 which in turn opens the lockline L to drop out the encode bit and encode audio relays as well as to drop the keyboard unlock solenoid K131 so that the entire keyboard will be locked as soon as the pupil releases the dollar key. When the key is released the bail switch K192 is closed to start the clutch solenoid K98 and cause the code shaft K112 to move through its one-half revolution of decode movement whereby to move the translator bail K109 to disengage the seeker bars K103 from the permutation bars K102, lower the blocking bail K114, return the permutation bars to their unoperated positions and open the code switch K22–1,2 to drop the decode relay K60 and prepare the lockline L for the subsequent encoding operation. The ensuing closure of code switch K22–1,3 following 50 milliseconds thereafter closes the encode start line CE26 as soon as the drum K160 enters into its home end zone to start the subsequent encoding of lower case.

The encoding of lower case is similar to the encoding of upper case above described and results in the following operations: (1) the encoder E is operated to encode the logic for lower case which is to activate the encode bit relays E64 and encode audio relays E140, numbers II, III, V and VI whereby to complete the encode audio line E141*a* to ground and activate the lower case relay K151. Operation of this relay closes its contacts 1, 2 to provide a hold circuit to ground, opens its contacts 4, 6 to drop the upper case lock relay K152 and return the typewriter circuitwise to lower case condition, opens contacts 7, 9 to remove a mute from the magnetic head K225, and closes contacts 7, 8 to start the magnetic drum K160 to cause the head K225 to scan a prerecorded track K226 and pronounce lower case. Simultaneously, with the encoding of the logic of the translator solenoids E100 numbers 2, 3, 4, 5 and 6, the clutch solenoid K98 is activated the instant the collector arm E88 reaches the clutch segment E96 to encode the shift key K146 for lower case and to close the code switch K22–1,2. Further, the momentary ground connection on the encode circuit E141*a* activated a pointer light relay E228 through diode E229, pointer release relay switch E208–4,5 and plus terminal E209. Operation of the pointer light relay in turn activated pointer hold relay E65 and fed power to fringe light K230 to apprise the pupil that the typewriter is now in lower case condition. Operation of the pointer hold relay E65 opens contact 7, 9 to disconnect the pointer advance solenoid C61 of the card machine C from the encode start line for the purpose of arresting the pointer advance during the next encoding operation, and it closes contacts 4, 5 to prepare a circuit for the pointer release relay E208.

Upon the pupil next pressing the lower case shift key K146 the machine repronounces lower case, operates the decode relay K60 to open the lockline L and drop out the encode bit and audio relays. Upon the pupil next releasing the lower case shift key the clutch solenoid K98 is activated to drive the code shaft K112 through its one-half revolution of decode movement which decodes the translator and closes the code start switch K22–1,3. When the drum K160 reaches its home end zone the encode start line CE26 is completed to start the encoder E but not the card machine C so that the next character *a* is encoded while the pointer C39 remains at standstill. The machine therefore pronounces *a*. The activation of the pointer release relay E208 during the encoding of the letter *a* drops the pointer hold relay E65 at the end of the encode pulse. As a result, when the key *a* is next pressed and released not only will the machine proceed first to repronounce the letter *a* but the pointer will advance to the next letter *r*, will encode that letter to pronounce the same, and will encode the key *r* to permit only that key to be depressed.

In phase III operation the word audio machine W may also be encoded to explain letters, words and sentences at the appropriate times. For this purpose a print card with characters and interspersed words may be used as shown in FIGURE 16. It is desired now to use the pointer strip C38*b* having an oblong pointer hole C39*b* one line high and one line long with an index indicator I at the forefront, as shown in FIGURE 9*b* so that the pupil will see cumulatively the successive characters as the pointer carriage is advanced along the line.

Let it be assumed that a sequence of characters following an upper case character, say the dollar sign $ hereinbefore considered on the exhibitor card is as follows: A nonprint space interval, lower case letter *w*, lower case letter *e*, nonprint space, and some succession of other leters, etc. A first space interval sets off the preceding character from those following. If the preceding group of characters does not spell a word it is desirable to proceed through the space interval as though it were a normal character. For example, when the pointer is advanced over the space interval, the machine would pronounce "space" and encode the space key, and when the pupil next presses the space key the machine would repronounce space and the pointer would advance to the next character.

The second space interval in the above sequence of characters on the exhibitor card is different from the first space interval in that it sets off a preceding group of letters spelling the word "we." The present machine is designed in such instance to arrest the pointer and to activate the word audio machine W to pronounce and explain the word just spelled. Since a space interval can be treated in only one way as far as manipulation of the typewriter keyboard is concerned—which is to press and release the space key—the present machine is designed so that when the pointer is advanced to a space interval it will always at first be arrested at that interval but when the space key is pressed and released the pointer arrest will be dropped automatically with the use of a "filler" code and in the next encode operation the pointer is advanced to the next character. On the other hand, if it is desired that the word audio machine W be brought into operation to explain a preceding word or character when the pointer is advanced to the space interval the pointer arrest is dropped at the end of the encoding of the word audio machine and the pointer is advanced to the next character in the normal way after the word or character explanation is completed by the word audio machine and the word audio machine is decoded.

To step back now to the point where the pointer stands over the $ and the machine has already pronounced that character and awaits the depression of the dollar key, it will be seen that when the pupil presses the dollar key K178 the keyboard audio machine K repronounces dollar sign and decodes the logic for the $ responsive to the common key switch K189 activating the decode relay K6 which in turn opens the lockline L and drops the encode bit and encode audio relays which stood operated at this time. Also, the keyboard unlock solenoid K131 is dropped leaving the key lever locking bail standing ready to lock all of the keys as soon as the dollar key is released. When the dollar key K178 is next released the bail switch K192 is closed to activate the code clutch solenoid K98. This starts the code shaft K112 through one-half revolution of decode movement to decode the translator for the dollar key by swinging the translator bail K 109 rearwardly to free all of the seeker bars K103 from the permutation bars K102, returning the operated permutation bars to their latched unoperated positions, lowering the blocking bail K114 to inoperative position, opening the code switch K22–1,2 to drop the decode relay K60 and prepare the lockline L, and closing the code switch K22–1,3 50 milliseconds later to prepare the encode start line CE26.

When at the end of the pronunciation of the $ the drum enters its home end zone, the drum clutch relay K24 is dropped to close the encode start line CE26 and start the encoding of space. This encoding takes place in the next ensuing 150 milliseconds but before this period is elapsed the drum has traversed its home end zone and the drum switch K153–155 stands closed to provide a plus terminal connection to the audio space relay K216 next to be operated. At this point it is important to note that the audio space relay is connected through drum switch K153–155 and keyboard audio control switch K156–2,1 to the plus terminal P25 both when the typewriter is lower case and upper case conditions. Therefore, the machine will encode space whether or not it is in lower case or upper case condition.

The encoding of space is as follows: (1) the encode head plays back a recorded bit at the interval 3 to encode the logic by activating the encode bit relay E64 and the encode audio relay E140 each number III. This encoding of the logic completes a momentary ground connection through the encode line E141*c* to the audio space relay K216 to operate the same. Operation of this relay closes its hold contacts 1, 2 and switches its contact 4 from contact 6 to contact 5 to unmute a magnetic head K217 registering with a track K218 bearing a prerecorded pronunciation of space and to activate the drum clutch solenoid K24 to start the keyboard audio machine running through one revolution of drum movement. The machine therefore follows by pronouncing the word space.

Further, during the encoding of the logic for space the translator solenoid K100, number 3, and the code clutch solenoid K98 (FIGS. 4D and 11) are activated as the collector arm E88 passes the clutch segment E96. The resultant one-half revolution of encode movement of the code shaft K112 releases the seeker bar K103 for the space key K219 into engagement with the permutation bars K102 to permit only the space key to be next depressed, and it shifts the code switch K22 from contact 3 to contact 2. Also, the momentary ground connection provided on the encode line E141*c* activates a pointer light relay E220 (FIG. 4B) through diode E221, pointer release relay switch E208–4,5 and plus terminal E209. This in turn activates the pointer hold relay E65 and brings power to a fringe light K222 to light the same and apprise the pupil that the mahcine is now encoded for space. Operation of the pointer hold relay E65 closes its contacts 4, 5 to prepare the circuit for the pointer release relay E208 and opens its contacts 7, 9 to disconnect the pointer advance solenoid C61 from the encode start line CE26 so that the pointer will remain at standstill during the next encode operation.

Upon the pupil next pressing the space key K219 the typewriter carriage is advanced one interval, the machine repronounces space and the decode relay K60 is activated to decode the logic for space by dropping the encode bit relay E64 and encode audio relay E140, each number III. Upon release of the space key K219 the keyboard is again locked, the code clutch solenoid K98 is activated to decode the translator and close the code start switch K22–1,3. When at the end of the repronunciation of space the drum K160 enters its home end zone the encode start line CE26 is completed to start the encoder E but not the card machine C because the pointer hold relay E65 is now opearted. The momentary ground connection on the encode start line however activates the pointer release relay E208 to connect the pointer hold relay E65 through its contacts 7–8 to the encode start line CE26. The encoder E follows by advancing the encode head E33 along a portion of the encode track having a recorded bit at interval 4—the selected filler code—while the pointer remains at standstill. This operates the encode bit relay E64, number IV, to open the encode start line CE26 and drop the pointer hold relay E65. When the collector arm E66 reaches the clutch segment E96 the filler encode line E141*f* is completed to ground E97 to activate a filler lock relay K223 from a plus terminal K224 and to activate the code clutch solenoid K98 momentarily to start the code shaft K112 through one-half revolution of encode movement. However, no keys of the typewriter are now encoded because the encode line E141*f* is not connected to the keyboard audio machine. There is therefore no pronunciation of any character and the keyboard remains locked. In 50 milliseconds after the code clutch solenoid K98 was activated the code stop switch K22–1,2 is closed to operate immediately the decode relay K60 because the filler lock relay switch K223–5,4 is now closed. The decode relay opens the lockline L to decode the logic for the filler code and simultaneously to reactivate the code clutch solenoid K98 momentarily to start the code shaft K112 running through its one-half revolution of decode movement. In this decode movement of the shaft K112 there is no decoding of the translator because the translator had not been encoded by the filler code. Instead, the decode movement of the shaft K112 serves now only to open the code stop switch K22–1,2 to drop the decode relay and 50 milliseconds later to close the code start switch K22–1,3 to start immediately the next encode operation.

In the foregoing encode-decode operation of the filler code the encoder E encodes the logic in approximately 150 milliseconds, and the code shaft K112 moves then through successive one-half revolutions of encode and decode movements in the next 100 milliseconds, because there is no pronunciation or key operation, to drop the pointer arrest in approximately 250 milliescconds.

As just explained, the filler code is used only to drop the pointer arrest. However, if the filler code is encoded without the pointer standing arrested, it serves to advance the pointer one step without playback of any character and without unlocking the keyboard. Thus, successive encodings of the filler code will serve to step the pointer ahead at a rapid rate of about four steps per second.

In the next encode operation the pointer is advanced to the letter *w* and the encoder E is started to move the encode head E33 through another encode interval. However, since the letter *w* is a lower case letter and the typewriter has been left in upper case condition from having last handled the upper case character, the $, the machine will next encode lower case and pronounce the same in preparation for the subsequent encoding of the letter *w*. In encoding lower case, the encode bit relay E64 and the encode audio relays E140 of numbers II, III, IV, V and VI are operated to complete connection of lower case relay K151 to ground E97 via encode line **E141*a* the instant the collector arm E88 registers with the clutch segment E96, as before described. Lower case relay K151 has connection to plus terminal P25 at this instant and is therefore operated to start the drum running to pronounce lower case. Also, as the logic is so encoded for lower case, the translator solenoids K100, numbers 2, 3, 4, 5 and 6 are activated as is also the code clutch solenoid K98 the instant the collector arm E88 registers with the clutch segment E96 to encode the lower case shift K146**. The typewriter still remains in upper case condition but now only the lower case shift key can be depressed.

A further operation which occurred in the encoding of lower case, as before described, is that the initial ground pulse on the encode line **E141*a* activated the pointer light relay E228 through diode E229, pointer release relay switch E208–4,5 and plus terminal E209. The pointer hold relay E65 is therefore operated from plus terminal E210 through contacts 1, 2 of pointer light relay E228, and the fringe light E230 is operated from plus terminal E209 through pointer release relay switch E208–5,4 and pointer light relay switch E228–5,4 to apprise that the keyboard audio machine is encoded for lower case. Operation of the pointer hold relay E65 opens its contacts 7, 9 to disconnect the pointer advance solenoid C61 from the encode start line so that the pointer is arrested during the next encoding. The machine now awaits the pupil to depress the lower case shift key K146**.

As the pupil presses the lower case shift key K146 the lower case relay K151 (FIG. 4F) is reactivated to cause the machine to repronounce lower case. Also, the common key switch K189 is momentarily closed to activate the decode relay K60 via start-stop relay switch C15–8,7 to drop the logic for lower case. Next, on release of the lower case shift key K146 the code clutch solenoid K98 is activated via decode relay switch K60–7,8 and bail switch K192 to drive the code shaft K112 through a one-half revolution of decode movement to decode the translator for lower case and to close the code start switch K22–1,3. When after the repronounciation of lower case the drum K160 enters its home end zone the encode start line CE26 is grounded to start the encoder E but not the card machine because the pointer hold relay E65 now stands operated. However, the pointer release relay E208 is next operated through the encode start line to drop the pointer hold relay at the end of the encode start pulse, thereby conditioning the machine for a pointer advance during the next succeeding encode operation.

In the next succeeding encode operation the keyboard audio machine is encoded for the letter *w* to cause the machine to pronounce that letter and to free only the *w* key to be depressed. When the pupil next depresses and releases the *w* key the machine repronounces the letter *w*, decodes the logic and translator for that letter, advances the pointer C39 to the next letter *e* and pronounces that letter, leaving now only the *e* key free to be depressed. When the pupil next depresses and releases the *e* key the machine repronounces the letter *e*, advances the pointer to the space interval and pronounces space. However, in the encoding of space the pointer light relay E220 is operated to activate the pointer hold relay E65 and the fringe light K222, so that in the next encoding operation the pointer will remain at standstill. These encode-decode operations follow the same sequence as hereinbefore specifically described with respect to prior characters specifically shown.

When the pupil next presses the space key K219 the machine repronounces space and decodes the logic therefor by activating the decode relay K60, and as the pupil releases the space key K219 the machine repronounces space and decodes the translator for the space key. In the next encoding operation which automatically follows, the word audio machine W (FIGURE 4E) is started to advance the head W34 along a word audio track on the back side of the exhibitor card so that the machine will pronounce and explain the word we. When the head W34 reaches the end of its travel it starts a decoding of the word audio machine, advances the pointer to the next character and encodes the next character in the usual way, as herein next described.

The code signal for the word audio machine is recorded bits in intervals 4, 5 and 6. As the encoder E feeds these bits through the encode commutator the encode bit relays E64 and relays E140, numbers IV, V and VI are activated to complete connection of the encode line **E141*g* to ground E231—which is a permanent ground lasting until the decoding of the logic for the word audio machine is next completed. The ground connection on line E141*g* now operates word relay solenoid W232 from plus terminal W233. Operation of the word relay solenoid W232 engages a pawl W234 with a worm wheel W235 journaled on a carriage W236 and meshing with a feed screw W237. Operation of the word relay solenoid W232 also opens its contacts 1, 3 to remove a mute from word audio head W34 and closes contacts 4, 5 to connect a power source W238 across drive motor W239 connected directly to feed screw W237. Also, word relay solenoid W232 opens its contacts 7, 9 without any immediate effect and closes contacts 7, 8 to connect a condenser W240 in a charge circuit from plus terminal W241 to ground W242 also without immediate effect. However, as the result of the above control operations a drive of word audio head W34 is started from left to right along a word audio track at the back side of the exhibitor card. The head W34** is moved preferably at a rate of about one inch per second to require a period of about ten seconds to scan the length of the word audio track. The carriage is so driven against the force of a return spring W243 connected between the same and the frame W244.

The whole drive system of the word audio machine, consisting of the motor W239, feed screw W237 and carriage W236 is mounted on a vertically movable plate W245 which is spring loaded downwardly by a spring W246. This plate has thereon a rack W247 engaged by a pinion W248. The pinion W248 is driven by a motor W249 through a shaft having thereon a centralizer wheel W250 provided with a single peripheral notch W251. The notch is engaged normally by a pawl W252 which is disengaged when a carriage-up solenoid W253 is activated, a single revolution of pinion W248 shifts the plate W245 by 100 mils—the distance from one word audio track to the next on the back side of the exhibitor card.

As the word audio carriage W236 is driven to the right it releases the word audio home switch W63 closing its contacts 1, 2 with no immediate effect and opening its contacts 4, 6 to break the encode start line CE26 until the word audio carriage is returned home. In the movement of the word audio head along the first word audio track it may play back a statement such as "You have just spelled the word 'we'. You use the word 'we' to include yourself and any other person with whom you may be talking or playing." At the end of this statement the carriage W245 closes the end switch W254. This operates the decode relay K60 from plus terminal K190 to ground W254*g*. As the decode relay operates it obtains a holding circuit through its contacts 1, 2 via code switch K22–1,2. Also, operation of the decode relay opens contacts 4, 6 to open the lockline L and decode the logic for the word audio machine, and closes contacts 7, 8 to activate the code clutch solenoid K98 to start the drive of the code shaft K112 through its one-half revolution of decode movement. This decode movement of the shaft K112 has no effect on the translator since the word audio code does not correspond to any key on the typewriter; it does however open the code switch K22–1,2 to drop the decode relay when the carriage W236 has been snapped back home and it thereupon closes the code switch K22–1,3 to prepare the encode start line CE26 for a succeeding encoding operation.

The decoding of the word audio logic withdraws ground from the word relay solenoid W232 to drop out the same. As the word relay solenoid W232 is dropped out it disengages the pawl W234 to unlock the wormwheel W235 and start the snap back of the carriage to home position. Also, the dropping out of the word relay solenoid W232 closes its contacts 1, 2 to return the mute on the word audio head W34, opens its contacts 4, 5 to stop the motor W239, and shifts contact 7 from contact 8 to contact 9 to discharge the condenser W240 through diode W255 and carriage-up solenoid W253. The pulse of current which thus flows through the solenoid W253 withdraws the pawl W252 from the centralizer wheel W250 and closes its contacts 1, 2 to complete a connection of the carriage drive motor W249 across power source W256 through contacts 4, 6 of a carriage down relay W257 (FIGURE 4*c*). As soon as the motor W249 starts turning the pinion W248, the switch W253–1,2 is held closed by the pawl W252 riding on the periphery of the centralizer wheel nothwithstanding that the pulse of current from the condenser W240 through the solenoid W253 has now subsided. The carriage-up motor W249 is thus kept running until the pawl W252 again drops into the peripheral notch W251 to open the switch W253–1,2. The motor thus drives the pinion W248 through one revolution to shift the plate W245 by 100 mils—the distance between two successive word audio tracks. As the plate W245 is thus shifted one track distance from its lowermost position a word audio first track switch W258 is closed but with no effect other than to prepare an end switch for limiting a subsequent downward movement of the plate W245 as later described. Also, the opening of the carriage end switch W254 at the start of snap back of the carriage is without immediate effect since this operation occurs faster than the opening of the code switch K22–1,2 responsive to the operation of the decode relay and the decode relay therefore stays operated via the code switch K22–1,2 until this switch is opened in the decoding operation.

When at the end of the decode operation the code switch K22–1,3 is closed—which occurs in 50 milliseconds—and the carriage W236 has been snapped back to home position—which occurs in about 200 milliseconds—the word audio home switch W63–4,6 is closed to complete the encode start line CE26 and to start the next encode operation. The succeeding encoding operation of the logic of the next character, the letter *y*, requires about 150 milliseconds. Thus, in approximately 400 milliseconds from the the end of the explanation of the word audio machine the keyboard audio machine is encoded to pronounce the next character *y*. This time period can however be delayed as later described. Note that when the letter *y* is next pronounced by the keyboard audio machine the word audio head W34 is registering with the second of the four word audio tracks at the back side of the exhibitor card for the printed line of characters and words with which the pointer index I is now registering.

When the pupil has heard and typed the next succession of letters separted by space intervals, say the word you as shown in FIGURE 16, the word audio machine can again be brought automatically into operation to pronounce and expalin that word. Because of the limited space for word audio tracks on the back side of the exhibitor card for each printed line on the front side thereof, four words or characters can be so explained per printed line.

When the word audio head W34 has scanned the fourth word audio track of any group of word audio tracks corresponding to a printed line on the front side of the exhibitor card and the head has returned to home position, the machine is next encoded for "carriage return." The code signal for "carriage return" comprises recorded bits in intervals 3, 5 and 6 as indicated in FIGURE 4*c*. As the encoder E moves the encoder head E33 along the portion of the encode track bearing this recorded code signalling, the encode bit relays E64 and encode audio relays E140 numbers III, V and VI are operated to complete a connection to ground E97 of encode audio line E141*d* the instant the collector arm E88 passes the clutch segment E96. At the same time the code clutch solenoid E98 and translator solenoids E100, numbers III, V and VI are activated to encode the carriage return key K260. This causes the carriage return solenoid K11 to be activated from plus terminal P18 (FIGURE 4F). Operation of solenoid K11 pulls down the carriage return key K26 through a coupling K261 diagrammatically shown. By this mechanical operation of the carriage return key the typewriter carriage is returned and the line feed is advanced one interval.

Concurrently as the carriage return solenoid K11 is activated a pointer reset solenoid C262 (FIGURE 4A) is activated from plus terminal C263 and the encode reset solenoid E87 is activated from plus terminal E264 both through selector switch P10–2,1 and the encode line E141*d*. These activations release the carriages for the card machine and the encoder to cause the same to be snapped back to home positions by the respective springs C41 and E265. Although the keyboard unlocked relay K131 is now also activated through diode K266 and the encode line E141*d* the keyboard remains locked because of the keyboard lock raceway and the fact that the CR key K260 is now depressed.

Also, concurrently as the CR relay K11 is activated the word audio down relay W257 (FIGURE 4C) is activated from plus terminal W257*a* via the carriage return encode line E141*d*. Contacts 1, 2 of the relay W257 are thus closed to provide a hold circuit to ground W258*a* through the first track switch W258. Contacts 4, 6 are opened to prevent the motor W249 from now running and contacts 7, 8 are closed to operate the word audio up solenoid W253 from plus terminal W241 to ground W253*g*. The resultant withdrawal of the pawl W252 without the motor W249 running causes the spring W246 to snap down the entire drive system and bring the word audio head in position to register with the first of the four word audio tracks corresponding to the next printed line with which the pointer index I is now registering. The downward movement of the drive system into its downmost position opens the first track switch W258 to drop out the word audio down relay W257 which in turn drops out the word audio up solenoid W253.

As the carriage return key K260 is pulled down by the solenoid K11 it closes key lever switch K268 to connect one side of the carriage return audio relay K269 through keyboard audio control switch K156–6,5 and selector switch P10–17,16 to ground K182 to activate the same from plus terminal P25 through the drum switch K153–155. Operation of the relay K269 closes its hold contacts 1, 2 and shifts contact 4 from contact 6 to contact 5 to remove the mute circuit on magnet head K270 and to start driving the drum through one revolution of movement. Although the magnetic head K270 thus scans the track K271 prerecorded with the pronunciation of carriage return no pronunciation now takes place because when the selector switch P was shifted into position III the head K270 was permanently muted from ground K272 at one side through the CR mute line K273 and selector switch P10–8,7 to ground G at the other side. The momentary closure of the common key switch K189 as the CR key K260 is pulled down activates the decode relay K60 to open the lockline L and decode the carriage return logic but not yet the translator because the bail switch K192 is still held open by reason of the carriage return key being held down.

When the pointer reset solenoid C262 was activated it received a hold circuit through its contacts 1, 2 and contacts 5, 4 of the pointer home switch C42. Likewise, the encode reset solenoid E87 received a hold circuit over its contact 4,5 and the encode home switch E86. The ground received through these hold circuits is fed to the carriage return solenoid K11 and the key board unlock solenoid K131 to hold the same operated until the carriages of the card machine and the encoder are returned home. When the pointer home switch C42 is operated by return of the pointer carriage C40, its contacts 1, 2 are closed but with no immediate effect because the start-stop relay switch C15–10, 12 is open. Contacts 4, 5 of this home switch are opened and contacts 5, 6 are closed to connect the charge condenser C74 across the card up solenoid C48. The resultant momentary operation of the card up solenoid C48 withdraws the pawl C50 from the centralizer C51 and starts the motor C44 over the card up end switch C54–2,1. Operation of the card up solenoid C48 opens contacts 4, 6 to prevent any immediate encoding. Line feed of the exhibitor card by one interval results because of the pawl C50 riding on the periphery of the centralizer wheel C51 and then falling into the next notch. When both the card carriage and encode carriage are returned home the carriage return solenoid K11 and the unlock solenoid K131 are dropped to release the carriage return key K260 and to close the bail switch K192.

The closing of the bail switch K192 activates the code clutch solenoid K98 to start the code shaft K112 running through its one-half revolution of decode movement whereby to decode the translator. In this decode operation the code switch K22–1,3 is closed to prepare the encode start circuit for the next encoding operation—which will start the instant the drum K160 enters its home end zone.

From the foregoing explanations it will be apparent that when the machine is encoded for carriage return (1) the carriage of the typewriter is returned to home position and the line feed advanced one step, (2) the carriage for the card machine is returned to home and the card holder is raised one step, (3) the carriage for the encoder is returned home and (4) the carriage for the word audio head is returned home and the drive system mounting plate W245 is dropped so that the head W34 will register next with the first word audio track corresponding to the printed line on the front side of the exhibitor card with which the pointer index I is now registering. Also, it will be apparent that a carriage return can be initiated automatically at any point in the feed of the pointer C39 of the card machine by prerecording the code signals for carriage return at the desired point in the encode track.

The encode track may be recorded to activate the keyboard audio machine K and the word audio machine W in different timing relations with respect to the presentation of the printed material to fulfill different instruction objectives. One such objective is an oral test of character pronunciation. In carrying out this oral test, the pointer arrest and word audio machines are activated when the pointer has been advanced to a new character. After the word audio machine has made a statement such as "Can you name this letter before you type it . . . (pause) . . . now type" the keyboard audio machine is encoded automatically to pronounce the letter and to free the respective key of the typewriter, and the pointer arrest is dropped. When the pupil depresses the encoded key the keyboard audio machine repronounces the character and automatically thereafter the pointer is advanced to the next character and the whole process is repeated. A print card for this oral test has four characters per line as shown in FIGURE 18 since there are provisions for only four word audio tracks on the back side of the card per printed line on the front side as shown in FIGURE 17.

In the oral test of pronunciation, standby and start operation of the machine are the same as before described. However, the word audio machine W is now encoded as the pointer is advanced to a new character from a new encode line E141*h* connected through a diode W275 to the encode line E141*g* running to the word audio machine W and connected through a diode E276 to the pointer hold relay E65 so that this relay will also then be operated. Since the code signals employed for the word audio machine do not correspond to any key of the typewriter the keyboard is held locked by the permutation bars of the translator. In this case the code for the word audio machine may comprise recorded bits in all six intervals as indicated in FIGURE 4C. Thus, upon starting the machine by pressing the start switch C27 the pointer is advanced from the left-hand non-print margin to the first character *m* (FIG. 18) and, at the same time, the encoder E feeds out recorded bits at all six intervals causing all of the encode bit relays E64, encode audio relays E140 and translator solenoids E100 to become operated. Contacts 22, 23 of the encode audio relays are thus closed to complete connection of the encode line E141*h* to ground E231, which in turn activates the word relay solenoid W232 to start the word audio machine in the same manner as before described. As the word audio head is moved to the right it scans the first word audio track to make a statement such as is mentioned in the preceding paragraph. Since the keyboard was blocked during the entire operation of the word audio machine the pupil is forced to listen. When the word audio machine has completed its explanation the end switch W254 is closed by the word audio carriage W236 to operate the decode relay K60 which in turn opens the lockline to decode the logic (drop out all encode bit and encode audio relays as well as all translator solenoids) and to activate the code clutch solenoid K98 immediately to decode the translator since both the bail switch K192 and the code switch K22–1,3 stand closed. The decoding of the logic drops out the word relay solenoid W232 to start snap back of the word audio carriage W236, stop the drive motor W239 and activate the motor W249 to move the word audio head upwardly to the second word audio track. When at the end of the decode operation the code switch K22–1,3 is closed and the word audio carriage W236 is returned home to close the word audio home switch W63–4,6 the encode start line CE26 is ready to start the next encode operation.

During the encoding of the word audio machine just described the pointer hold relay E65 was operated from plus terminal E210 through diode E276 (FIG. 4C) and encode line E141*h* via contacts 22, 23 of the encode audio relays E140 to ground E231. In the next encode operation the logic for the letter *m* is encoded causing the keyboard audio machine to pronounce the letter *m* and the translator for the letter *m* is encoded permitting the *m* key to be depressed, both in the usual way, but with the pointer remaining at standstill. In all, only about 400 milliseconds elapses from the time the word audio machine finishes saying "now type" until the key *m* is encoded. The machine then waits for the pupil to depress the *m* key. Since the encoding of the keyboard audio machine follows after the operation of the word audio machine there is no double pronunciation or command as to the letter *m*. When the pupil depresses the *m* key the keyboard audio machine re-pronounces this letter and decodes the logic therefor, and when the pupil releases the *m* key the translator is decoded, the keyboard is blocked and the code switch K22–1,3 is closed. If the drum K160 has entered its home end zone by the time the code switch K22–1,3 is closed the next encoding starts immediately. If the next letter were also a lower case letter the machine would proceed as just explained—i.e., the word audio machine would be encoded to pronounce and/or explain the letter while at the same time operating the pointer hold relay, the keyboard audio machine would then pronounce the letter and the respective key of the typewriter would be encoded, and when the pupil next presses and releases the corresponding key the letter would be repronounced and the pointer would advance to the next character.

However, as shown in FIGURE 18, the next letter is the upper case or capital A. In this case the encode operation following the advance of the pointer to the capital letter A again first encodes the word audio machine and arrests the pointer, and the word audio machine then operates to say for example "This is a capital letter. You will have to shift the typewriter to upper case condition before you can print it. Wait for the machine to say 'upper case'." When the word audio carriage is snapped back to home position the encoder E encodes upper case while the card machine is at standstill, and the pointer release relay E208 (FIG. 4B) is operated to drop the pointer hold relay E65. However, the pointer release relay is dropped only momentarily because about 150 milliseconds later ground connection appears on the upper case encode line E141*b* to operate the pointer light relay E207 and hold relay E65, thus again preparing the pointer arrest. The encoding of the keyboard audio machine causes it to pronounce upper case and to free the upper case shift key K143. The pupil then depresses the upper case shift key K143 and releases the same causing the machine to go through its decode-encode cycle leading to an encoding of the keyboard audio machine to pronounce the letter A and to a freeing of the respective key of the typewriter but in this decode-encode cycle the pointer arrest is dropped. When the pupil next depresses the key A the machine repronounces this letter, the pointer is advanced to the next letter and the word audio machine is encoded to explain that letter. Thus, in this instance the pointer has been held arrested for three successive operations.

In another form of instruction the order of presentation may be one best adapted to teach the pupil the distinction between capital and small letters. As shown by the print card of FIGURE 19 a nonprint space precedes each letter. When the pointer is advanced to the nonprint space the encoder activates the word audio machine to make a statement such as "Upper case 'A' and lower case 'a' both sound alike; now type upper case 'A'." In 400 milliseconds thereafter the pointer is advanced over A and the keyboard audio machine is encoded to pronounce upper case, free the upper case key, activate the upper case fringe light and activate the pointer arrest. When the pupil depresses the upper case shift key the pointer stays on the letter A, the pointer arrest is however dropped, the fringe light goes out and the machine follows automatically by encoding the keyboard audio machine to pronounce the letter A and to free the upper case key A. When the pupil depresses and releases the A key the machine repronounces A, the pointer is advanced to the next non-print space and the word audio machine is activated to say "Now type small letter 'a'." In 400 milliseconds thereafter the pointer is advanced over *a* and the keyboard audio machine is encoded to pronounce lower case, free the lower case key, activate the lower case fringe light and activate the pointer arrest. When the pupil depresses the lower case key the pointer stays over small letter *a*, the lower case fringe light goes out, the pointer arrest is dropped and the machine follows automatically by encoding the keyboard audio machine to pronounce "small letter a" and to free the lower case key *a*. When the pupil depresses and releases the *a* key the machine repronounces "small letter a," the pointer is advanced to the next nonprint space and the word audio machine is encoded to say "now we go to the first character on the next line." In 400 milliseconds the pointer jumps to the next succeeding nonprint space and carriage return is encoded to (1) drop the word audio carriage from the third to the first word audio track, (2) return the pointer to home position and to advance the card holder one interval, (3) snap the typewriter carriage to home and advance the line feed, and (4) return the encode head to home position.

The encode track may be fruther recorded with suitable code signals not corresponding to any key of the typewriter to activate selectively the encode lines E141*i* and E141*j*. Only by way of example, the code signal for the encode line E141*i* may be recorded bits at intervals 5 and 6 and for the encode line E141*j* a recorded bit only at interval 6. These encode lines are connected to the lead E148 for connection to ground E97 as the collector arm E88 traverses the clutch segment E96. Upon the encode line E141*i* being completed a projector shift-start relay E281 is activated from plus terminal E282 and, at the same time, the filler lock relay K223 is activated from the plus terminal K224 via a diode E283, the diode being only for the purpose of preventing the relay E281 from being activated when the filler encode circuit E141*f* is completed. Activation of the relay E281 shifts a projector E284 and starts the same running. The activation of the filler lock relay K223 starts the decoding of the machine in the manner before described. After the projector has been so started it may be stopped by a code signal from the encode track which will complete the encode line E141*j*. When the encode line E141*j* is so completed, a projector stop relay E284 is activated from a plus terminal E285 to close a circuit in the projector to stop the same. Again, as before, the filler lock relay K223 is activated via a diode E286 to start the decode operation. Thus, the projector can be started and maintained running for any suitable duration by a suitable hold circuit, and can be stopped at any time, both by suitable code signals from the encode track, to provide a suitable visual supplement to the audio pronunciation and explanation from the keyboard audio and word audio machines.

It has already been described how the time delay switch K164 may be set to a number off from zero to produce a corresponding number of seconds delay in the pronunciation of a character after the pointer has advanced thereto, and again there will be the same delay in the repronounciation of the character after the pupil presses the key bearing that character. However, if the pupil has mastered the identification of all keyboard characters but is still slow in finding the proper key on the keyboard, then a delay of repronunciation is no longer desirable. A delay in the first pronunciation of the next character may still however be desirable in order to set apart better the pronunciations of successive characters. Such delay of only the first pronunciation of a character is accomplished by setting the time delay switch K164 to zero and by moving the potentiometer of the pointer delay network P66 to a suitable resistance setting to provide, for example, a two second delay in the operation of the pointer delay relay P21. Thus, when the clutch solenoid K24 is dropped out by the drum entering into its home end zone and the code switch K22–1,3 is closed, the pointer delay relay is activated from the plus terminal P25 through drum clutch switch K24–7,8, advance clutch switch K23–3,1, code switch K22–3,1 and selector switch P10–8, 7 to ground G, but since the condenser P66c and resistor P66r are connected in parallel with the coil of the pointer delay relay the relay will be delayed about two seconds before it is operated. When the pointer delay relay P21 does operate its contacts 4, 5 are closed to complete the encode start line CE26 and start the card machine C as well as the encoder E.

The keyboard audio control switch K156 is of the two-pole three-position type. In its first position shown in FIGURE 4F, full keyboard audio operation is obtained as before described—i.e., a first pronunciation is provided when a new character is encoded and a repronunciation of the character follows when the encoded key is depressed. In the second position of the keyboard audio control switch wherein contacts 1, 3 and contacts 5, 7 are closed, the circuit for activating the drum clutch solenoid K24 from the plus terminal P25 is maintained but the ground connection to the key lever switch is removed so that there is obtained a first pronunciation of a character following the encoding thereof but no repronunciation following the depressing of the encoded key. The elimination of the repronunciation speeds up the use of the machine for pupils advanced to the point where a repronunciation is no longer desirable. In the third position of the keyboard audio control switch wherein contacts 1, 4 and contacts 5, 8 are closed, the power circuit from the plus terminal P25 to the drum clutch solenoid K24 is also broken so that there is now also no first pronunciation of the characters indicated by the pointer.

The word audio machine may be used also for explaining both words and sentences. If the sentence is confined to a single printed line on the exhibitor card it may contain a maximum of three words since the fourth word audio track reserved for the printed line is used to explain a sentence. The end of a sentence is signified by a period and two spaces. Preferably, a pointer strip having an index I midway the length of a long oblong hole of the height of a single printed line and of twice the length of the card is used as shown in FIGURE 9C so as to expose continuously the entire sentence past which the index is advanced. The pupil is thus trained to focus on a single character although the whole sentence is in view.

After the pupil has mastered a short single line sentence a pointer strip C38d may be used having a long oblong window of twice the length of the card and of a height equal to three printed lines as shown in FIGURE 9D. The window is made of transparent film material K277 on which is printed the index I at an intermediate point one line up from the bottom. This system permits extension of the length of a sentence to eleven words over three printed lines—i.e., four words in each of the first two printed lines and three words in the third line in which the sentence ends. The pointer system thus exposes whole printed lines in succession and exposes the entire sentence of these lines when the word audio machine explains the same. This pointer system further trains the power of the pupil to concentrate on a single character and then on a whole sentence of several lines length when the whole sentence is explained.

At the end of a sentence the machine first encodes the period and then pronounces the same, and a pupil must follow by pressing the period key before period is repronounced and the pointer is stepped to the next space interval and the character space is encoded and pronounced. However, as the pointer moves to the next space interval the pointer hold relay E65 is operated. When the pupil next depresses the space key the machine pronounces space, the pointer remains at stand-still, and the word audio machine is encoded through encode line E141g. The word audio machine then explains the period as well as the sentence. Immediately following the operation of the word audio machine the pointer is advanced to the second space interval, the carriage return key is encoded and pulled down and the machine pronounces carriage return. In the ensuing carriage return operation the carriage of the typewriter is snapped back and the line feed is advanced, the carriage of the card machine is snapped back and the card holder is raised one line, the carriage of the word audio machine is snapped back and the drive mounting plate W245 is dropped, and the carriage of the encoder is snapped back. The entire system is therefore ready to proceed along the next printed line on the card.

The machine can be stopped at any time by the instructor pressing the manual switch C12 but a number of conditions must be fulfilled to stop the machine properly. These conditions will be better understood by reviewing briefly the decode-encode cycle of the machine starting from the point where the machine stands in an encoded condition awaiting the pupil to depress the released typewriter key. In this condition of the machine the code switch K22–1,2 is closed to prepare the decode circuits and the code start switch K22–1,3 is open.

When the pupil depresses and releases the encoded key the machine goes automatically through a decode-encode cycle and returns to its normal condition to await the pupil to depress the next encoded key. In the automatic decode-encode cycle, the decoding of the logic occurs as the encoded key is depressed (code stop switch K22–1,2 remaining closed) and the translator is decoded as the encoded key is released. In decoding the translator the code stop switch K22–1,2 is opened and the code start switch K22–1,3 is closed within a 50 millisecond interval. When both the code start switch K22–1,3 is closed and the drum K160 enters its home end zone to drop out the drum clutch solenoid K24, the next encoding begins automatically causing the logic relays E64 and E140 to be operated in succession according to the recorded bit intervals of the new signal code and causing the translator solenoids K100 and the one-half revolution clutch K98 to be operated simultaneously when the collector arm E88 reaches the clutch segment E98. In the 50 millisecond interval following the instant one-half revolution clutch K98 is operated the translator is encoded and the code switch K22 is moved from its start position wherein contacts 1, 3 are closed to its stop position wherein contacts 1, 2 are closed. The machine then stands again in this condition awaiting the pupil to depress the key last released by the translator.

In the automatic decode-encode cycle triggered by pressing the encoded key the time that the code switch K22–1,3 is closed is only transitory for an interval ranging from about 1000 to 200 milliseconds depending on whether the pupil immediately releases the depressed key at the start of the repronunciation or releases it after the repronunciation is completed.

In the process of stopping the machine responsive to the instructor pressing the stop key C12, it is desirable that the carriage return be operated so that the pupil will start next on a new line. Also, it is necessary that the pointer carriage C40 and the encode head carriage E84 be returned home simultaneously as the typewriter carriage is returned, and that no new encoding be started while the carriage return key is depressed. Since the translator cannot be decoded—i.e., the permutation bars cammed back—while the carriage return key is operated it follows that the translator must be decoded before the carriage return key is operated. Further, no up or down operation of the card holder should occur until the end of the stop operation. These conditions are fulfilled as follows:

When the instructor presses the stop switch C12 its contacts 1, 3 are opened (1) to disable the start switch C27 because of it being connected serially therewith, and (2) to withdraw ground from the start-stop relay C15 and drop the same provided the alternate ground connection for the relay through the code switch K22–1,3 is then open. If the code switch K22–1,3 is closed the instructor must hold the stop switch pressed until the code switch K22–1,3 is opened. If it were possible to drop out the start-stop relay C15 by depressing the stop switch C12 when the code switch K22–1,3 is closed the carriage return solenoid K11 would be immediately activated from the plus terminal P18 through the solenoid K11, selector switch P10–1,2, diode C17, stop reset solenoid switch C16–3,1, start-stop relay switch C15–12,10, code switch K22–3,1 and selector switch P10–8,7 to ground G. If this should occur while the code shaft K112 is running through its one-half revolution of encode movement the carriage return key would be pulled down while the permutation bars are being released and mechanical jamming of the seeker bar for the carriage return key against the blocking bail K14 would result. An exception to this jamming possibility would occur when the stop switch C12 is pressed while the code switch K22–1,3 is closed and the card holder is in its loading position because then the machine is already stopped in decoded condition. Under these conditions one terminal of the card up end stop relay C14 is connected to plus terminal C49 through card up end switch C54–5,4 and the other terminal is connected to ground G through the lockline L to cause the relay C14 to be operated and its contacts 1, 3 to be held open to break the alternate ground connection for the start-stop relay C15 through the code switch K22–1,3 and permit start-stop relay C15 to be dropped as soon as stop switch C12 is pressed.

As the start-stop relay C15 is dropped, (1) its contacts 1, 2 are opened to prevent reactivation of the start-stop relay except by pressing the start switch C27 after the stop switch C12 is released, (2) its contacts 4, 5 are opened to prevent any possible encoding, (3) its contacts 7, 9 are closed to activate the decode relay K60 over the code switch K22–1,2, it having already been pointed out that this switch will be closed as a result of the code switch K22–1,3 being forced to be open when the stop operation is initiated, (4) its contacts 7, 8 are opened to prevent the momentary operation of the common key switch K189 as the carriage return key 160 is pulled down from reactivating the decode relay K60, and (5) its contacts 10, 12 are closed to prepare the circuit for operating the pointer reset solenoid C262, and the encode reset solenoid E87 when the code switch K22–1,3 is closed at the end of the decode operation.

Operation of the decode relay K60 decodes the logic by opening the lockline L and at the same time actuates the clutch solenoid K98 to decode the translator since the bail switch K192 is now closed. At the end of the decoding of the translator, the code switch K22–1,3 is closed to operate the pointer reset solenoid C262 from plus terminal C263 and the encode reset solenoid E87 from the plus terminal E264, each through a circuit to ground G via diode C17, stop reset solenoid switch C16–3,1, start-stop relay switch C15–12,10, code switch K22–1,3 and selector switch P10–8,7. Moreover, the closing of the code switch K22–1,3 activates the carriage return solenoid K11 from plus terminal P18 and the keyboard unlock solenoid K131 from the plus terminal K137 through a circuit to ground via the selector switch P10–10,11, diode K266, selector switch P10–1,2 and thence through diode C17 and the same switches as for the reset solenoids. When the pointer reset solenoid C262 is operated it obtains a hold circuit over pointer home switch C42–4,5 and when the encode reset solenoid E87 is operated, it obtains a hold circuit over the encode home switch E86. Each of these hold circuits remains until the carriages for the card machine and for the encoder reach home. Moreover, these hold circuits apply also to the carriage return solenoid K11 and the keyboard unlock solenoid K131 to hold the same also operated until the carriages for the card machine and the encoder are returned.

Also, when the code switch K22–1,3 is closed the stop reset solenoid C16 is activated but with a delay of 100 milliseconds because of it being shunted by the condenser C17. As long as the machine remains in stop condition this stop reset solenoid remains activated. Operation of the stop reset solenoid opens its contacts 3, 1 to release the carriage return solenoid K11 and to decode carriage return in the translator. Also, operation of the stop reset solenoid C16 withdraws the latch from the selector switch P10. This feature enforces the machine being left in a decoded condition before the selector switch can be shifted from one position to another. The latch applies, however, only to positions 3 and 4 of the selector switch. The selector switch P10–7,8 serves the purpose of permitting the machine to be started only when the selector switch P is in positions 3 and 4. Reversely, a shifting of the selector switch from position 1 or 2 to position 3 or 4 results in operation of carriage return and line feed advance on the typewriter through the delayed action of the stop reset solenoid C16 as before explained. This is very desirable since in Phases I and II the pupil may have let the typewriter with the carriage out of home position.

As the pointer home switch C42 is operated by return of the pointer carriage to home position, its contacts 1, 2 are closed to render the card holder drive again operable by the down switch C43 and card up switch C46. As before described, the card holder drive is operable by the card down switch and card up switch only when the pointer is in home position, the start-stop relay C15 is dropped and the code switch K22 is in its start position (contacts 1, 3 closed). When both the pointer and encode carriages are in home position, the hold circuits to ground for the carriage return solenoid K11, keyboard unlock solenoid K131, carriage pointer reset solenoid C262 and encode reset solenoid E87 are broken.

In position IV of the selector switch P10 the prior switch connections hereinbefore described are maintained and in addition, contacts 34, 35 and contacts 37, 38 are closed. The closure of contacts 34, 35 results in the connection of a VOR relay W278 (FIGURE 4E), across the output of the word audio amplifier W279. The closure of contacts 37, 38 has the effect of connecting the normally closed contacts 1, 3 of the VOR relay W278 from ground P280 to the decode relay K60 via contacts 1, 2 of the word audio home switch, which is a circuit in parallel with the connection to ground W254–G through word audio end switch W254. As a result, if there is a considerable pause of several seconds in the signals being picked up from the word audio track, the VOR relay W278 is dropped out to connect the decode relay K60 to ground and start a decode operation the same as were the word audio carriage W236 to reach the end of its travel where it closes the end switch W254. In the normal prerecording of the word audio tracks a pause of several seconds is provided to give the pupil time to pronounce the character himself. For example, the playback by the word audio machine may say "you have now heard the letter *a*. Can you pronounce it?" Then after several seconds pause it would say "Now type." In position 4 of the selector switch P, pauses in the reproduced text are utilized to start the decode-encode cycle. Thus if the word audio text is considerably shorter than ten seconds, the time required to scan a complete track, the machine is shifted a moment after the text ends into decode-encode without waste of time. This is especially desirable for advanced pupils who would find such pauses would be boring and would slow up their learning processes, particularly since the keyboard is locked during operation of the word audio machine and there is nothing the pupil can then do. For example, the VOR relay W278 may duplicate the decode action of the word audio end switch W254 whenever the playback voice pauses longer than a very short time, say 250 to 400 milliseconds. Thus, the essential part of the word audio text for the advanced pupil would be prerecorded with no pauses longer than 250 to 400 milliseconds. The text following the longer pauses would be needed for the less advanced pupil. Thus, when the selector switch P is in position IV, only the essential portions for the more advanced pupil are played back and then the machine is immediately decoded and the pointer advanced to the next character.

From the foregoing description it will be apparent that the present educational system and apparatus incorporates the following significant features:

(1) To automatically exhibit and pronounce a character on the keyboard of a typewriter while abling the key corresponding to that character (encoding the corresponding key) and leaving the remaining keys of the keyboard in a disabled condition;

(2) To cause a light to appear in or in proximity to some keys of the keyboard, e.g. upper case, lower case, etc. when the key is encoded;

(3) To cause a character to be pronounced responsive to manually operating an encoded key after the first pronunciation is completed and to cause the keyboard to be disabled during the period of the repronunciation;

(4) To start a decode-encode operation responsive to release of an encoded key and to maintain the keyboard blocked during the decode-encode operation until the new character is exhibited and the pronunciaton thereof is started;

(5) To eliminate the repronunciation of a character the encoded key is depressed and released before the first pronunciation of the character is completed and to cause a new decode-encode operation to start responsive to such operation of the encoded key while again maintaining the keyboard blocked until a new key is encoded and the character corresponding to the newly encoded key is exhibited and the pronunciation thereof is started;

(6) To cause the pronunciation of an encoded character to be repeated at preset time intervals until the corresponding key is depressed;

(7) To provide an exhibitor which can be preset whereby (*a*) only single characters are exhibited sequentially, (*b*) successive characters of a single line are exhibited accumulatively; (*c*) a single line of characters is rendered visible in its entirety and a pointer is moved along successive characters of the line, and (*d*) two or more total lines of characters are rendered entirely visible and a pointer is moved along successive characters of one line and then the next;

(8) To provide optionally pointer movements depending upon the codes used for the encoding of specific characters so as to produce either (*a*) a one step pointer advance while encoding and freeing a key for manual operation, (*b*) an encoding and freeing of a key for manual operation with the pointer remaining over the previously exhibited character, (*c*) a one step pointer advance while the total keyboard remains blocked, (*d*) the playback of word-audio while the pointer remains over a previously exhibited character and the total keyboard remains blocked, or (*e*) the projection of a picture while the pointer remains over a previously exhibited character and the total keyboard remains blocked.

(9) To provide an encoding for space so that responsive to the manual operation of the space key a word audio playback occurs while the pointer remains over the space interval and the keyboard remains blocked to signify the separation of two words, and so that after completion of the word audio playback the pointer is advanced one step and the key corresponding to the newly exhibited character is encoded and freed for manual operation;

(10) To specifically provide for such encoding of space that the pointer is arrested over the space interval and so that responsive to operation of the space key there occurs an automatic encoding of a filler code which will not require manual operation of any key but will decode itself, drop the pointer arrest and cause the pointer to advance one step during a next ensuing encode operation while keeping the total keyboard blocked during the encode-decode operation of the filler code, all of the foregoing taking place in fast sequence so that there is no appearance of the pointer being held over the space interval after the space key is released;

(11) To specifically provide for such encoding of word audio-playback and/or projector activation which will always self decode these codes and encode the next character or operation without pointer movement;

(12) To specifically provide for the encoding of a filler code which immediately thereafter decodes itself and encodes a subsequent character while advancing the pointer and keeping the total keyboard blocked during encode-decode operation of the filler code;

(13) To provide for an adjustable time delay in the subsequent advance of the pointer after a key has been operated and to keep the keyboard blocked during such delay;

(14) To provide a selective means either (*a*) to automatically pronounce a character as soon as the same is exhibited and to repronounce the same as soon as the corresponding key is manually operated, (*b*) to automatically pronounce a character as soon as the same is exhibited but not to repronounce the same when the corresponding key is operated, (*c*) to pronounce an exhibited character only when the corresponding key is operated, or (*d*) to forego all pronunciation of an exhibited character and provide only for the freeing of the corresponding key, whereby to provide an increasing speed of learning as the pupil's abilities advance while keeping all other functions such as key-encoding and pointer movement unaffected.

The embodiment of our invention herein particularly shown and described is intended to be illustrative and not necessarily limitative of our invention. For example, we have herein described a complete system of audio visual instruction in conjunction with the encoding of a typewriter keyboard comprising an exhibitor, keyboard audio machine, word audio machine, projector and encoder. It will be understood however that the invention comprehends the use of subcombinations of the system as well as the individual components insofar as such combinations and components are novel over the prior art. Further, in describing our invention we have shown a normally blocked keyboard for the typewriter and an encoding means for freeing a key to be depressed when the key is encoded. In a broader sense it will be understood that the keyboard may be normally in a disabled condition by each of the keys being either blocked or uncoupled from the mechanism it is to control and that a key may be abled or encoded by being either unblocked or coupled so as to perform its intended function when it is depressed. Thus, alternatively, all the keys may be depressible at all times but only an encoded key would be coupled to perform its function when the key is depressed. In construing the claims the term "blocked" is intended as meaning that the key is blocked against performing its intended function either by actual mechanical blocking or by mechanical or electrical uncoupling, and the terms "freed" and "unlocked" are intended to mean that the key can be depressed and when depressed it performs its intended function. Such and other modifications and variations of the invention are herein next set forth according to the following claims.

We claim:

1. A teaching machine comprising an electric typewriter having a keyboard with characters designated on the respective keys, a reproducing machine including a prerecorded record, means for selectively activating said reproducing machine to pronounce said respective characters, an exhibiting machine having a record medium, pointer means and means for shifting said pointer means relative to a mounted record medium to designate successive characters printed thereon, means for supplying power to said machine including a selector switch having an "off" position and successive phase positions: a Phase I position for supplying power only to said typewriter, a Phase II position for supplying power to both said typewriter and said reproducing machine, and a Phase III position for supplying power concurrently to said typewriter, reproducing machine and exhibiting machine, an electromechanical means associated with the key levers of said typewriter and controlled by said activating means for blocking the entire keyboard when all the keys are released and the reproducing machine is running, and means controlled by said selector switch for disabling said keyboard blocking means when said switch is in said Phase I position and for abling said blocking means when said switch is in its Phase II and Phase III positions.

2. The teaching machine set forth in claim 1, wherein said typewriter includes a power operated carriage-return and line feed mechanism, and means responsive to placing said selector switch in said Phase III position for activating said carriage return and line feed mechanism.

3. The teaching machine set forth in claim 1, including a manual start switch operable when said selector switch is in its Phase III position to start said pointer shifting means of said exhibiting machine, and means responsive to operating said manual start switch for locking said selector switch in its said III position.

4. A teaching machine comprising a pointer means, a reproducing machine, drive means for advancing said pointer means, an encoder including a record having a track prerecorded with code signals, a head for scanning said track to reproduce the code signals, drive means for advancing said head and means responsive to the code signals from said head for selectively activating said reproducing machine, each of said drive means including releasable clutch means, spring means for returning said pointer means and head to home positions when the respective drive means are released, solenoids for releasing said clutch means respectively, manual means for activating said solenoids, respective hold circuits for said solenoids including switches closed by activation of the respective solenoids, means connecting said hold circuits in parallel, a home switch for said pointer means, a home switch for said encode head, and means connecting both of said home switches in said hold circuits respectively for dropping said solenoids only when said pointer means and encode head are both returned home.

5. A teaching machine including a card exhibiting machine having a card holder, means mounting said card holder for movement in one direction from a card loading position into an exhibiting range of travel, a pointer means, means mounting said pointer means for movement in another direction to indicate particular items on said card, drive means for stepping said pointer means, reproducer means selectively activatable for pronouncing and/or explaining items on said card indicated by said pointer means, an encoder including a prerecorded encoding track and an encode head movable along said track, drive means for advancing said encode head, and a common start circuit for both of said drive means to cause said encode head to be advanced in coordination with the movement of said pointer means for picking up control signals and selectively activating said reproducer means, said common start circuit including a preparation switch means operable by movement of said card holder from said loading position to render said start circuit operable to start said drive means.

6. The combination set forth in claim 5 wherein said reproducer means includes means effective upon each activation of the reproducer means to cause the reproducer means to run for a predetermined interval and stop, including a control switch means in said start circuit controlled by said reproducer means to enable said start circuit to be reactivated when said reproducer means has completed its run interval.

7. The combination set forth in claim 5 wherein said reproducer means includes a character pronouncing machine and a separate word audio machine each having a head movable relative to a cooperating record medium and means effective when the machine is activated to cause the machine to run for a respective predetermined interval and return the head to home position, and switches in said start circuit controlled by said reproducer means to enable said start circuit to be activated only when the heads of both said character pronouncing machine and said word audio machine are in respective home positions.

8. The combination set forth in claim 5 including a manual start means operable to close said start circuit when said card holder is in its exhibiting range of travel, a signal warning means, and switch means in the circuit of said signal warning means controlled by said card holder and manual start means for activating said warning means upon said manual start means being pressed while said holder is in loading position.

9. The combination set forth in claim 5 including a start-stop relay having normally open switch means connected in said start circuit, manual start and stop switches for activating and deactivating said start-stop relay, reversible drive means for moving said card holder from a loading position into its exhibiting range and in the reverse direction, and a manual control circuit for said reversible drive means including switch means controlled by said start-stop relay for enabling said card holder to be driven only when said start-stop relay is in stop position.

10. The combination set forth in claim 5 including drive means for moving said card holder transversely of the direction of movement of said pointer means, wherein said card has items printed on successive lines parallel to the direction of movement of said pointer means and said holder drive means includes a peripherally notched centralizing wheel, a pawl for engaging said notches to locate said lines respectively in registration with said pointer means and a switch controlled by said pawl for deactivating said holder drive means when said pointer means is in registration with a printed line on said card, and a second switch controlled by said pawl and connected in said start circuit for preparing the latter for activation also only when said pointer means is in registration with a printed line on said card.

11. In a teaching machine having means for holding a sheet medium: the combination of a sheet medium in said holding means having printed matter on successive horizontal lines at one side thereof and having a prerecorded control track and at least one word-audio track at the other side thereof for each printed line, pointer means for designating selected elements of said printed matter, a magnetic head registering with and mounted for movement along said control track for the printed line designated by said pointer means, and another magnetic head registering with and mounted for movement along the word audio track for said designated printed line, said control and word audio tracks being arranged so that the word audio track for one printed line is juxtaposed to the control track for another printed line whereby greater spacing therebetween is obtained to avoid mechanical interference between said control and word audio heads.

12. The teaching machine set forth in claim 11 wherein said sheet medium has a plurality of word audio tracks for each printed line, said word audio tracks for each printed line being disposed along one another and the group of word audio tracks for one printed line being along the control track for another printed line, and a carriage for said word audio head, and means for shifting said carriage to bring said word audio head into registration selectively with any one of the word audio tracks corresponding to the printed line designated by said pointer means.

13. In a teaching machine: the combination of a typewriter having a keyboard with characters and/or control operations designated on the respective keys and means for typing characters and/or performing control functions as the respective keys are depressed, means normally blocking all the keys of said typewriter, key unlocking means selectively activatable to relase the respective keys of said typewriter from said blocking means, a reproducer selectively activatable to pronounce the respective characters designated on said keys, control means movable to a start position to activate said reproducer to pronounce a preselected character, and means responsive to a selective operation of said control means for activating said unlocking means to free the respective key of the typewriter from said blocking means.

14. The combination set forth in claim 13 including means responsive to pressing said freed key and releasing the same for reactivating said reproducer to repronounce said character and for releasing said unlocking means to restore said keyboard to its normally blocked condition.

15. In a teaching machine: the combination of a typewriter having a keyboard and means for typing characters as the respective keys are depressed, a key lever blocking bail, a keyboard unlock solenoid for withdrawing said blocking bail from said key levers, a translator mechanism including a set of permutation bars normally positioned to cause all of the keys of said keyboard to be blocked and shiftable into selective combination positions to free respective keys from said blocked condition, an encoder for selectively shifting said permutation bars into said selected combination positions, means for activating said encoder, and means operated by said encoder for activating said keyboard unlock solenoid.

16. In a teaching machine: the combination of a typewriter having a keyboard with characters and/or control operations designated on the respective keys and means for typing characters and/or performing control functions as the respective keys are depressed, a keyboard blocking means comprising a blocking member and a seeker bar interposed between each key and said blocking member; an encoder comprising a prerecorder record having for each character a selected code signal comprising a series of recorded and unrecorded bits according to a binary code, and an encode head movable to reproduce said code signals; a series of translator solenoids of a number equal to the bits in a code signal; means for activating the respective translator solenoids corresponding to said recorded bits as said head is moved to reproduce the code signal for a respective character, spring means urging each seeker bar into a position free of said blocking bail; a translator bail normally holding said seeker bars in blocking positions; a series of spring-urged permutation bars latched in unoperated positions and releasable respectively by said translator solenoids, said permutation bars extending crosswise of said seeker bars and having surfaces confronting the seeker bars which are notched according to said binary code to block release of all of said seeker bars from said blocking member when the permutation bars are all in latched unoperated positions and to open a path for release of a seeker bar corresponding to a key of said keyboard when the permutation bars are released corresponding to the recorded bits in the code signal for the character on said key; and means for releasing said translator bail after reproduction of each code signal.

17. In a teaching machine: the combination of a typewriter having a keyboard and means for typing characters and/or performing control functions as the respective keys are depressed, means normally blocking said keyboard, an exhibitor having a medium with characters thereon and a pointer for designating the respective characters, means for advancing said pointer, and an encoder operated responsive to each pointer advance into a respective encoded condition for unlocking the key of said typewriter corresponding to the character designated by said pointer.

18. The combination set forth in claim 17 wherein said medium has a succession of printed lines, including means for moving said medium to bring selected printed lines in registration with said pointer means, means for decoding said encoder after the same has been moved into an encoded condition, and means for disabling said medium moving means while said encoder is in an encoded condition.

19. The combination set forth in claim 17 including a reproducing machine having a record medium bearing a prerecorded pronounciation of said respective characters and means selectively activatable to pronounce said respective characters, and said encoder including means responsive to an advance movement of said pointer means to a selected character printed on said medium for activating said reproducing machine to pronounce the character designated by said pointer means.

20. In a teaching machine: the combination of a holder for an exhibitor medium having successive lower and upper case characters printed on one side each at a predetermined distance from the preceding character, a pointer means movable by steps each through said predetermined distance to designate successive characters, an encoding means for providing a selected control operation in connection with each designated character, said encoding means comprising a prerecorded record having for each encoding operation a code signal comprising a selected series of recorded and non-recorded bits followed by a readout bit, an encode head movable to reproduce said code signals, a series of encode bit relays and means for selectively activating said relays according to the positions of said recorded bits in each code signal, respective drive means for said pointer means and encode head each including a clutch having a one revolution operation when activated for a lesser period than that required for said head to scan a recorded code signal, and switch means responsive to the activation of the first of said bit relays for terminating the activation of said clutches.

21. An audio visual system comprising means repeatedly shiftable by successive steps to present successive items of instruction into view of a pupil, means coordinated with said shiftable means to provide a respective control signal during each advance of the shiftable means, reproducing means intermittently operated responsive selectively to each control signal for providing an audio message relating to the respective item of instruction while said item of instruction is maintained into view, a keyboard normally in a blocked condition and having items of instruction imprinted on the respective keys, means responsive selectively to said control signals for freeing respective keys of said keyboard corresponding to the respective items of instruction then in view, and means responsive to operating the freed key of said keyboard for advancing said shiftable means to bring a succeeding item of instruction into view.

22. In a teaching machine: the combination of an exhibiting machine including a holder for a medium having printed items of instruction thereon, a pointer movable to designate the respective items, and means for advancing said pointer one step at a time; a reproducing machine having a prerecorded record medium bearing a recorded pronunciation and/or explanation of the respective items printed on said medium, and means selectively activatable for reproducing respective portions of said record medium designated by said pointer; and an encoder comprising a record medium having an encode track with prerecorded code signals for each printed item of instruction, an encode head registering with said encode track, means for advancing said encode head responsive to each pointer advance, and means for converting the code signals picked up by said encode head into respective selective activations of said reproducing means whereby responsive to each pointer advance said reproducing means is activated to pronounce and/or explain the item of instruction designated by said pointer.

23. The teaching machine set forth in claim 22 including a typewriter having a keyboard with characters designated on the keys thereof and means normally blocking said keyboard, means operable by said encoder for freeing the key of said keyboard corresponding to the item designated by said pointer, and means operable by depressing said freed key for reactivating said reproducing machine to repeat a pronunciation of said designated item.

24. The teaching machine set forth in claim 22 wherein said prerecorded record medium comprises a drum having respective recordings of successive tracks around the drum, comprising a one revolution clutch for driving said drum, a solenoid energizable for engaging said clutch and effective when dropped before completion of one revolution of said drum to stop the drum when one revolution thereof is completed, a drum brush switch in the circuit of said clutch solenoid rendered open during a traversal by the drum of a predetermined home end zone of each revolution thereof to drop said solenoid at the beginning of the traversal of said home end zone, and an encode start circuit activated by the dropping of said drum clutch solenoid to start a succeeding encoding operation wherein the time required for said drum to traverse said home end zone is less than the time for said encoder to complete an encode operation.

25. In a teaching machine: The combination of a typewriter having a keyboard, means for typing characters and/or performing control functions as the respective keys are depressed and means for normally blocking said keyboard; an exhibitor having a pointer for designating successive items of instruction, and means for advancing said pointer; a reproducer having a record bearing prerecorded pronunciation and/or explanation of said respective characters, and means selectively activatable to reproduce said prerecorded pronunciations and/or explanations; an encoder including a prerecorded encode track, an encode head, means for advancing said encode head responsive to each pointer advance, a translator for freeing the respective key from said blocking means corresponding to the character designated by said pointer, and a logic encoder for selectively activating said reproducer to cause the same to pronounce and/or explain said respective character; and means rendered operative concurrently as the key bearing said designated character is encoded for recurrently activating said reproducer to cause the same to repronounce said designated character at intervals until the pupil depresses said encoded key.

26. In a teaching machine: the combination of a typewriter having a keyboard, means for typing characters and/or performing control functions as the respective keys are depressed and means for normally blocking said keyboard; an exhibitor having a medium with characters printed thereon, a pointer for designating the respective characters and means for advancing said pointer; a reproducer having a record bearing prerecorded pronunciation and/or explanation of said respective characters, and means selectively activatable to reproduce said prerecorded pronunciations and/or explanations; an encoder including a prerecorded encode track, an encode head, means for advancing said encode head responsive to each pointer advance, a translator for freeing the respective key from said blocking means corresponding to the character designated by said pointer, and a logic encoder for selectively activating said reproducer to cause the same to pronounce and/or explain said designated character; means responsive to depressing said encoded key for decoding said logic encoder; and means responsive to releasing said depressed key for decoding said translator.

27. The combination set forth in claim 26 including encode bit and audio relays activated in preselected combinations during each respective encoding operation to selectively activate said reproducer, said encode relays having a common lock line, a decode relay, a common key switch activated momentarily responsive to each key depression to activiate said decode relay, means responsive to activation of said decode relay to open said lock line and drop out said encode bit and audio relays, a common bail switch held in open position so long as any key is held depressed, a mechanism for decoding said translator, and circuit means prepared for operation by activation of said decode relay and energized by closure of said bail switch responsive to releasing the depressed key for activating said decoding means.

28. In a teaching machine: the combination of an exhibiting machine having a holder for a medium provided with printed characters and a pointer movable to designate specific characters, a typewriter having a keyboard with characters designated on the respective keys, a reproducing machine having a record medium bearing prerecorded pronunciation and/or explanation of said respective characters and means selectively activatable to pronounce said respective characters, an encoder including an encode track prerecorded with successive code signals, an encode head, means responsive to each movement of said pointer for advancing said encode head to reproduce said code signals, a set of logic relays activated in selected combinations by said code signals during each pointer advance to cause said reproducer to pronounce the designated characters and a translator mechanism also selectively activated by said code signals during each pointer advance to permit only the key of said keyboard bearing the designated character to be depressed, means for reactivating said reproducer to repronounce the designated character upon depressing the encoded key after the first pronunciation is completed, means responsive to depressing the encoded key for decoding the logic as to that character and responsive to releasing said key for decoding the translator as to that character, and means responsive to decoding the translator after pronunciation of said character is completed for advancing said pointer to the next character and for encoding the logic and translator therefor.

29. A teaching machine comprising an exhibiting machine having a holder for a printed medium, pointer means movable to indicate successive items on said printed medium, and drive means for advancing said pointer means by steps; a reproducing means having a record bearing prerecorded pronunciation and/or explanation of said respective items and means selectively activatable for pronouncing and/or explaining items designated by said pointer means; and encoder including a prerecord, a movable encode head and drive means for advancing said head concurrently as said pointer means is advanced for selectively activating said reproducing means to run for a given interval means for restarting said drive means to provide a succeeding advance of said pointer means and of said encode head; and settable time delay means associated with said last stated means for delaying the restart of said drive means.

30. In a teaching machine: the combination of a holder for an exhibitor medium having successive lower and upper case characters thereon each at a predetermined distance from the preceding character, a pointer means movable by steps equal to said predetermined distance to designate successive characters on said medium, means for advancing said pointer means by steps, a reproducing means having a record bearing a prerecorded pronunciation of said respective characters and means selectively activatable for pronouncing said respective characters, and an encoder for selectively activating said reproducer means responsive to each step advance of said pointer means comprising an encode track having different code signals prerecorded thereon for each selective activation of said reproducer means and an encode head movable along said track for reproducing said code signals, wherein each set of code signals for a selective activation of said reproducer means is confined a distance along said encode track equal to one-half of said predetermined spacing distance between said characters whereby to permit two recordings per character in a length of encode track equal to the predetermined spacing between successive characters.

31. In a teaching machine: the combination of a card exhibiting machine having a card holder for cards with printed lines of matter thereon at its front side and with an encode track and a plurality of word audio tracks on its back side for each printed line, pointer means registering with a first one of said printed lines and advanced by steps to designate successive items thereon; a word audio machine including a head engaging a first one of said word audio tracks corresponding to the printed line designated by said pointer means, drive means for advancing said head along said one track and drive means for shifting said head from one word aduio track to the next; an encoder including a head engaging the encode track corresponding to said first printed line, drive means for advancing said encode head during advance of said pointer means, and coding means responsive to a first code signal picked up by said encode head when said pointer reaches a preselected item of printed matter for starting said word audio head advancing means to cause the word audio machine to pronounce and/or explain said preselected item, each of said encode tracks having a series of prerecorded code signals at intervals corresponding to preselected items in the respective printed line and effective when reproduced to activate said coding means to start said word audio head advancing means, said word audio machine including means activated by said word aduio head when the same reaches the end of a word audio track for stopping the head advancing means, returninig said head to start position, activating the word audio head shifting means and decoding said coding means.

32. The teaching machine set forth in claim 31 wherein each encode track has a code signal for "carriage return" following the last of the word audio code signals in the encode track, including means for shifting said card holder by one line at a time, and means responsive to said word audio head returning home after scanning the last of the word audio tracks corresponding to a printed line for activating said encoder to cause the same to pick up said carriage return signal, said encoder including a carriage return encode line activated by said carriage return signal to (1) return said pointer means to home position and advance said holder shift means by one line, (2) return said encode head to home position, and (3) return said word audio head shift means to start position whereby to place said word audio head in line with the first of the word audio tracks corresponding to the next printed lines designated by said pointer means.

33. A combined exhibiting and word audio machine for a self-teaching apparatus comprising a holder for a card having printed lines of matter on a front side thereof and a preselected group of prerecorded word audio tracks on the back side for each printed line on the front side, a pointer means movable across the front side along a printed line to designate selected items of said printed matter, a word audio head movable across the backside to reproduce a word audio track, means for shifting said word audio head to the next track of the respective group and concurrently returning the head to home when the head reaches the end of a word audio track, and encoding means responsive to said pointer reaching a preselected point in the advance movement thereof for (1) shifting said holder by one line and concurrently returning said pointer means to home position, and (2) returning said word audio head shift means to start position whereby to place the word audio head in line with the first word audio track of the group corresponding to the next printed line designated by said pointer means.

34. In a teaching machine: the combination of an exhibitor having a pointer carriage, releaseable drive means for advancing sad carriage by steps and spring means for returning said carriage home when the drive means is released; a typewriter having a keyboard, a carriage, and a carriage return solenoid; and an encoder including a record track prerecorded with a code signal for carriage return, a head for picking up signals from said track, releaseable drive means for advancing said head responsive to each step advance of said pointer carriage, spring means for returning said head home when said head drive means is released, and a carriage return encode line activated by pick up of said carriage return code signals concurrently to operate said carriage return solenoid and to release both said pointer drive means and said encode head drive means, including means to delay release of said carriage return solenoid until both said pointer carriage and said encode head reach home positions.

35. In a teaching machine: the combination of a typewriter having a normally blocked keyboard, exhibiting machine having a holder for a medium with printed characters, a pointer and means for advancing the pointer by steps to designate printed characters on said card, a word audio machine selectively activatable to operate for predetermined intervals to explain respective items designated by said pointer, a keyboard audio machine selectively activatable to pronounce said designated characters, an encoder for freeing the key of said typewriter designated by said pointer and for selectively activating said word audio machine and said keyboard audio machine, a pointer hold relay, means operated during a step advance of said pointer for starting said encoder to activate said word audio machine to explain the character designated by said pointer and to activate said pointer hold relay, means operated by said word audio machine as the word audio machine is stopped for restarting said encoder to activate said key board audio machine to pronounce said designated character, to drop said pointer hold relay and to free the key of the typewriter having the character designated by said pointer, and means responsive to operating said freed key of the typewriter for reactivating said keyboard audio machine to repronounce said designated character, advance said pointer to the next character and to start said encoder to activate said word audio machine to explain said next character.

36. In a teaching machine: the combination of a typewriter having a normal locked keyboard with characters printed on the respective keys, unlocking means selectively activatable to free the respective keys of said keyboard and a carriage stepped ahead by pressing said keys; an exhibiting machine having a holder for a medium having printed characters thereon, a pointer, and means for advancing the pointer by steps to designate respective characters; a keyboard audio machine including means selectively activatable to pronounce said respective characters; and an encoder including a prerecorded encode track, an encode head and means for moving said encode head along said prerecorded encode track during a step advance of said pointer to activate said keyboard audio machine to pronounce the character designated by said pointer and to activate said unlocking means to free the respective key of the typewriter, an encode start circuit for starting said pointer advancing means and said encoder, and manual start means operable to activate said encode start circuit and place said machine in an operating condition wherein upon operating a freed key after the designated character is first pronounced said keyboard audio machine is reactivated to repronounce said character, said encoder is decoded, and said pointer is advanced to the next character with the encoder being operated simultaneously as to said next character during said pointer advance.

37. The teaching machine set forth in claim 36 including a start-stop relay, a manual stop switch for dropping said start-stop relay, and circuits controlled by said start-stop relay as the same is dropped for first decoding said encoder and disabling the same against any succeeding encoding operation, and then returning home said typewriter carriage, said pointer and said encode head.

38. The combination set forth in claim 37 including a carriage return key in said keyboard operable to return the carriage, a solenoid for depressing said carriage return key, a pointer reset solenoid activatable to cause said pointer to be returned to home position, an encode reset solenoid activatable to cause said encode head to be returned to home position, means responsive to completion of said decode operation for providing activating circuits for said pointer reset solenoid, encode head reset solenoid and carriage return solenoid, hold circuits for said pointer reset solenoid and encode head reset solenoid connected in parallel to each other and in series with said carriage return solenoid to drop said carriage return solenoid only after both said pointer reset solenoid and encode head reset solenoid are dropped, and home switches for said pointer and encode head connected in the respective hold circuits for the pointer and encode reset solenoids to open said hold circuits respectively as said pointer and encode head reach their home positions.

39. In a teaching machine: the combination of an exhibiting machine having a pointer and means for advancing said pointer by steps to designate successive items of instruction; a word audio machine selectively activatable to pronounce and/or explain items designated by said pointer comprising a plurality of prerecorded word audio tracks, a reproducer head, releasable drive means for advancing said head along said respective tracks and means for returning said head to home position upon release of said drive means; switch means operable by said head when the same reaches the end of a track for releasing said drive means to cause the head to be thereupon returned to home position; a voice-operated relay connected to the output of said head and having a predetermined dropout period for causing said relay to be operated during operation of said word audio machine except during scanning by said head of nonrecorded intervals in said word audio tracks exceeding the dropout period of said relay; means for releasing said driving means upon dropout of said relay whereby upon said head scanning one of said nonrecorded intervals the head is returned to home position, an encoder operated during an advance of said pointer to a preselected item of printed matter for activating said word audio machine to explain said item, and means resopnsive to a drop-out of said voice operated relay during scanning of a word audio track by said head for decoding said encoder to prepare the encoder for a succeeding encoding operation.

40. In a teaching machine: the combination of a typewriter having a normally blocked keyboard with lower and upper case characters printed on the respective keys thereof, said keyboard having also lower case and upper case shift keys, a holder for a medium having both lower and upper case characters printed thereon, a pointer movable by steps to designate successive characters on said medium, means for advancing said pointer, a reproducer selectively activatable to pronounce said respective characters, means responsive to said pointer being advanced to a lower case character while the typewriter is in lower case condition for selectively activating said reproducer to pronounce said designated lower case character and to free only the respective key of the typewriter to be depressed, pointer arrest means, means responsive to pressing said lower case key while the next printed character is upper case for advancing said pointer to said upper case character, activating said reproducer to pronounce upper case, activating said pointer arrest means and for freeing the upper case shift key to be depressed, and means responsive to depressing and releasing said upper case shift key while said pointer is at standstill for activating said reproducer to repronounce upper case dropping out said pointer arrest means, activating said reproducer to pronounce said designated upper case character and freeing the respective key of the typewriter bearing said upper case character.

41. In a teaching machine: the combination of a card exhibiting machine having a holder for a card provided with printed characters, a pointer and means for advancing said pointer by steps to designate respective characters; a typewriter having a keyboard with characters designated on the respective keys thereof and means normally blocking said keyboard; an encoder including encode circuits for said respective characters selectively activatable to free the respective keys of said typewriter keyboard, an encode start line for said pointer advancing means and for said encoder, pointer hold means for disconnecting said pointer advance means from said encode start line, and means connected to preselected encode lines of said encoder for activating said pointer arrest means during encoding of respective preselected characters and for dropping said pointer arrest means upon subsequent activation of said encode start line for encoding selected other characters whereby said pointer is arrested during encoding of said preselected characters.

42. In a teaching machine: the combination of an exhibiting machine having a holder for a medium provided with printed characters, a pointer and means for advancing said pointer by steps to designate respective characters; a typewriter having a keyboard with characters designated on the respective keys thereof and means normally blocking said keyboard; and encoder including encode circuits for said respective characters selectively activatable to free the respective keys of said typewriter keyboard; an encode start line for said pointer advancing means and for said encoder; pointer hold means for disconnecting said pointer advance means from said encode start line; means responsive to activation of respective preselected ones of said encode circuits for activating said pointer hold means; pointer release means for restoring connection of said pointer advance means to said encode start line; and an energizing circuit for said pointer release means connected by operation of said pointer hold means to said encode start line for causing said release means to be operated when said start line is next activated.

43. The combination set forth in claim 42 including means operated by said pointer release means for completing a hold circuit for said pointer hold means via said encode start line, and means responsive to each encode operation for opening said encode start line.

44. In a teaching machine including a keyboard having characters imprinted on the keys thereof and means for normally blocking the keyboard: the combination of an exhibiting machine having a medium with said characters imprinted thereon, and pointer means advanceable by steps to designate the successive characters, a reproducer for pronouncing said respective characters, a set of logic relays activatable in selected combinations to activate said reproducer to pronounce preselected characters, a translating mechanism including a set of translator solenoids corresponding to said logic relays and prepared for operation by activation of the logic relays, a set of permutation bars controlled respectively by said translator solenoids and power driven cam means for freeing a key of said keyboard according to the setting of said permutation bars, an encoder including an encode track with prerecorded code signals for said successive characters each comprising a series of recorded and nonrecorded bits followed by a read-out bit, an encode head moved during a step advance of said pointer for picking up said recorded bits and selectively activating said logic relays, and read out means operated by said encoder during scanning of the read-out bit for (1) completing a selected encode circuit to said reproducer according to the setting of said logic relays to cause the reproducer to pronounce the characters designated by said pointer means, (2) activating said selected translator solenoids to release the respective permutation bars, and (3) starting said power driven cam means to free the key of said keyboard corresponding to said designated character.

45. In a teaching machine: the combination of an exhibitor having a pointer and means for advancing said pointer by steps, an encoder including a record medium having recorded thereon a predetermined "filler" code, a head for scanning said record medium and means for advancing said head by steps each through the distance of a filler code recording, and means responsive to a step advance of said head in scanning a filler code recording for automatically decoding said encoder and thereupon advancing said head by another step and concurrently advancing said pointer.

46. In a teaching machine: the combination of a typewriter having a normally disabled keyboard with characters imprinted thereon, an encoder including a record medium having recorded thereon predetermined code signals, a head for scanning said record medium, means for advancing said head by steps past the distance of successive code-signal recordings, means responsive to the code signals picked up by said head for rendering respective keys of said keyboard in an abled condition, means for running said encoder through a decode-encode cycle responsive to each press and release of an abled key, and means controlled by said encoder for maintaining said keyboard totally disabled during each decode-encode cycle.

47. In a teaching machine: the combination of a typewriter having a normally disabled keyboard with characters imprinted on the respective keys, an encoder including a record medium having recorded thereon predetermined code signals, a head for scanning said record medium, means for advancing said head by steps past the distance of successive code-signal recordings, means responsive to the code signals picked up by said head for rendering the respective keys of said keyboard in an abled condition, and means for running said encoder through a decode-encode cycle responsive to each press and release of an abled key.

48. The teaching machine set forth in claim 47 including means for communicating instructions and/or explanations to a pupil as to letters and/or words to be typed, wherein said record medium bears a series of code signals to enable said typewriter to be operated only in a sequence according to the instructions given, and means for activating said encoder after a set of instructions are given to the pupil.

49. The teaching machine set forth in claim 48 wherein said communicating means comprises a word-audio machine including a record medium prerecorded with instructions and/or explanations to the pupil, a cooperable reproducer, and means for driving said reproducer and record medium in a scanning relationship to reproduce said instructions and/or explanations, means for starting said word-audio machine by said encoder and means responsive to said word-audio machine reproducing a set of instructions for abling a first key of the typewriter to permit the pupil to type the instructions given.

50. The teaching machine set forth in claim 47 including a keyboard audio machine having a record medium with separate tracks respectively bearing prerecorded pronunciations of the respective characters on the keys of the typewriter, a reproducer head, means for relatively driving said head and record medium of said keyboard audio machine to scan the respective tracks to pronounce selected characters on said keys, and means operated as an incident to the abling of a key of the typewriter by said encoder for selectively activating said keyboard audio machine to pronounce the character designated on said abled key.

51. The teaching machine set forth in claim 50 including a word audio machine having a record medium, a reproducer head and a drive for producing a relative scanning movement between said head and record medium to reproduce successive instructions and/or explanations prerecorded on the record medium for directing the pupil in the use of said typewriter, and means for controlling said word audio machine, said keyboard audio machine and the abling of the keys of said typewriter in a predetermined sequence according to the code signals prerecorded on the record medium of the encoder.

References Cited by the Examiner

UNITED STATES PATENTS

| | | | |
|---|---|---|---|
| 1,984,599 | 12/1934 | Safar | 35—6 |
| 2,082,261 | 6/1937 | Runyan | 35—35 |
| 2,357,593 | 9/1944 | Leavell | 35—35 |
| 2,547,603 | 4/1951 | Segal et al. | 35—35 |
| 2,690,697 | 10/1954 | Rocca. | |
| 2,924,668 | 2/1960 | Hoshino et al. | 179—100.2 |
| 3,021,611 | 2/1962 | Goodell et al. | 35—6 |
| 3,045,799 | 7/1962 | Seymour et al. | 179—107 |
| 3,048,083 | 8/1962 | Rosenbaum | 88—28 |
| 3,080,661 | 3/1963 | Conrath | 35—6 |
| 3,114,210 | 12/1963 | Uttal | 35—6 |
| 3,136,072 | 6/1964 | Ross | 35—5 |

EUGENE R. CAPOZIO, *Primary Examiner.*

S. M. BENDER, *Assistant Examiner.*